(12) United States Patent
Hakuta et al.

(10) Patent No.: US 10,988,924 B2
(45) Date of Patent: Apr. 27, 2021

(54) SOUNDPROOF STRUCTURE, SOUND ABSORBING PANEL, AND SOUND ADJUSTING PANEL

(71) Applicant: FUJIFILM Corporation, Tokyo (JP)

(72) Inventors: Shinya Hakuta, Ashigara-kami-gun (JP); Shogo Yamazoe, Ashigara-kami-gun (JP); Yuichi Kasuya, Ashigara-kami-gun (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 16/583,546

(22) Filed: Sep. 26, 2019

(65) Prior Publication Data

US 2020/0024845 A1   Jan. 23, 2020

Related U.S. Application Data

(63) Continuation of application No. PCT/JP2018/012057, filed on Mar. 26, 2018.

(30) Foreign Application Priority Data

Mar. 27, 2017 (JP) ............................. JP2017-061107
Jun. 16, 2017 (JP) ............................. JP2017-118647

(51) Int. Cl.
   *E04B 1/86* (2006.01)
   *B32B 7/02* (2019.01)
   (Continued)

(52) U.S. Cl.
   CPC ................. *E04B 1/86* (2013.01); *B32B 7/02* (2013.01); *B32B 15/04* (2013.01); *G10K 11/162* (2013.01);
   (Continued)

(58) Field of Classification Search
   CPC .. E04B 1/86; B32B 7/20; B32B 15/04; B32B 2307/102; G10K 11/162; G10K 11/172
   See application file for complete search history.

(56) References Cited

U.S. PATENT DOCUMENTS 8,893,851 B2 * 11/2014 Kitamura ............. G10K 11/172
                                                        181/293
9,623,627 B2 *  4/2017 Coates ....................... C09J 7/38
(Continued)

FOREIGN PATENT DOCUMENTS

CN         1666251 A    9/2005
CN       101042865 A    9/2007
(Continued)

OTHER PUBLICATIONS

International Preliminary Report on Patentability and Translation of the Written Opinion issued from the International Bureau in International Application No. PCT/JP2018/012057 dated Oct. 1, 2019.
(Continued)

*Primary Examiner* — Forrest M Phillips
(74) *Attorney, Agent, or Firm* — Sughrue Mion, PLLC

(57) ABSTRACT

There are provided a soundproof structure, which can have high soundproofing performance in a wide frequency band and in which visual recognition of through-hole can be suppressed, and a sound absorbing panel and a sound adjusting panel using the soundproof structure. A sheet member having a plurality of through-holes passing therethrough in a thickness direction and a sound absorbing body disposed in contact with one main surface of the sheet member are provided. An average opening diameter of the through-holes is 0.1 μm or more and less than 100 μm. Assuming that the average opening diameter of the through-holes is ϕ (μm) and an average opening ratio is σ a parameter A expressed by $A = \sigma \times \phi^2$ is 92 or less.

18 Claims, 25 Drawing Sheets

(51) Int. Cl.
  *B32B 15/04* (2006.01)
  *G10K 11/162* (2006.01)
  *G10K 11/172* (2006.01)

(52) U.S. Cl.
  CPC ...... *G10K 11/172* (2013.01); *B32B 2307/102* (2013.01)

(56) References Cited

U.S. PATENT DOCUMENTS

| | | |
|---|---|---|
| 10,427,624 B2 | 10/2019 | Guigner et al. |
| 2005/0252714 A1* | 11/2005 | Goda .................. G10K 11/168 181/252 |
| 2005/0263346 A1* | 12/2005 | Nishimura ........... G10K 11/172 181/290 |
| 2007/0012508 A1 | 1/2007 | Demers |
| 2007/0227815 A1 | 10/2007 | Nakamura |
| 2007/0235253 A1 | 10/2007 | Hiraku et al. |
| 2013/0020148 A1 | 1/2013 | Nakajima et al. |
| 2013/0118831 A1 | 5/2013 | Kawai et al. |
| 2014/0182967 A1* | 7/2014 | Takeda ................ G10K 11/002 181/290 |
| 2016/0176368 A1 | 6/2016 | Osada et al. |

FOREIGN PATENT DOCUMENTS

| | | | |
|---|---|---|---|
| CN | 101046111 A | 10/2007 | |
| CN | 103733252 A | 4/2014 | |
| CN | 104078036 A | 10/2014 | |
| CN | 204808875 U | 11/2015 | |
| CN | 105139843 A | 12/2015 | |
| CN | 205194322 U | 4/2016 | |
| EP | 1840287 A2 * | 10/2007 | ........... G10K 11/162 |
| EP | 1840287 A2 | 10/2007 | |
| EP | 2527552 A1 | 11/2012 | |
| EP | 2595142 A1 * | 5/2013 | ........... G10K 11/172 |
| EP | 2595142 A1 | 5/2013 | |
| EP | 2871638 A4 * | 2/2016 | ............... E04B 1/84 |
| JP | 51-121210 U | 10/1976 | |
| JP | 59-222893 A | 12/1984 | |
| JP | 7-324400 A | 12/1995 | |
| JP | 11-161282 A | 6/1999 | |
| JP | 2007-001271 A | 1/2007 | |
| JP | 2008-233792 A | 10/2008 | |
| JP | 2010-196421 A | 9/2010 | |
| JP | 2017-044796 A | 3/2017 | |
| WO | 00/05707 A1 | 2/2000 | |
| WO | 2015/046079 A1 | 4/2015 | |
| WO | 2016066640 A1 | 5/2016 | |

OTHER PUBLICATIONS

Communication dated Feb. 21, 2020 from the European Patent Office in application No. 18776256.2.
Office Action dated Feb. 3, 2020 in Chinese Application No. 201880022616.5.
International Search Report for PCT/JP2018/012057 dated Jun. 19, 2018 [PCT/ISA/210].
Written Opinion of the International Searching Authority for PCT/JP2018/012057 dated Jun. 8, 2018 [PCT/ISA/237].
Communication dated Jan. 7, 2020, issued by the Japan Patent Office in application No. 2019-509779.
Communication dated Dec. 10, 2020, from the European Patent Office in European Application No. 18776256.2.

* cited by examiner

SOUNDPROOF STRUCTURE, SOUND ABSORBING PANEL, AND SOUND ADJUSTING PANEL

CROSS-REFERENCE TO RELATED APPLICATIONS

This application is a Continuation of PCT International Application No. PCT/JP2018/012057 filed on Mar. 26, 2018, which claims priority under 35 U.S.C. § 119(a) to Japanese Patent Application No. 2017-061107, filed on Mar. 27, 2017 and Japanese Patent Application No. 2017-118647, filed on Jun. 16, 2017. Each of the above applications is hereby expressly incorporated by reference, in its entirety, into the present application.

BACKGROUND OF THE INVENTION

1. Field of the Invention

The present invention relates to a soundproof structure and a sound absorbing panel and a sound adjusting panel using the same.

2. Description of the Related Art

General noise has broad band frequencies in many cases. Low-frequency sound is felt as pressure, mid-frequency (about 1000 Hz to 4000 Hz) sound is felt large because the sensitivity is good in terms of the structure of the ear, and high-frequency sound is felt offensive. Therefore, it is necessary to take measures against broad band noise.

For example, in wind noise, there is noise having a sound pressure from a low frequency region to a high frequency region, such as white noise. For this reason, it is necessary to take measures against the broad band noise. In particular, in measures against noise in various apparatuses (office apparatuses such as copying machines, household appliances such as vacuum cleaners or air purifiers, automobiles, trains, and the like), a soundproof structure that can realize soundproofing in a small space is required since the sizes of the apparatuses are limited.

Conventionally, urethane, glass wool, and the like have been used as general soundproof materials against noise having broad band frequencies. However, in the case of using urethane, glass wool, and the like as soundproof materials, a volume is required to increase the absorbance. Accordingly, in a case where the size is limited in an apparatus, there has been a problem that sufficient soundproofing performance cannot be obtained. In addition, there has been a problem that such materials are not strong to the environment and are deteriorated. In addition, since such materials are in the form of fibers, the dust of the fibers contaminates the environment. For this reason, since such materials cannot be used in a clean room, in an environment with precision equipment, or in a manufacturing site where contamination is an issue, there has been a problem, such as affecting a duct fan and the like.

On the other hand, JP2017-044796A describes a sound absorbing structure comprising: a non-air-permeable airtight surface-like body disposed apart from the surface body on the sound field side; an air-permeable ventilation resistor that has a flow resistance and is disposed closer to the sound field than the airtight surface-like body; and a micro perforated surface-like body that has a plurality of micro perforations and is disposed closer to the sound field than the ventilation resistor, and describes that a sound absorbing structure having a high absorbance in a wide frequency band can be obtained by combining an air-permeable porous sound absorbing material, an airtight film, and a micro perforated sheet.

JP1995-324400B (JP-H07-324400B) describes a sound absorbing decorative plate which is obtained by bonding a decorative material to a side surface of a sound absorbing base material formed in a planar shape and in which a large number of micro holes are formed in the decorative material. In addition, JP1995-324400B (JP-H07-324400B) describes that predetermined sound absorbing performance can be stably secured and various textures and appearances can be expressed by the sound absorbing decorative plate.

SUMMARY OF THE INVENTION

However, according to the study of the present inventors, it has been found that simply combining a sheet member, in which a large number of through-holes are formed, and a sound absorbing material is not sufficient to obtain high soundproofing performance in a broad band.

In addition, in a case where the opening diameter of a through-hole formed in the sheet member is large, the through-hole can be seen. For this reason, in a case where the sheet member is actually used on a wall, a vehicle ceiling, a floor, and the like, there is a problem that a through-hole can be seen and accordingly the designability or the texture is greatly degraded.

It is an object of the present invention to provide a soundproof structure, which can have high soundproofing performance in a wide frequency band and in which visual recognition of through-hole can be suppressed, and a sound absorbing panel and a sound adjusting panel using the soundproof structure by solving the problems of the above-described conventional technique.

As a result of intensive studies to achieve the above object, the present inventors have found that the above problems can be solved in such a manner that a sheet member having a plurality of through-holes passing therethrough in a thickness direction and a sound absorbing body disposed in contact with one main surface of the sheet member are provided, the average opening diameter of the through-holes is 0.1 µm or more and less than 100 µm, and a parameter A expressed by $A = \sigma \times \phi^2$ is 92 or less assuming that the average opening diameter of the through-holes is $\phi$ µm and the average opening ratio is $\sigma$, and have completed the present invention. That is, it has been found that the aforementioned object can be achieved by the following configurations.

[1] A soundproof structure, which comprises: a sheet member having a plurality of through-holes passing therethrough in a thickness direction; and a sound absorbing body disposed in contact with one main surface of the sheet member and in which an average opening diameter of the through-holes is 0.1 µm or more and less than 100 µm and a parameter A expressed by $A = \sigma \times \phi^2$ is 92 or less assuming that the average opening diameter of the through-holes is $\phi$ (µm) and an average opening ratio of the through-holes is $\sigma$.

[2] The soundproof structure described in [1], in which the sheet member is a plate-shaped member having a plurality of through-holes.

[3] The soundproof structure described in [1], in which the sheet member is a fibrous member.

[4] The soundproof structure described in any one of [1] to [3], in which the parameter A is 3.2 or more and 92 or less.

[5] The soundproof structure described in any one of [1] to [4], which further comprises a wall member on a side of the sound absorbing body opposite to the sheet member and in which the sound absorbing body and the wall member are disposed in a state in which at least parts of the sound absorbing body and the wall member are in contact with each other.

[6] The soundproof structure described in any one of [1] to [4], which further comprises a wall member and in which a distance between the sheet member and the wall member is less than 35 cm.

[7] The soundproof structure described in [6], in which the sound absorbing body is disposed between the sheet member and the wall member.

[8] The soundproof structure described in any one of [1] to [7], which further comprises a wall member and in which, assuming that a wavelength of a frequency of sound to be soundproofed is $\lambda$, at least one of the sheet member or the sound absorbing body is present at a position spaced apart from the wall member by $\lambda/4$.

[9] The soundproof structure described in any one of [5] to [8], in which, assuming that a wavelength of a frequency of sound to be soundproofed is $\lambda$, the sheet member is present at a position spaced apart from the wall member by $\lambda/4$.

[10] The soundproof structure described in any one of [5] to [9], in which the sheet member, the sound absorbing body, and the wall member are formed as an integrated cell structure.

[11] The soundproof structure described in [10], in which, among surfaces of the sound absorbing body, at least one of surfaces not in contact with the wall member is in contact with the sheet member.

[12] The soundproof structure described in [10] or [11], in which one of outermost surfaces is the sheet member and a surface facing a surface on the sheet member side is the wall member.

[13] The soundproof structure described in any one of [1] to [12], in which the sound absorbing body is disposed on an outermost surface with respect to a noise source to be soundproofed.

[14] The soundproof structure described in any one of [1] to [13], in which two or more of the sheet members are provided and the sheet member is disposed on two or more surfaces of the sound absorbing body.

[15] The soundproof structure described in any one of [1] to [14], in which the sheet member and the sound absorbing body are alternately laminated.

[16] The soundproof structure described in any one of [1] to [15], in which the plurality of through-holes are randomly arranged.

[17] The soundproof structure described in any one of [1] to [16], in which the average opening diameter of the through-holes is 0.1 m or more and 50 μm or less.

[18] The soundproof structure described in any one of [1] to [17], in which a shape of each of at least some of the through-holes is a shape having a maximum diameter inside the through-hole.

[19] The soundproof structure described in any one of [1] to [18], in which a forming material of the sheet member is a metal material.

[20] The soundproof structure described in any one of [1] to [19], in which the sheet member is formed of a material having durability against ozone.

[21] The soundproof structure described in any one of [1], [2], and [4] to [20], in which the sheet member is formed of aluminum or an aluminum alloy.

[22] The soundproof structure described in any one of [1] to [21], in which an intermediate member having air permeability is disposed between the sheet member and the sound absorbing body.

[23] The soundproof structure described in [22], in which the intermediate member is a mesh-like member or a non-woven member.

[24] The soundproof structure described in [22] or [23], in which the sheet member is a plate-shaped member having a plurality of through-holes and the intermediate member is also disposed.

[25] The soundproof structure described in any one of [22] to [24], in which both the sheet member and the intermediate member are formed of a flame-retardant material.

[26] The soundproof structure described in any one of [22] to [25], in which both the sheet member and the intermediate member are excellent in one or more characteristics of flame retardancy, heat resistance, heat shield, light resistance, ozone resistance, water resistance, and moisture resistance as compared with the sound absorbing body.

[27] The soundproof structure described in any one of [22] to [26], in which the sheet member and the sound absorbing body are in contact with each other with the intermediate member interposed therebetween.

[28] A sound absorbing panel comprising the soundproof structure described in any one of [1] to [27].

[29] A sound adjusting panel comprising the soundproof structure described in any one of [1] to [27].

According to the present invention, it is possible to provide a soundproof structure, which can have high soundproofing performance in a wide frequency band and in which visual recognition of through-hole can be suppressed, and a sound absorbing panel and a sound adjusting panel using the soundproof structure.

DESCRIPTION OF THE PREFERRED EMBODIMENTS

Hereinafter, the present invention will be described in detail.

The description of constituent elements described below is made based on representative embodiments of the present invention, but the present invention is not limited to such embodiments.

The numerical range expressed by using "~" in this specification means a range including numerical values described before and after "~" as a lower limit value and an upper limit value.

[Soundproof Structure]

A soundproof structure according to the embodiment of the present invention is a soundproof structure which has a sheet member having a plurality of through-holes passing therethrough in a thickness direction and a sound absorbing body disposed in contact with one main surface of the sheet member and in which the average opening diameter of the through-holes is 0.1 µm or more and less than 100 µm and a parameter A expressed by $A=\sigma \times \phi^2$ is 92 or less assuming that the average opening diameter of the through-holes is $\phi$ (µm) and the average opening ratio is $\sigma$.

The configuration of the soundproof structure according to the embodiment of the present invention will be described with reference to the diagrams.

Figure 1:
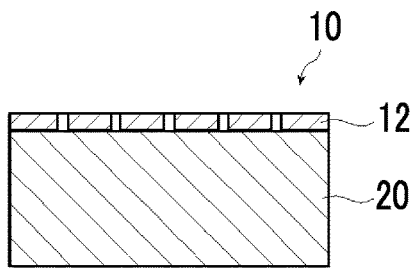
FIG. 1 is a cross-sectional view conceptually showing an example of a soundproof structure of the present invention.

FIG. 1 is a schematic front view showing an example of a soundproof structure according to a preferred embodiment of the present invention. In addition, FIG. 2 is a schematic front view of a sheet member used for the soundproof structure, and FIG. 3 is a cross-sectional view of FIG. 2.

Figure 2:
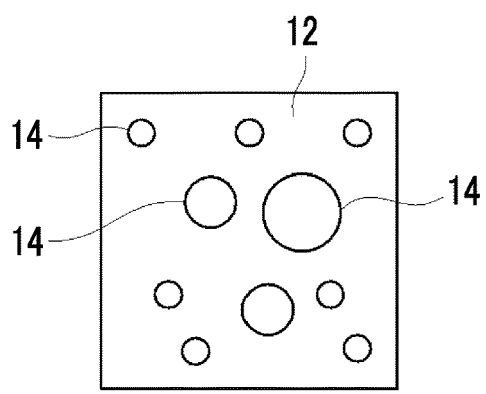
FIG. 2 is a front view of a sheet member of the soundproof structure shown in FIG. 1.
Figure 3:
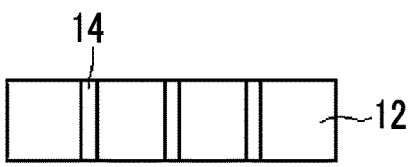
FIG. 3 is a cross-sectional view of FIG. 2.

As shown in FIGS. 1 to 3, a soundproof structure 10 has a sheet member 12, which has a plurality of through-holes 14 passing therethrough in the thickness direction, and a sound absorbing body 20 disposed in contact with one main surface (maximum surface) of the sheet member 12.

Such a soundproof structure 10 is used in a copying machine, a blower, air conditioning equipment, a ventilator, a pump, a generator, a duct, industrial equipment including various kinds of manufacturing equipment capable of emitting sound such as a coating machine, a rotary machine, and a conveyor machine, transportation equipment such as an automobile, a train, and aircraft, general household equipment such as a refrigerator, a washing machine, a dryer, a television, a copying machine, a microwave oven, a game machine, an air conditioner, a fan, a PC, a vacuum cleaner, an air purifier, and a ventilator, and the like, and is appropriately disposed at a position through which sound generated from a noise source passes in various apparatuses.

The sheet member 12 shown in FIGS. 1 to 3 is a plate-shaped member, and a plurality of through-holes passing therethrough in the thickness direction are formed.

A plurality of through-holes 14 formed in the sheet member 12 have an average opening diameter of 0.1 μm or more and less than 100 μm.

In the present invention, the sheet member is not limited to the plate-shaped member having a plurality of through-holes, and may be a fibrous member, such as a woven fabric or a nonwoven fabric. In the case of a fibrous member, the space between fibers can be regarded as a through-hole. This point will be described in detail later.

Here, in the present invention, assuming that the average opening diameter of through-holes is $\phi$ (μm) and the average opening ratio is a in the soundproof structure 10, the parameter A expressed by $A = \sigma \times \phi^2$ is 92 or less.

In the soundproof structure according to the embodiment of the present invention, micro through-holes having an average opening diameter of 0.1 μm or more and less than 100 μm are provided with an average opening ratio satisfying the above-described parameter A. Therefore, by the sound absorption effect by the friction between the air and the inner wall surface of the through-hole in a case where the sound passes through the micro through-hole and the sound absorption effect by the sound absorbing body, high soundproofing performance can be obtained in a wide frequency band, and visual recognition of the through-hole can be suppressed.

Although the soundproof structure in which the sheet member, in which a large number of through-holes are formed, and the sound absorbing body are combined has been proposed as described above, it could be seen that it was not enough to obtain high soundproofing performance in a wide band only by the simple combination.

In addition, in a case where the opening diameter of the through-hole formed in the sheet member is large, the through-hole can be seen. For this reason, in a case where the sheet member is actually used on a wall, a vehicle ceiling, a floor, and the like, there is a problem that a through-hole can be seen and accordingly the designability or the texture is greatly degraded.

The mechanism of sound absorption by the through-hole is estimated to be a change of sound energy to heat energy due to friction between the inner wall surface of the through-hole and the air in a case where the sound passes through the micro through-hole. Specifically, in a case where the sound passes through the through-hole portion, the sound is concentrated from a wide area on the entire sheet member to a narrow area of the through-hole to pass through the through-hole portion. The local speed extremely increases as the sound collects in the through-hole. Since friction correlates with speed, the friction in the micro through-holes increases to be converted into heat.

This mechanism is caused by the small size of the through-hole size. In a case where the average opening diameter of the through-holes is small, the ratio of the edge length of the through-hole to the opening area is large. Therefore, it is thought that the friction generated at the edge portion or the inner wall surface of the through-hole can be increased.

By increasing the friction in a case where the sound passes through the through-hole, the sound energy can be converted into heat energy. As a result, the sound can be absorbed.

On the other hand, the mechanism of sound absorption by the sound absorbing body is that, in a case where the sound propagates through pores in the porous sound absorbing body, the energy of the sound is attenuated by viscous attenuation or heat conduction. This attenuation resistance is proportional to the particle speed of the sound.

Here, according to the study of the present inventors, in a case where the sheet member having through-holes and the sound absorbing body are combined, the local speed extremely increases at the time of passing through the through-hole. Due to this effect, the speed of sound passing through the sound absorbing body is also increased in part. As a result, it was found that the effect of sound absorption by the sound absorbing body was improved by combining the sound absorbing body with the sheet member.

In this case, it was found that, by setting the average opening diameter of the through-holes to 0.1 μm or more and less than 100 μm and setting the parameter $A = \sigma \times \phi^2$ of the average opening diameter $\phi$ (μm) and the average opening ratio σ to 92 or less, the sound absorption effect by the through-hole and the sound absorption effect by the sound absorbing material could be appropriately obtained, and accordingly, the soundproofing performance could be improved in a wide frequency band.

In addition, by setting the average opening diameter of the through-holes to less than 100 μm and setting the average opening ratio σ to an opening ratio satisfying the parameter A of 92 or less, visual recognition of the through-holes can be suppressed to improve the designability and texture.

The visibility of through-holes will be described in detail later.

In addition, since the soundproof structure according to the embodiment of the present invention absorbs sound by friction in a case where the sound passes through the through-hole, it is possible to absorb the sound regardless of the frequency band of the sound. Therefore, it is possible to absorb the sound in a broad band.

In addition, since there is no closed space, air permeability can be secured.

In addition, since through-holes are provided, light can be transmitted while being scattered.

In addition, since micro through-holes are provided to function, the degree of freedom in material selection is high. Therefore, the problem of contamination of the surrounding environment or the environmental performance issue can also be reduced because the material can be selected according to the environment.

The sheet member has micro through-holes. Accordingly, even in a case where a liquid such as water adheres to the sheet member side, water does not block the through-hole by avoiding the through-hole due to the surface tension, so that the sound absorbing performance is hardly lowered.

In addition, since the sheet member is a thin plate-shaped (film-shaped) member, the sheet member can be bent according to the arrangement location.

Here, from the viewpoints of sound absorbing performance and the like, the upper limit value of the average opening diameter of the through-hole is less than 100 µm, preferably 80 µm or less, more preferably 70 µm or less, even more preferably 50 µm or less, and most preferably 30 µm or less. This is because the ratio of the length of the edge of the through-hole contributing to friction in the through-hole to the opening area of the through-hole increases as the average opening diameter of the through-hole decreases and accordingly friction easily occurs.

In addition, the lower limit value of the average opening diameter is preferably 0.5 µm or more, more preferably 1 µm or more, even more preferably 2 µm or more, and most preferably 5 µm or more. In a case where the average opening diameter is too small, since the viscous resistance in a case where the sound passes through the through-hole is too high, the sound does not pass through the through-hole sufficiently. Therefore, even in a case where the opening ratio is increased, a sufficient sound absorption effect cannot be obtained.

From the viewpoint of being able to improve the sound absorbing performance on the higher frequency side, the lower limit value of the parameter A expressed by $A=\sigma \times \phi^2$ is preferably 3.2 or more, more preferably 4.3 or more, even more preferably 5.0 or more, particularly preferably 10 or more, and most preferably 15 or more.

The upper limit value of the parameter A is 92 or less, and 49 or less are more preferable.

The range of the average opening ratio $\sigma$ of through-holes is in the range of $0<\sigma<1$.

For the average opening diameter of through-holes, the surface of the sheet member is imaged at a magnification of 200 times from one surface of the sheet member using a high-resolution scanning electron microscope (SEM), 20 through-holes whose surroundings are annularly connected are extracted in the obtained SEM photograph, the opening diameters of the through-holes are read, and the average value of the opening diameters is calculated as the average opening diameter. In a case where there are less than 20 through-holes in one SEM photograph, SEM photographs are taken at different positions in the surrounding area and counted until the total number reaches 20.

The opening diameter was evaluated using a diameter (circle equivalent diameter) in a case where the area of the through-hole portion was measured and replaced with a circle having the same area. That is, since the shape of the opening portion of the through-hole is not limited to the approximately circular shape, the diameter of a circle having the same area was evaluated in a case where the shape of the opening portion is a non-circular shape. Therefore, for example, even in the case of through-holes having such a shape that two or more through-holes are integrated, these are regarded as one through-hole, and the circle equivalent diameter of the through-hole is taken as the opening diameter.

For these tasks, for example, all circle equivalent diameters, opening ratios, and the like can be calculated by Analyze Particles using "Image J" (https://imagej.nih.gov/ij/).

In addition, for the average opening ratio, using the high resolution scanning electron microscope (SEM), the surface of the sheet member is imaged from directly thereabove at a magnification of 200 times, a through-hole portion and a non-through-hole portion are observed by performing binarization with image analysis software or the like for the field of view (five places) of 30 mm×30 mm of the obtained SEM photograph, a ratio (opening area/geometric area) is calculated from the sum of the opening areas of the through-holes and the area of the field of view (geometric area), and an average value in each field of view (five places) is calculated as the average opening ratio.

Here, in the soundproof structure according to the embodiment of the present invention, the plurality of through-holes may be regularly arranged, or may be randomly arranged. From the viewpoints of productivity of micro through-holes, robustness of sound absorbing characteristics, suppression of sound diffraction, and the like, it is preferable that the through-holes are randomly arranged. Regarding sound diffraction, in a case where the through-holes are periodically arranged, a diffraction phenomenon of sound occurs according to the period of the through-hole. Accordingly, there is a concern that the sound is bent by diffraction and the traveling direction of noise is divided into a plurality of directions. Random is an arrangement state in which there is no periodicity like a complete arrangement, and the absorption effect by each through-hole appears but the sound diffraction phenomenon due to the minimum distance between through-holes does not occur.

In the embodiment of the present invention, there are samples manufactured by etching treatment in continuous treatment in a roll form. However, for mass production, it is easier to form a random pattern at once using surface treatment or the like rather than a process for manufacturing a periodic arrangement. Accordingly, from the viewpoint of productivity, it is preferable that the through-holes are randomly arranged.

Also from the viewpoint of the visibility of through-holes resulting from the arrangement, it is preferable that the through-holes be randomly arranged. In a case where the through-holes are regularly arranged, a light diffraction phenomenon may occur according to the arrangement period of the through-holes, so that the light may appear to be rainbow-colored.

In particular, in a case where the average opening diameter of the through-holes is set to a small opening diameter of less than 100 m, the average opening ratio needs to be increased to some extent from the viewpoint of sound absorbing performance. Therefore, since the distance between adjacent through-holes (minimum distance between through-holes) is reduced, the light diffraction phenomenon due to the regular arrangement tends to occur.

On the other hand, by randomly arranging the through-holes, even in a case where the average opening diameter of the through-holes is a small opening diameter of less than 100 µm and high sound absorbing performance is obtained, the light diffraction phenomenon due to the minimum distance between the through-holes can be made less likely to occur.

In the present invention, the fact that the through-holes are randomly arranged is defined as follows.

In the case of the completely periodic structure, strong diffracted light appears. Even in a case where only a small part of the periodic structure is different in position, diffracted light appears due to the remaining structure. Since the diffracted light is a wave formed by superimposing scattered light beams from the basic cell of the periodic structure, interference due to the remaining structure causes the diffracted light even in a case where only a small part is disturbed. This is a mechanism of the diffracted light.

Therefore, as the number of basic cells disturbed from the periodic structure increases, the amount of scattered light that causes interference for making the intensity of diffracted light strong is reduced. As a result, the intensity of diffracted light is reduced.

Accordingly, "random" in the present invention indicates that at least 10% of all the through-holes deviate from the periodic structure. From the above discussion, in order to suppress the diffracted light, the more basic cells deviating from the periodic structure, the more desirable. For this reason, a structure in which 50% of all the through-holes is deviated is preferable, a structure in which 80% of all the through-holes is deviated is more preferable, and a structure in which 90% of all the through-holes is deviated is even more preferable.

As a verification of the deviation, it is possible to take an image in which five or more through-holes are present and analyze the image. As the number of through-holes included becomes higher, it is possible to perform the more accurate analysis. Any image can be used as long as the image is an image that can be recognized by an optical microscope and an SEM and an image in which the positions of a plurality of through-holes can be recognized.

In a captured image, focusing on one through-hole, a distance between the one through-hole and a through-hole therearound is measured. It is assumed that the shortest distance is a1 and the second, third and fourth shortest distances are a2, a3, and a4. In a case where two or more distances of a1 to a4 are the same (for example, the matching distance is assumed to be b1), the through-hole can be determined as a hole having a periodic structure with respect to the distance b1. On the other hand, in a case where neither distances of a1 to a4 are the same, the through-hole can be determined as a through-hole deviating from the periodic structure. This work is performed for all the through-holes on the image to perform determination.

Here, the above "the same" is assumed to be the same up to the deviation of $\phi$ assuming that the hole diameter of the through-hole of interest is $\phi$. That is, it is assumed that a2 and a1 are the same in the case of the relationship of $a2-\phi<a1<a2+\phi$. It is thought that this is because scattered light from each through-hole is considered for diffracted light and scattering occurs in the range of the hole diameter $\phi$.

Then, for example, the number of "through-holes having a periodic structure with respect to the distance of b1" is counted, and the ratio of the number of the through-holes having a periodic structure with respect to the distance of b1 to the number of all the through-holes on the image is calculated. Assuming that the ratio is c1, the ratio c1 is the ratio of through-holes having a periodic structure, 1−c1 is the ratio of through-holes deviated from the periodic structure, 1−c1 is a numerical value that determines the above-described "random". In a case where there are a plurality of distances, for example, "through-holes having a periodic structure with respect to the distance of b1" and "through-holes having a periodic structure with respect to the distance of b2", counting is separately performed for b1 and b2. Assuming that the ratio of the periodic structure with respect to the distance of b1 is c1 and the ratio of the periodic structure with respect to the distance of b2 is c2, the structure in a case where both (1−c1) and (1−c2) are 10% or more is "random".

On the other hand, in a case where either (1−c1) or (1−c2) is less than 10%, the structure has a periodic structure and is not "random". In this manner, for all of the ratios c1, c2, ..., in a case where the condition of "random" is satisfied, the structure is defined as "random".

A plurality of through-holes may be through-holes having one kind of opening diameter, or may be through-holes having two or more kinds of opening diameters. From the viewpoints of productivity, durability, and the like, it is preferable to form through-holes having two or more kinds of opening diameters.

As for the productivity, as in the above random arrangement, from the viewpoint of performing etching treatment in a large quantity, the productivity is improved by allowing variations in the opening diameter. In addition, from the viewpoint of durability, the size of dirt or dust differs depending on the environment. Accordingly, assuming that through-holes having one kind of opening diameter are provided, all the through-holes are influenced in a case where the size of the main dust almost matches the size of the through-hole. By providing through-holes having a plurality of kinds of opening diameters, a device that can be applied in various environments is obtained.

By using the manufacturing method disclosed in WO2016/060037A, it is possible to form a through-hole having a maximum diameter at the inside, in which the hole diameter increases inside the through-hole. Due to this shape, dust (dirt, toner, nonwoven fabric, foamed material, or the like) of about the size of the through-hole is less likely to clog the inside. Therefore, the durability of the film having through-holes is improved.

Dust larger than the diameter of the outermost surface of the through-hole does not intrude into the through-hole, while dust smaller than the diameter can pass through the through-hole as it is since the internal diameter is increased.

Considering a shape in which the inside is narrowed as the opposite shape, compared with a situation in which dust passing through the outermost surface of the through-hole is caught in an inner portion with a small diameter and the dust is left as it is, it can be seen that the shape having a maximum diameter at the inside functions advantageously in suppressing the clogging of dust.

In addition, in a shape in which one surface of the film has a maximum diameter and the inner diameter decreases approximately monotonically, such as a so-called tapered shape, in a case where dust satisfying the relationship of "maximum diameter>dust size>diameter of the other surface" enters from the side having the maximum diameter, a possibility that the internal shape functions as a slope and becomes clogged in the middle is further increased.

In addition, from the viewpoint of further increasing the friction in a case where the sound passes through the through-hole, it is preferable that the inner wall surface of the through-hole is roughened. Specifically, the surface roughness Ra of the inner wall surface of the through-hole is preferably 0.1 µm or more, more preferably 0.1 µm to 10.0 µm, and even more preferably 0.2 µm to 1.0 µm.

Here, the surface roughness Ra can be measured by measuring the inside of the through-hole with an atomic force microscope (AFM). As the AFM, for example, SPA 300 manufactured by Hitachi High-Tech Sciences Co., Ltd. can be used. The cantilever can be measured in a dynamic force mode (DFM) using the OMCL-AC200TS. Since the surface roughness of the inner wall surface of the through-hole is about several microns, it is preferable to use the AFM from the viewpoint of having a measurement range and accuracy of several microns.

In addition, it is possible to calculate the average particle diameter of protruding portions by regarding each one of the protruding portions of the unevenness in the through-hole as a particle from the SEM image in the through-hole.

Specifically, an SEM image (field of view of about 1 mm×1 mm) captured at a magnification of 2000 times is captured into Image J and binarized into black and white so that the protruding portion is white, and the area of each protruding portion is calculated by Analyze Particles. A circle equivalent diameter assuming a circle having the same area as the area of each protruding portion is calculated for each protruding portion, and the average value was calculated as the average particle diameter.

The average particle diameter of the protruding portion is preferably 0.1 µm or more and 10.0 µm or less, and more preferably 0.15 µm or more and 5.0 µm or less.

Here, in a simulation result to be described later, the speed in the through-hole was measured. The speed in the through-hole is about $5 \times 10^{-2}$ (m/s) in a case where the sound pressure is 1 [Pa] (=94 dB), and about $1 \times 10^{-3}$ (m/s) in a case where the sound pressure is 60 dB.

In a case where sound having a frequency of 2500 Hz is absorbed, the local movement speed of a medium through which the sound wave propagates can be known from the local movement speed. From this, the movement distance was determined on the assumption that particles were vibrating in the penetration direction of the through-hole. Since the sound vibrates, the distance amplitude is a distance by which movement can be made within a half cycle. At 2500 Hz, since one cycle is 1/2500 seconds, half of the time can be in the same direction. The maximum movement distance (sound movement distance) in the sound wave half cycle determined from the local speed is 10 µm at 94 dB and 0.2 µm at 60 dB. Therefore, since the friction is increased by having the surface roughness of about the sound movement distance, the range of the surface roughness Ra and the range of the average particle diameter of protruding portions described above are preferable.

Here, from the viewpoint of the visibility caused by the size of the through-hole, the average opening diameter of a plurality of through-holes formed in the sheet member is preferably 50 µm or less, and more preferably 20 µm or less.

In a case where the sheet member having micro through-holes, which is used in the soundproof structure according to the embodiment of the present invention, is disposed on the wall surface or a visible place, a situation in which the through-holes themselves are visible is not preferable in terms of design. Since a person is concerned that there are holes as an appearance, it is desirable that through-holes are difficult to see. It becomes a problem in a case where through-holes are visible at various places such as a soundproof wall inside the room, an articulating wall, a soundproof panel, an articulating panel, and an exterior part of a machine.

First, the visibility of one through-hole will be examined.

Hereinafter, a case where the resolution of human eyes is visual acuity 1 will be discussed.

Figure 4:
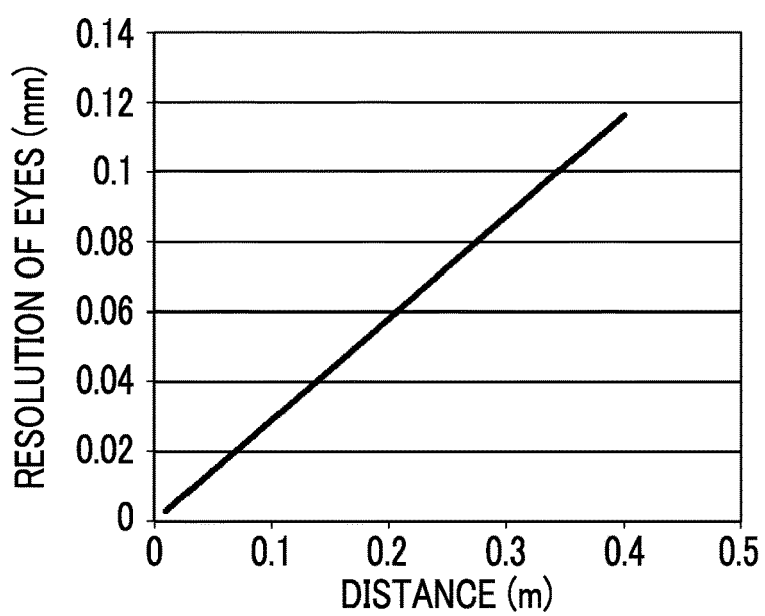
FIG. 4 is a graph showing the relationship between a distance and the resolution of eyes.

The definition of visual acuity 1 is to see the one minute angle decomposed. This indicates that 87 µm can be decomposed at a distance of 30 cm. The relationship between the distance and the resolution in the case of visual acuity 1 is shown in FIG. 4.

Whether or not the through-hole is visible is strongly relevant to the visual acuity. Whether a blank space between two points and/or two line segments can be seen depends on the resolution, as the visual acuity test is performed by recognizing the gap portion of the Landolt's ring. That is, in the case of a through-hole having an opening diameter less than the resolution of the eye, the distance between the edges of the through-hole cannot be decomposed by the eyes. For this reason, it is difficult to see the through-hole having an opening diameter less than the resolution of the eye. On the other hand, it is possible to recognize the shape of a through-hole having an opening diameter equal to or greater than the resolution of the eye.

In the case of visual acuity 1, a through-hole of 100 µm can be decomposed from a distance of 35 cm. However, a through-hole of 50 µm and a through-hole of 20 µm cannot be decomposed at a distance longer than 18 cm and 7 cm, respectively. Therefore, in a case where a person is concerned since a through-hole of 100 µm can be recognized, a through-hole of 20 µm can be used since the through-hole of 20 µm cannot be recognized unless the distance is not an extremely short distance of 1/5. Therefore, a small opening diameter is advantageous since a through-hole is difficult to be visually recognized. In the case of using the soundproof structure in a wall or in a car, the distance from the observer is generally several tens of centimeters. In this case, an opening diameter of about 100 µm is the boundary therebetween.

Next, light scattering caused by through-holes will be discussed. Since the wavelength of visible light is about 400 nm to 800 nm (0.4 µm to 0.8 µm), the opening diameter of several tens of micrometers discussed in the present invention is sufficiently larger than the optical wavelength. In this case, the cross-sectional area of scattering in visible light (amount indicating how strongly an object is scattered, the unit is an area) almost matches the geometrical cross-sectional area, that is, the cross-sectional area of the through-hole in this case. That is, it can be seen that the magnitude at which visible light is scattered is proportional to the square of the radius (half of the circle equivalent diameter) of the through-hole. Therefore, as the size of the through-hole increases, the scattering intensity of the light increases with the square of the radius of the through-hole. Since the ease of viewing of a single through-hole is proportional to the amount of scattering of light, visibility in a case where each one of through-holes is large even in a case where the average opening ratio is the same.

In addition, since the soundproof structure according to the embodiment of the present invention is a system in which a plurality of micro through-holes are present, not only the ease of viewing of each through-hole but also the spatial frequency by the arrangement of the through-holes is also strongly related to the visibility. A visual transfer function (VTF) (refer to International Publication WO2014/141867A1, the visual transfer function itself is described in "R. P. Dooley, R. Shaw: Noise Perception in Electrophotography, J. Appl. Photogr. Eng., 5, 4 (1979), pp. 190-196) indicates the ease of viewing according to the arrangement. The visual transfer function is a function indicating how easily detection is made by human vision for each spatial frequency (periodic structure, pitch, and arrangement such as particle arrangement), and the larger the value, the easier the detection.

According to the visual transfer function, it can be seen that the human can most strongly recognize spatial frequencies of several $mm^{-1}$.

The examination results of the visual transfer function are shown below.

Figure 5:
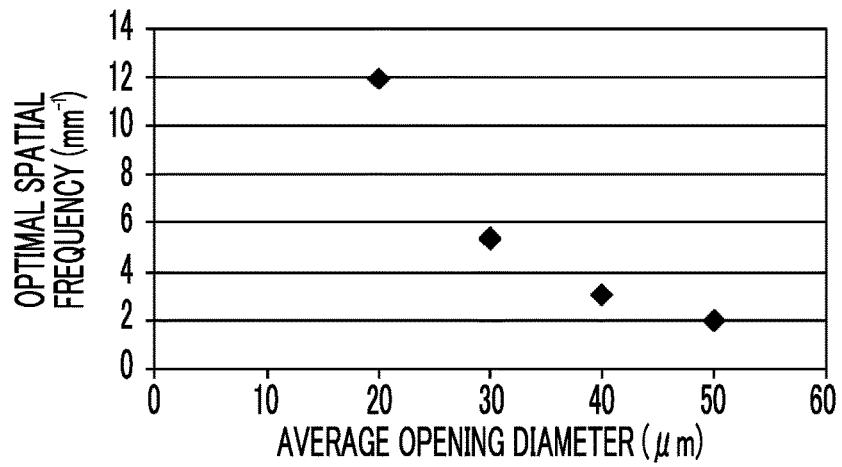
FIG. 5 is a graph showing the relationship between an average opening diameter and an optimal spatial frequency.

First, for a sheet member having a plurality of micro through-holes disposed on a sound absorbing body, an average opening ratio at which the absorbance was the highest was calculated for each case where the average opening diameter of the through-holes is 20 μm, 30 μm, 40 μm, and 50 μm, and the spatial frequency was calculated from the average pitch between the through-holes at that time. The results are shown in FIG. 5. At this time, it is assumed that the through-holes are periodically arrayed in a two-dimensional square arrangement.

Figure 6:
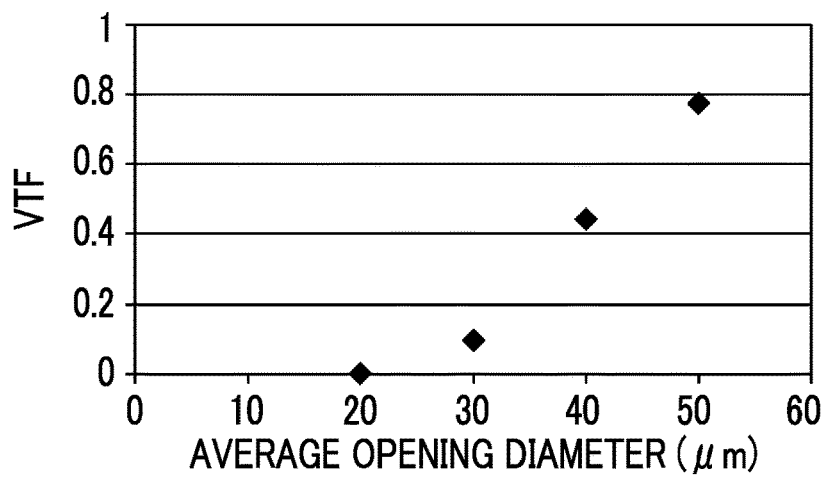
FIG. 6 is a graph showing the relationship between an average opening diameter and a VTF.
Figure 7:
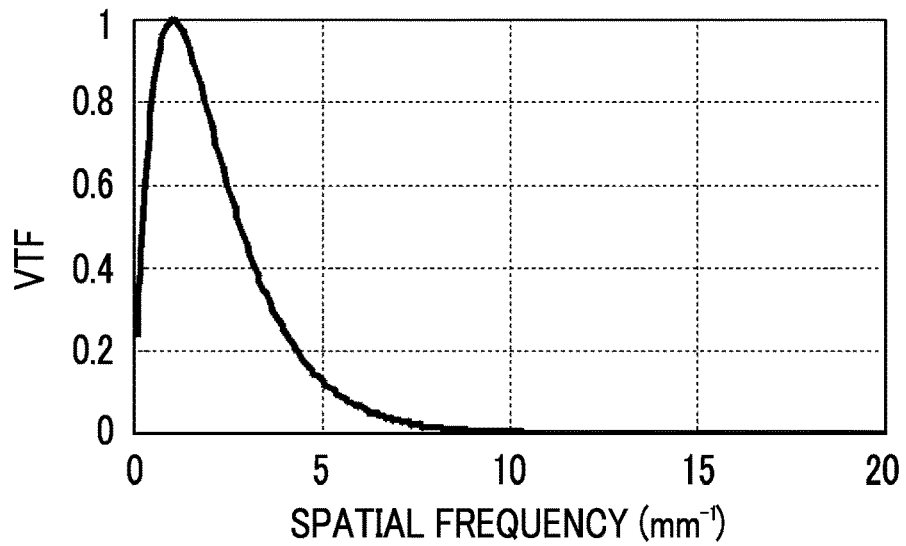
FIG. 7 is a graph showing the relationship between a spatial frequency and a VTF.

Next, for each average opening diameter, the visibility in the case of the spatial frequency calculated above was evaluated using the visual transfer function (VTF). The results are shown in FIG. 6. FIG. 7 is a graph showing the relationship between the spatial frequency and the visual transfer function in a case where the average opening diameter is 20 μm.

As shown in FIG. 6, in a case where the average opening diameter is 50 μm, the VTF is as large as 0.77, whereas in a case where the average opening diameter is 20 μm, the VTF becomes as small as about 0.009 and 1/85o. That is, a configuration having an average opening diameter of 20 μm in a case where the sound absorbing characteristics are given can be made less likely to be visible 1/85o times as compared with a configuration having an average opening diameter of 50 μm.

In a case where a sheet member having an average opening diameter of 20 μm and a sheet member having an average opening diameter of 50 μm were visually compared with each other in an example to be described later, it was confirmed that through-holes were more conspicuous in the sheet member having an average opening diameter of 50 μm.

Although the above discussion has been made for the case of complete periodicity, the same discussion can be made even in the case of pseudoperiodicity. The pseudoperiodicity in the through-holes and particle arrangement is shown below. Each unit (in this case, one through-hole) is not an ideal point having no size but has a size (in this case, one opening diameter). In particular, in a case where the density is large or the inter-unit repulsion is large, the respective units are arranged so as to repel or eliminate each other depending on their sizes. At this time, since a characteristic inter-unit length is given, pseudoperiodicity may be given even in the case of a random process.

Finally, a difference between a random arrangement having no periodicity for the arrangement of through-holes and a periodic arrangement will be discussed. In the periodic arrangement, a light diffraction phenomenon occurs according to the period. In this case, in a case where transmitted white light, reflected white light, broad spectrum light, and the like hit, the color appears variously (for example, light diffracts and the color appear to be misaligned like a rainbow or the color is strongly reflected at a specific angle). Accordingly, the pattern is noticeable. In examples to be described later, a plurality of through-holes were periodically formed with respect to nickel. However, in a case where the nickel film was viewed using a fluorescent lamp, color spread due to diffracted light was observed.

On the other hand, in the case of a random arrangement, the above-described diffraction phenomena do not occur. It was confirmed that any of the aluminum films having micro through-holes formed in the examples to be described later did not show any change in color due to diffracted light even though those were viewed using a fluorescent lamp. In addition, it has been confirmed that, even in the case of a reflective arrangement, there is a metal gloss similar to that of ordinary aluminum foil and no diffraction reflection occurs.

Although the thickness of the sheet member is not limited, the friction energy received in a case where the sound passes through the through-hole increases as the thickness increases. Therefore, it can be thought that the sound absorbing performance is further improved. In addition, in a case where the sheet member is extremely thin, it is difficult to handle the sheet member and the sheet member is easy to break. For this reason, it is preferable to have a thickness enough to hold the sheet member. On the other hand, in terms of miniaturization, air permeability, and light transmittance, it is preferable that the thickness is small. In a case where etching or the like is used for the method of forming the through-hole, a longer manufacturing time is required as the thickness becomes larger. Therefore, from the viewpoint of productivity, it is preferable that the thickness is small. In a case where the thickness is too large, the local speed of the sound is reduced in a case where the sound passes through the thick through-hole. Accordingly, since the speed of the sound passing through the sound absorbing body is reduced, there is a possibility that the sound absorption effect of the sound absorbing body will be reduced.

From the viewpoints of sound absorbing performance, miniaturization, air permeability, and light transmittance, the thickness of the sheet member is preferably 5 μm to 500 μm, more preferably 7 μm to 300 μm, even more preferably 10 μm to 100 μm, and particularly preferably 15 μm to 50 μm.

Hereinafter, a case where the sheet member is a plate-shaped member will be described.

There is no limitation on the material of the sheet member, and various metals, such as aluminum, titanium, nickel, permalloy, 42 alloy, kovar, nichrome, copper, beryllium, phosphor bronze, brass, nickel silver, tin, zinc, iron, tantalum, niobium, molybdenum, zirconium, gold, silver, platinum, palladium, steel, tungsten, lead, stainless steel, and iridium; alloy materials of these metals; resin materials, such as polyethylene terephthalate (PET), triacetyl cellulose (TAC), polyvinylidene chloride, polyethylene, polyvinyl chloride, polymethyl bentene, cycloolefin polymer (COP), polycarbonate, Zeonor, polyethylene naphthalate (PEN), polypropylene, polyimide, ABS resin (acrylonitrile, butadiene, styrene copolymer synthetic resin), and PLA resin; and the like can be used. In addition, glass materials, such as thin film glass, and fiber reinforced plastic materials, such as carbon fiber reinforced plastics (CFRP) and glass fiber reinforced plastics (GFRP), can also be used.

It is preferable to use a metal material from the viewpoints that vibration does not easily occur even though the Young's modulus is high and the thickness is small and accordingly the effect of sound absorption by friction in the micro through-holes is easily obtained. Among these, copper, nickel, stainless steel, titanium, and aluminum are preferable from the viewpoints of cost and availability. In particular, aluminum and an aluminum alloy, which are lightweight and are easy to form micro through-holes by etching or the like, are preferably used from the viewpoints of availability, cost, and the like.

In the case of using a metal material, metal plating may be performed on the surface from the viewpoint of suppression of rust and the like.

In addition, by performing the metal plating on at least the inner surface of the through-hole, the average opening diameter of the through-holes may be adjusted to a smaller range.

By using a material that is conductive and is not charged, such as a metal material, as the material of the sheet member, fine dirt, dust, and the like are not attracted to the film by static electricity. Therefore, it is possible to suppress the sound absorbing performance from lowering due to clogging of the through-hole of the sheet member with dirt, dust, and the like.

In addition, heat resistance can be improved by using a metal material as the material of the sheet member. In addition, ozone resistance can be improved.

In a case where a metal material is used as the sheet member, it is possible to shield electric waves.

The metal material has a high reflectivity with respect to radiant heat due to far infrared rays. Accordingly, in a case where the metal material (conductive material) is used as a material of the sheet member, the metal material also functions as a heat insulating material for preventing heat transfer due to radiant heat. In this case, a plurality of through-holes are formed in the sheet member, but the sheet member functions as a reflecting film since the opening diameter of the through-hole is small.

It is known that a structure in which a plurality of micro through-holes are opened in a metal functions as a high pass filter of a frequency. For example, a window with a metal mesh in a microwave oven has a property of transmitting visible high-frequency light while shielding microwaves used for the microwave oven. In this case, assuming that the hole diameter of the through-hole is $\phi$ and the wavelength of the electromagnetic wave is $\lambda$, the window functions as a filter that does not transmit a long wavelength component satisfying the relationship of $\phi<?$ and transmits a short wavelength component satisfying the relationship of $\phi>\lambda$.

Here, the response to radiant heat is considered. Radiant heat is a heat transfer mechanism in which far infrared rays are radiated from an object according to the object temperature and transmitted to other objects. From the Wien's radiation law, it is known that radiant heat in an environment of about room temperature is distributed around $\lambda=10$ μm and up to 3 times the wavelength (up to 30 μm) on the longer wavelength side contributes effectively to transferring heat by radiation. Considering the relationship between the hole diameter $\phi$ of the high pass filter and the wavelength $\lambda$, the component of $\lambda>20$ μm is strongly shielded in the case of $\phi=20$ μm, while the relationship of $\phi>\lambda$ is satisfied and radiant heat propagates through the through-hole in the case of $\phi=50$ μm. That is, since the hole diameter $\phi$ is several tens of micrometers, the propagation performance of radiant heat greatly changes depending on the difference in hole diameter $\phi$, and it can be seen that the smaller the hole diameter $\phi$, that is, the smaller the average opening diameter, the more it functions as a radiant heat cut filter. Therefore, from the viewpoint of a heat insulating material for preventing heat transfer due to radiant heat, the average opening diameter of the through-holes formed in the sheet member is preferably 20 μm or less.

On the other hand, in a case where transparency is required for the entire soundproof structure, a resin material or a glass material that can be made transparent can be used. For example, a PET film has a relatively high Young's modulus among resin materials, is easy to obtain, and has high transparency. Therefore, the PET film can be used as a soundproof structure suitable for forming through-holes.

It is possible to improve the durability of the sheet member by appropriately performing surface treatment (plating treatment, oxide coating treatment, surface coating (fluorine, ceramic), and the like) according to the material of the sheet member. For example, in a case where aluminum is used as a material of the sheet member, it is possible to form an oxide coating film on the surface by performing alumite treatment (anodic oxidation treatment) or boehmite treatment. By forming an oxide coating film on the surface, it is possible to improve corrosion resistance, abrasion resistance, scratch resistance, and the like.

In addition, by adjusting the treatment time to adjust the thickness of the oxide coating film, it is possible to adjust the color by optical interference.

Coloring, decoration, designing, and the like can be applied to the sheet member. As a method of applying these, an appropriate method may be selected according to the material of the sheet member and the state of the surface treatment. For example, printing using an ink jet method or the like can be used. In addition, in a case where aluminum is used as a material of the sheet member, highly durable coloring can be performed by performing color alumite treatment. The color alumite treatment is a treatment in which alumite treatment is performed on the surface and then a dye is penetrated onto the surface and then the surface is sealed. In this manner, it is possible to obtain a sheet member with high designability such as the presence or absence of metal gloss and color. In addition, by forming alumite treatment after forming through-holes, an anodic oxide coating film is formed only in the aluminum portion. Therefore, decorations can be made without the dye covering the through-holes and reducing the sound absorbing characteristics. In combination with the alumite treatment, various coloring and design can be applied.

Next, a case where the sheet member is a fibrous member will be described.

As described above, the sheet member may be a fibrous member such as a woven fabric, a nonwoven fabric, and a knitted fabric. In the case of a fibrous member, the space between fibers can be regarded as a through-hole.

In the case of the woven fabric, the warp and the weft are regularly woven. Therefore, the average opening diameter and the average opening ratio of the through-holes can be controlled by the fiber diameter and the distance between the fibers. Also in the case of a knit, an opening portion can be similarly defined.

In the case of the nonwoven fabric, the fibers are irregularly woven. For this reason, although the fibers are not parallel or perpendicular to each other, through-holes are formed in the space surrounded by the fibers. Therefore, the average opening diameter and the average opening ratio of the through-holes are determined by the fiber diameter and density.

The thickness in a case where the sheet member is a fibrous member is preferably 500 μm or less, more preferably 300 μm or less, and even more preferably 100 μm or less.

The fiber diameter of the woven or nonwoven fabric is usually about several tens of μm. Therefore, by setting the thickness to 100 μm or less, in the case of a woven fabric, a large number of fibers are not entangled, and a configuration close to one in the longitudinal direction and one in the lateral direction is obtained. Also in the case of a nonwoven fabric, many yarns are not laminated in the thickness range. For this reason, the space surrounded by the fibers can be regarded almost as a through-hole. In this manner, even in the case of a fibrous member, the sound absorbing characteristics can be handled in the same manner as a plate-shaped member having through-holes.

In a case where the thickness of the fibrous member is as large as about 10 mm or more, a configuration is obtained in which several tens or more layers each having a region that can be regarded as such a through-hole overlap each other. Therefore, the effect of the sound passing straight through a communicating portion art does not appear, and a model in which the sound passes through the air flow path connected like a maze is obtained. For this reason, the acoustic characteristics are different from those of the plate-shaped member having through-holes.

As a physical model for obtaining the sound absorbing characteristics, Johnson-Champoux-Allard model (JCA model) is often used to model porous materials and laminated fiber materials including those with a large thickness. As the basic parameter, there is tortuosity. This is an index indicating how much the path of sound propagating through the air bends like a maze. The air flow path becomes complicated by making the fiber layer is thick and laminating the fiber layer in multiple layers. At this time, the value of the tortuosity becomes large, and becomes a different value from a simple through-hole. Since changes in this value affect the effective density and the effective modulus of elasticity, which are parameters that determine the acoustic characteristics, even in the case of the same fiber material or fabric, different acoustic characteristics are obtained between a case where the fiber material or fabric can be regarded almost as a through-hole since the thickness is small and a case where the flow path is like a maze since the thickness is large.

Thus, the fibrous members have essentially different characteristics with respect to sound depending on the thickness. Among these, it has been found that, in a case where the thickness of the fibrous member is small, the fibrous member can be regarded as a plate-shaped member having a plurality of through-holes passing therethrough in the thickness direction. That is, the sound absorption effect can be handled by the same handling as in the case of a plate-shaped member having micro through-holes.

The effect of increasing the absorption by disposing a fibrous member, such as a woven fabric or a nonwoven fabric, as a sheet member in contact with the sound absorbing body has been found. It has been found that the increase effect is effective in a case where the parameter A expressed by $A=\sigma \times \phi^2$ is 92 or less in the same manner as in the case of a plate-shaped member having micro through-holes.

As the fibrous member, fibers formed of resin materials, such as aramid fiber, glass fiber, cellulose fiber, nylon fiber, vinylon fiber, polyester fiber, polyethylene fiber, polypropylene fiber, polyolefin fiber, rayon fiber, low density polyethylene resin fiber, ethylene vinyl acetate resin fiber, synthetic rubber fiber, copolymerized polyamide resin fiber, and copolymerized polyester resin fiber; paper (tissue paper, Japanese paper, and the like); fibers formed of metal materials, such as SUS fiber (stainless fiber sheet "Tommy Fyrex SS" and the like, manufactured by Tamogawa Paper Co.); natural fibers, such as hemp, cotton, silk, and wool; fibers formed of carbon materials and fibers formed of carbon containing materials; and the like can be mentioned. In addition, a fibrous member using a plurality of these materials may be used.

Since the absorption characteristics in the present invention occur in a case where the sound passes through the through-holes, the acoustic characteristics hardly change even though the material of the fibrous member changes. Therefore, the material can be selected freely. Alternatively, the material can also be selected according to characteristics other than the acoustic characteristics. For example, a metal material can be selected in a case where heat resistance is required, and a plastic material can be selected in a case where weight reduction is required.

The sound absorbing body 20 is formed of a porous material, and is disposed in contact with one main surface of the sheet member.

The sound absorbing body is not particularly limited, and conventionally known sound absorbing materials can be appropriately used. For example, various known sound absorbing materials including: materials containing a small amount of air and foamed materials, such as foamed urethane, flexible urethane foam, wood, ceramic particle sintered material, and phenol foam; fibers, such as glass wool, rock wool, microfiber (such as Thinslate manufactured by 3M), floor mat, carpet, meltblown nonwoven fabric, metal nonwoven fabric, polyester nonwoven fabric, metal wool, felt, insulation board, and glass nonwoven fabric, and nonwoven fabric materials; wood cement board; nanofiber-based materials such as silica nanofiber, gypsum board; laminated materials or composite materials thereof; and can be used.

There is no limitation on the thickness of the sound absorbing body 20. From the viewpoints of sound absorbing performance and the like, the thickness of the sound absorbing body 20 is preferably 3 mm to 100 mm, more preferably 5 mm to 50 mm, and even more preferably 10 mm to 30 mm.

By disposing the sound absorbing body 20 in contact with the sheet member 12, there is an effect of preventing the sheet member having through-holes from being damaged.

Many sound absorbing bodies, such as urethane foam and glass wool, are likely to generate dust over time due to the structure containing a large amount of air thereinside. By disposing the sheet member on the sound absorbing body as in the present invention, there is also an effect that the amount of dust from the sound absorbing body can be suppressed.

The arrangement method of the sheet member 12 and the sound absorbing body 20 is not particularly limited, and the sheet member 12 may be disposed on the sound absorbing body 20 or the sheet member 12 may be fixed to the sound absorbing body 20. As a method of fixing the sheet member 12 and the sound absorbing body 20, various adhesives, such as organic type adhesives and inorganic type adhesives, can be used, and various methods are possible such as applying an adhesive in a dot shape or a stripe shape or as a thin layer using a die method, a roll method, a gravure method, or a bar coat method, applying an adhesive in a dot shape using an air spray, an airless spray, an electrostatic spray, or a dispenser so that an adhesive layer not embedded in the holes is formed and bonded, bonding an adhesive layer by heat fusion welding with a mesh material, bonding a part with an adhesive such as double-sided tape, and mechanical fixing using a stapler.

At this time, the entire surface of the sheet member and the entire surface of the sound absorbing body do not need to be bonded to each other, and parts thereof may be in contact with each other. The sound absorbing body and the sheet member may be in contact with each other through non-woven fabrics (a cloth material such as a glass cloth is particularly preferable, and an air-permeable paper material and the like can also be used), woven fabrics (a mesh type, particularly a mesh formed of a highly durable material such as metal mesh or glass fiber mesh is particularly preferable, and a woven fabric formed of carbon, metal, glass, and the like can also be used), a frame (a structure formed of plastic or metal and having openings in a lattice shape, and mainly, paper, metal, plastic, and the like in which a large number of circular through-holes are formed by punching, laser, or the like can also be used), or a member through which sound passes, such as a ventilation film (hereinafter, referred to as an intermediate member). More preferably, it is desirable to set the ventilation resistance of the intermediate member to be low so that the sound passes therethrough as it is.

Specifically, the ventilation resistance of the intermediate member is preferably 100 (N·s/m$^3$) or less, more preferably 50 (N·s/m$^3$) or less, and even more preferably 10 (N·s/m$^3$) or less, and most preferably 5 (N·s/m$^3$) or less.

The ventilation resistance (also referred to as flow resistance) defined herein is an amount that also depends on the thickness of the intermediate member, and the relationship with the unit thickness flow resistance (flow resistivity) is an amount defined by ventilation resistance (N·s/m$^3$)=unit thickness flow resistance (N·s/m$^4$)×member thickness (m). For example, in a case where the ventilation resistance is 100 (N·s/m$^3$) and the member thickness is 100 µm, the unit thickness flow resistance is 1000000 (N·s/m$^4$).

In this case, for example, in the case of a frame, by setting the size of the opening to be larger than the opening size of the sheet member, that is, by setting the size of the opening to 1 mm or more, the frame can be used as an intermediate member with little influence on the sound absorption of the sheet member.

Alternatively, in the case of using an intermediate member having high ventilation resistance, the intermediate member can be designed according to the characteristics of the sheet member. In a range in which there is an effect of a large change in particle speed, which is the effect of the sheet member, on the sound absorbing body, a distant portion can also cause a change in the sound absorbing characteristics.

As an effect of the intermediate member, it is possible to improve the handling, difficulty in breakage, and bendability of the sheet member while maintaining the acoustic effect of the sheet member. In particular, in a case where the thickness of the sheet member is small and the opening ratio of the through-holes is large, the sheet member alone is likely to be broken in many cases. Therefore, the sheet member can be made hard to break by attaching an intermediate member. That is, the sheet member can be mainly configured to have acoustic characteristics, and the intermediate member can be mainly configured to be handleable.

In addition, there is a case where both the sheet member and the porous sound absorbing body have a large opening ratio or void layer and accordingly a usual adhesive or gluing agent easily peels off. At this time, by studying the attachment of the intermediate member, such as using an intermediate member to which an adhesive or a gluing agent is easily attached or making an intermediate member have a heat fusion welding property so that the intermediate member is fused to both the sheet member and the porous sound absorbing body, it is possible to create a highly durable soundproof structure that is hard to peel off.

In the case of providing flame retardancy or nonflammability to be described later, it is possible to further improve the flame retardancy by making both the sheet member and the intermediate member as members having flame retardancy or nonflammability. The same applies to heat resistance, light resistance, UV resistance, ozone resistance, water resistance, moisture resistance, and the like.

In particular, for example, in a case where the position of the heat source is known, the porous sound absorbing body can be protected from heat by disposing the sheet member and the intermediate member upward in the heat source direction and disposing the porous sound absorbing body on the back. This can be similarly applied in a case where the position of the UV light source, the source of ozone, the position of water, and the like are known.

In a configuration having a wall member to be described later, for example, the sound absorbing body may be provided in the wall member, and the sheet member may be simply placed on or in contact with the surface of the sound absorbing body.

Figure 8:
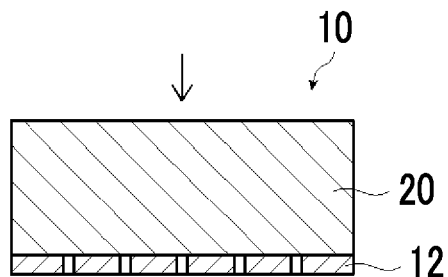
FIG. 8 is a cross-sectional view conceptually showing another example of the soundproof structure of the present invention.

Here, the direction of the soundproof structure 10 with respect to the noise source to be soundproofed is not particularly limited, and the sheet member 12 side may be a noise source side, or the sound absorbing body 20 side may be a noise source side as in the example shown in FIG. 8. The arrow in FIG. 8 indicates an incidence direction of sound, and the noise source is located on the upper side in the diagram.

As for the direction of the noise source, for example, in a case where the noise source is clear such as a speaker or machine noise, the direction of the noise source can be determined as an incidence direction. In addition, as a method of quantitatively determining the "incidence direction of sound", the direction of the sound source can be determined by measuring the phase information of the sound pressure or the particle speed simultaneously with the amplitude information of the sound pressure using a microphone array, beam forming, or a PU probe.

By using Ono Sokki's three-dimensional intensity probe MI-6420, Microflown's PU probe (sound pressure-particle speed probe), Breuer & Keller microphone array system, and the like, not only the strength of the sound pressure but also the position can be determined. In a wide free space with enough space, it is desirable to determine the noise source for each frequency from the entire space using a microphone array system. In a case where the area is limited such as in a duct, the noise source can be determined by a small intensity probe or a PU probe.

Here, although one sheet member 12 and one sound absorbing body 20 are provided in the example shown in FIG. 1, two or more sheet members 12 and/or two or more sound absorbing bodies 20 may be provided.

Figure 9:
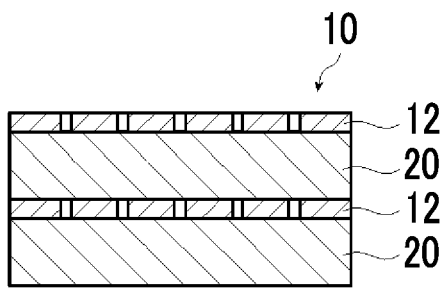
FIG. 9 is a cross-sectional view conceptually showing another example of the soundproof structure of the present invention.
Figure 10:
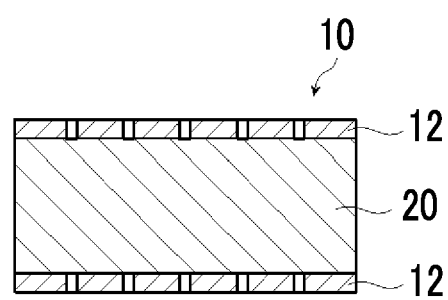
FIG. 10 is a cross-sectional view conceptually showing another example of the soundproof structure of the present invention.

For example, as in an example shown in FIG. 9, two or more sound absorbing bodies 20 and two or more sheet members 12 may be alternately laminated. Alternatively, as in the example shown FIG. 10, the sheet member 12 may be disposed on each of both sides of the sound absorbing body 20. Alternatively, the sound absorbing body 20 may be disposed on each of both sides of the sheet member 12.

It is preferable in that the sheet member can be prevented from being broken or damaged by making the sheet member interposed between the sound absorbing bodies.

The soundproof structure according to the embodiment of the present invention may have a wall member on a surface of the sound absorbing body on the opposite side to the sheet member.

Figure 11:
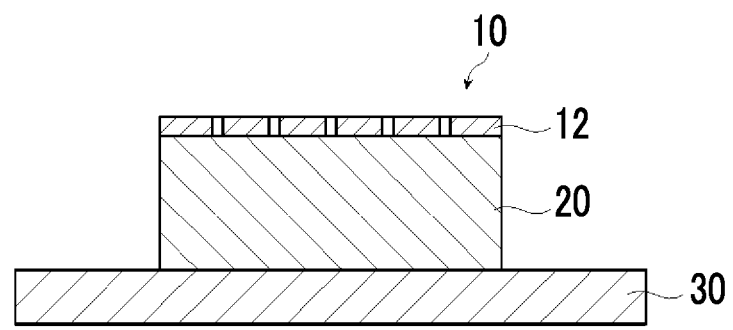
FIG. 11 is a cross-sectional view conceptually showing another example of the soundproof structure of the present invention.

In an example shown in FIG. 11, the soundproof structure 10 has the sheet member 12, the sound absorbing body 20, and a wall member 30 in this order. The sound absorbing body 20 and the wall member 30 are disposed in contact with each other.

Figure 12:
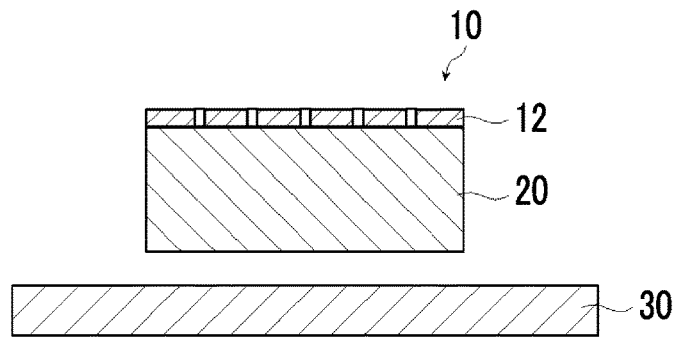
FIG. 12 is a cross-sectional view conceptually showing another example of the soundproof structure of the present invention.

In an example shown in FIG. 12, the soundproof structure 10 has the sheet member 12, the sound absorbing body 20, and the wall member 30 in this order. The sound absorbing body 20 and the wall member 30 are disposed apart from each other by a predetermined distance.

The wall member 30 is a plate-shaped member that can be substantially regarded as a rigid body.

The wall member 30 is not limited, but the wall, floor, and ceiling of a building, a sheet metal or floor of a transportation machine such as a car, a plate of general furniture such as a desk, a soundproof wall, a road, a plate such as a partition, the surface of home appliances, the surface of office equipment, an internal duct, an industrial machine surface, a metal plate, and the like can be mentioned. Since the acoustic impedance of air and the acoustic impedance of solids are greatly different for most materials, the surface reflection is very large regardless of the material, such as metal, plastic, and wood. Therefore, wall members formed of these materials can be substantially regarded as rigid bodies.

As described above, since the wall member 30 is provided, the sound transmitted through the sheet member 12 and the sound absorbing body 20 is totally reflected by the wall member 30 and is incident on the sound absorbing body 20 and the sheet member 12 again. Therefore, the sound absorbing performance can be further improved.

From the viewpoint of sound absorbing performance, it is preferable that the sound absorbing body 20 and the wall member 30 are in contact with each other. That is, it is preferable that the space between the sheet member 12 and the wall member 30 is filled with the sound absorbing body 20. In addition, the sound absorbing body 20 and the wall member 30 may be partially in contact with each other.

In the case of a configuration having the wall member 30, the distance between the sheet member 12 and the wall member 30 is preferably less than 35 cm.

In the case of the configuration having the wall member 30, the sound pressure is maximized at the position of the wall member. Therefore, the particle speed is the minimum and the sound pressure is the maximum at a position spaced apart from there by a half wavelength $\lambda/2$. As described above, the sheet member absorbs the energy of the sound passing through the formed through-hole instead of the frictional heat. For this reason, at a position where the sheet member is disposed, the absorption of sound having a frequency at which the particle speed decreases is reduced. That is, the absorption of sound having a frequency at which the distance between the sheet member and the wall member is $\lambda/2+n\times\lambda/2$ (n is an integer of 0 or more) is reduced. For example, assuming that the distance between the sheet member and the wall member is 34.3 cm, since this matches $\lambda/2+n\times\lambda/2$ for the wavelength of the sound having frequencies of 500 Hz, 1000 Hz, 1500 Hz, 2000 Hz, ..., the absorption of sound having these frequencies is reduced. Therefore, by setting the distance between the sheet member and the wall member to less than 35 cm, a reduction in the absorption of sound having a frequency smaller than 500 Hz can be suppressed.

From the viewpoint of increasing the absorption of sound in the audible range, the smaller the distance between the sheet member and the wall member, the better. The distance between the sheet member and the wall member is preferably 17.1 cm (corresponding to 1000 Hz) or less, more preferably 8.5 cm (corresponding to 2000 Hz) or less, even more preferably 6.9 cm (corresponding to 2500 Hz) or less, particularly preferably 1.7 cm (corresponding to 10000 Hz) or less, and most preferably 0.85 cm (corresponding to 20000 Hz) or less.

Figure 13:
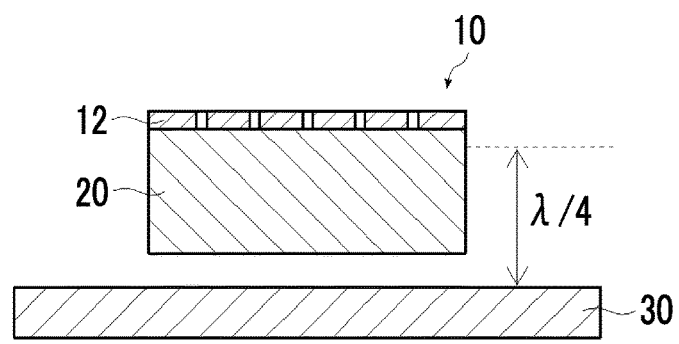
FIG. 13 is a cross-sectional view conceptually showing another example of the soundproof structure of the present invention.

In the case of the configuration having the wall member 30, the particle speed is maximized at a position spaced apart from the position of the wall member 30 by ¼ wavelength ($\lambda/4$). In a case where the sheet member 12 or the sound absorbing body 20 is present at a position where the particle speed is maximized, the absorption of sound having a frequency corresponding to the wavelength increases. From this point, as shown in FIG. 13, it is preferable that at least one of the sheet member 12 or the sound absorbing body 20 is present at a position spaced apart from the position of the wall member 30 by ¼ wavelength ($\lambda/4$) for the wavelength $\lambda$ of the frequency of the sound to be soundproofed.

In particular, it is preferable that the sheet member 12 is present at a position spaced apart from the position of the wall member 30 by ¼ wavelength ($\lambda/4$). In this manner, the effect of absorption by the through-hole of the sheet member 12 can be increased for the sound having a frequency corresponding to the wavelength.

Also in a case where the wall members 30 is disposed apart from the sheet member 12, it is preferable that at least one of the sheet member 12 or the sound absorbing body 20 is present at a position spaced apart from the position of the wall member 30 by ¼ wavelength ($\lambda/4$).

In addition, in the configuration having the wall member 30, the sheet member 12, the sound absorbing body 20, and the wall member 30 may be formed as an integrated cell structure.

That is, by adopting a movable shape for a structure in which the wall member 30, the sound absorbing body 20, and the sheet member 12 are in contact with each other, the structure can be used as a portable sound absorbing board or sound absorbing cell. Specifically, the structure is a structure in which a sound absorbing body is bonded to a plastic or metal plate (wall member) and a sheet member having micro through-holes is attached to the surface of the sound absorbing body, and it is possible to form a cell that can be carried by making the plastic or metal plate thin. A plurality of such cells are arranged and attached to a wall or the like to function as a sound absorbing panel or a sound adjusting panel. The sound absorbing panel is intended for sound absorption, and is used, for example, in a conference room or a store to remove noise in order to clarify the sound. In addition, the sound adjusting panel is used to adjust the sound by adjusting the absorption or diffusion of the sound. For example, the sound adjusting panel is used to adjust the sound of a concert hall.

In addition, a cell in which a sound absorbing body and a sheet member having micro through-holes are attached to a plastic or metal plate with a smaller size of several centimeters can be used as a soundproof cell that is disposed in a duct, an air supply unit, and the like of various apparatuses to obtain the soundproofing performance. Thus, by also including the wall member in the integrated cell structure, it is possible to obtain the soundproofing performance without caring about the distance between the sound absorbing body and the wall member at the time of installation.

At this time, it is preferable that at least one of surfaces not in contact with the wall member, among the surfaces of the sound absorbing body, is in contact with the sheet member. That is, it is preferable that the sheet member is in contact with the sound absorbing body and is disposed on the outermost surface.

Figure 14:
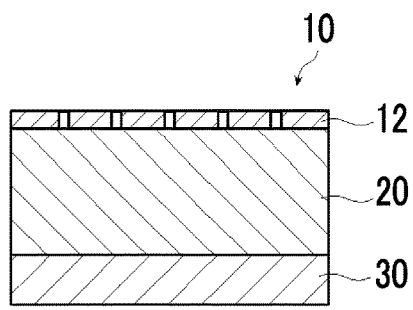
FIG. 14 is a cross-sectional view conceptually showing another example of the soundproof structure of the present invention.

In addition, as shown in FIG. 14, it is preferable that one of the outermost surfaces is the sheet member 12 and a surface facing a surface on the sheet member 12 side is the wall member 30.

Figure 15:
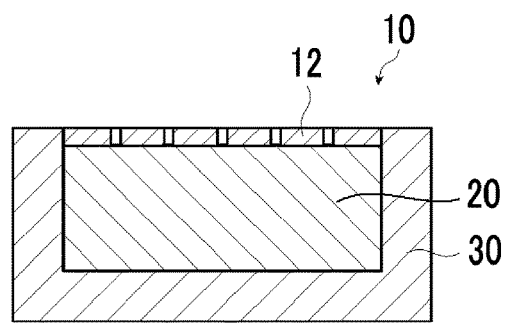
FIG. 15 is a cross-sectional view conceptually showing another example of the soundproof structure of the present invention.

Alternatively, as in the example shown FIG. 15, all of the outermost surfaces may be either the sheet member 12 or the wall member 30. In the example shown in FIG. 15, one of the outermost surfaces is the sheet member 12 and the other outermost surfaces are the wall member 30.

Figure 16:
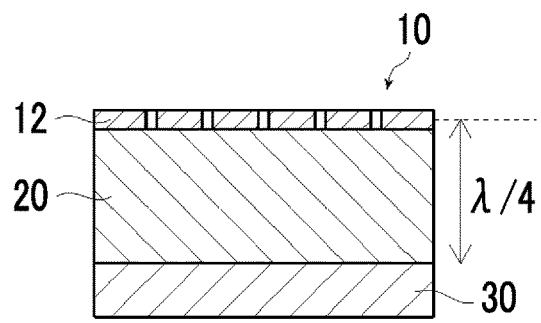
FIG. 16 is a cross-sectional view conceptually showing another example of the soundproof structure of the present invention.
Figure 17:
FIG. 17 is a schematic cross-sectional view illustrating an example of an appropriate method of manufacturing a sheet member.
Figure 18:
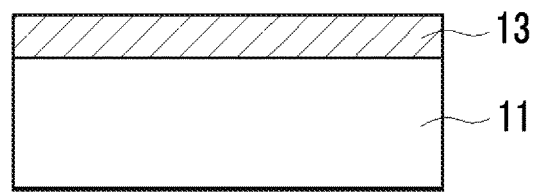
FIG. 18 is a schematic cross-sectional view illustrating an example of an appropriate method of manufacturing a sheet member.

In addition, as shown in FIG. 16, even in a case where the sheet member 12, the sound absorbing body 20, and the wall member 30 are formed as a cell structure, it is preferable that the distance between the sheet member 12 and the wall member is a ¼ wavelength of the frequency of the sound to be soundproofed.

[Method of Manufacturing a Sheet Member]

Next, a method of manufacturing a sheet member will be described with a case using a plate-shaped aluminum base material as an example.

The method of manufacturing a sheet member using an aluminum base material has a coating film forming step for forming a coating film containing aluminum hydroxide as a main component on the surface of the aluminum base material, a through-hole forming step for forming a through-hole by performing through-hole forming treatment after the coating film forming step, and a coating film removing step for removing the aluminum hydroxide coating film after the through-hole forming step.

By having the coating film forming step, the through-hole forming step, and the coating film removing step, it is possible to appropriately form through-holes having an average opening diameter of 0.1 μm or more and less than 100 μm.

<Aluminum Base Material>

The aluminum base material used as a sheet member is not particularly limited. For example, known aluminum base materials, such as Alloy Nos. 1085, 1N30, and 3003 described in JIS standard H4000, can be used. The aluminum base material is an alloy plate containing aluminum as a main component and containing a small amount of different element.

The thickness of the aluminum base material is not particularly limited, and is preferably 5 μm to 1000 μm, more preferably 7 μm to 200 μm, and particularly preferably 10 μm to 100 μm.

Next, each step of the method of manufacturing a sheet member will be described with reference to FIGS. 18 to 22, and then each step will be described in detail.

FIGS. 17 to 21 are schematic cross-sectional views showing an example of a preferred embodiment of the method of manufacturing a soundproof structure using an aluminum base material.

Figure 19:
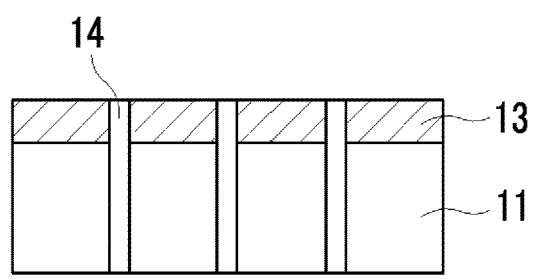
FIG. 19 is a schematic cross-sectional view illustrating an example of an appropriate method of manufacturing a sheet member.
Figure 20:
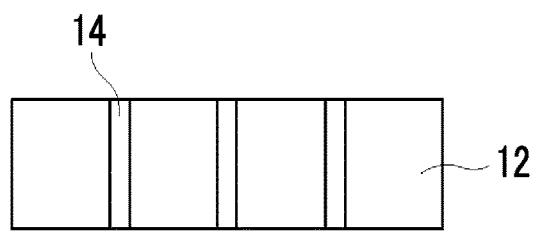
FIG. 20 is a schematic cross-sectional view illustrating an example of an appropriate method of manufacturing a sheet member.

As shown in FIGS. 17 to 21, the method of manufacturing a soundproof structure is a manufacturing method having a coating film forming step in which coating film forming treatment is performed on one main surface of an aluminum base material 11 to form an aluminum hydroxide coating film 13 (FIGS. 17 and 18), a through-hole forming step in which the through-holes 14 are formed by performing electrolytic dissolution treatment after the coating film forming step so that through-holes are formed in the aluminum base material 11 and the aluminum hydroxide coating film 13 (FIGS. 18 and 19), and a coating film removing step in which the aluminum hydroxide coating film 13 is removed after the through-hole forming step to manufacture a soundproof structure formed by the sheet member 12 having the through-holes 14 (FIGS. 19 and 20).

Figure 21:
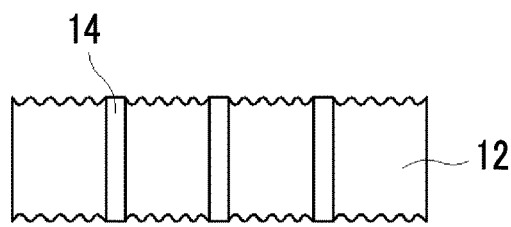
FIG. 21 is a schematic cross-sectional view illustrating an example of an appropriate method of manufacturing a sheet member.

In the method of manufacturing a soundproof structure, it is preferable to have a surface roughening treatment step for roughening the surface of the sheet member 12 by performing electrochemical surface roughening treatment on the sheet member 12 having the through-holes 14 after the coating film removing step (FIGS. 20 and 21).

Small holes are easily formed in the aluminum hydroxide coating film. Therefore, by forming through-holes by performing electrolytic dissolution treatment in the through-hole forming step after the coating film forming step for forming the aluminum hydroxide coating film, it is possible to form through-holes having an average opening diameter of 0.1 μm or more and less than 100 μm.

[Coating Film Forming Step]

In the present invention, the coating film forming step included in the method of manufacturing a sheet member is a step of forming an aluminum hydroxide coating film by performing coating film forming treatment on the surface of the aluminum base material.

<Coating Film Forming Treatment>

The above-described coating film forming treatment is not particularly limited. For example, the same treatment as the conventionally known aluminum hydroxide coating film forming treatment can be performed.

As the coating film forming treatment, for example, conditions or apparatuses described in the paragraphs of <0013> to <0026> of JP2011-201123A can be appropriately adopted.

In the present invention, the conditions of the coating film forming treatment change according to the electrolyte to be used and accordingly cannot be unconditionally determined. In general, however, it is appropriate that the electrolyte concentration is 1% to 80% by mass, the liquid temperature is 5° C. to 70° C., the current density is 0.5 to 60 A/dm$^2$, the voltage is 1 to 100 V, and the electrolysis time is 1 second to 20 minutes, and these are adjusted so as to obtain a desired amount of coating film.

In the present invention, it is preferable to perform electrochemical treatment using nitric acid, hydrochloric acid, sulfuric acid, phosphoric acid, oxalic acid, or mixed acids of two or more of these acids as an electrolyte.

In the case of performing electrochemical treatment in the electrolyte containing nitric acid and hydrochloric acid, a direct current may be applied between the aluminum base material and the counter electrode, or an alternating current may be applied. In the case of applying a direct current to the aluminum base material, the current density is preferably 1 to 60 A/dm$^2$, and more preferably 5 to 50 A/dm$^2$. In the case of continuously performing the electrochemical treatment, it is preferable to perform the electrochemical treatment using a liquid power supply method for supplying electric power to the aluminum base material through the electrolyte.

In the present invention, the amount of the aluminum hydroxide coating film formed by the coating film forming treatment is preferably 0.05 to 50 g/m$^2$, and more preferably 0.1 to 10 g/m$^2$.

[Through-Hole Forming Step]

The through-hole forming step is a step of forming through-holes by performing electrolytic dissolution treatment after the coating film forming step.

<Electrolytic Dissolution Treatment>

The electrolytic dissolution treatment is not particularly limited, and a direct current or an alternating current may be used, and an acidic solution may be used as the electrolyte. Among these, it is preferable to perform electrochemical treatment using at least one acid of nitric acid or hydrochloric acid, and it is more preferable to perform electrochemical treatment using mixed acids of at least one or more of sulfuric acid, phosphoric acid, or oxalic acid in addition to these acids.

In the present invention, as an acidic solution that is an electrolyte, in addition to the above-mentioned acids, electrolytes described in U.S. Pat. Nos. 4,671,859B, 4,661,219B, 4,618,405B, 4,600,482B, 4,566,960B, 4,566,958B, 4,566,959B, 4,416,972B, 4,374,710B, 4,336,113B, 4,184,932B, and the like can also be used.

The concentration of the acidic solution is preferably 0.1% to 2.5% by mass, and particularly preferably 0.2% to 2.0% by mass. The solution temperature of the acidic solution is preferably 20° C. to 80° C., more preferably 30° C. to 60° C.

As the above-described acid based aqueous solution, it is possible to use an aqueous solution of acid having a concentration of 1 to 100 g/L in which at least one of a nitric acid compound having nitrate ions, such as aluminum nitrate, sodium nitrate, and ammonium nitrate, a hydrochloric acid compound having hydrochloric acid ions, such as aluminum chloride, sodium chloride, and ammonium chloride, or a sulfuric acid compound having sulfate ions, such as aluminum sulfate, sodium sulfate, and ammonium sulfate, is added in a range of 1 g/L to saturation.

In addition, metals contained in aluminum alloys, such as iron, copper, manganese, nickel, titanium, magnesium, and silica, may be dissolved in the above-described acid based aqueous solution. A solution obtained by adding aluminum chloride, aluminum nitrate, aluminum sulfate, or the like to an aqueous solution having an acid concentration of 0.1% to 2% by mass so that the concentration of aluminum ions is 1 to 100 g/L is preferably used.

In the electrochemical dissolution treatment, a direct current is mainly used. However, in the case of using an alternating current, the AC power supply wave is not particularly limited, and a sine wave, a rectangular wave, a trapezoidal wave, a triangular wave, and the like are used. Among these, a rectangular wave or a trapezoidal wave is preferable, and a trapezoidal wave is particularly preferable.

(Nitric Acid Electrolysis)

In the present invention, it is possible to easily form through-holes having an average opening diameter of 0.1 μm or more and less than 100 μm by electrochemical dissolution treatment using a nitric acid based electrolyte (hereinafter, also abbreviated as "nitric acid dissolution treatment").

Here, for the reason that it is easy to control the melting point of the through-hole formation, the nitric acid dissolution treatment is preferably an electrolytic treatment performed under the conditions that a direct current is used and the average current density is 5 A/dm$^2$ or more and the electric quantity is 50 C/dm$^2$ or more. The average current density is preferably 100 A/dm$^2$ or less, and the electric quantity is preferably 10000 C/dm$^2$ or less.

The concentration or temperature of the electrolyte in the nitric acid electrolysis is not particularly limited, and electrolysis can be performed at 30° C. to 60° C. using a nitric acid electrolyte having a high concentration, for example, a nitric acid concentration of 15% to 35% by mass, or electrolysis can be performed at a high temperature, for example, 80° C. or more, using a nitric acid electrolyte having a nitric acid concentration of 0.7% to 2% by mass.

In addition, electrolysis can be performed by using an electrolyte in which at least one of sulfuric acid, oxalic acid, or phosphoric acid having a concentration of 0.1% to 50% by mass is mixed in the nitric acid electrolyte.

(Hydrochloric Acid Electrolysis)

In the present invention, it is also possible to easily form through-holes having an average opening diameter of 1 μm or more and less than 100 μm by electrochemical dissolution treatment using a hydrochloric acid based electrolyte (hereinafter, also abbreviated as "hydrochloric acid dissolution treatment").

Here, for the reason that it is easy to control the melting point of the through-hole formation, the hydrochloric acid dissolution treatment is preferably an electrolytic treatment performed under the conditions that a direct current is used and the average current density is 5 A/dm$^2$ or more and the electric quantity is 50 C/dm$^2$ or more. The average current density is preferably 100 A/dm$^2$ or less, and the electric quantity is preferably 10000 C/dm$^2$ or less.

The concentration or temperature of the electrolyte in the hydrochloric acid electrolysis is not particularly limited, and electrolysis can be performed at 30° C. to 60° C. using a hydrochloric acid electrolyte having a high concentration, for example, a hydrochloric acid concentration of 10% to 35% by mass, or electrolysis can be performed at a high temperature, for example, 80° C. or more, using a hydrochloric acid electrolyte having a hydrochloric acid concentration of 0.7% to 2% by mass.

In addition, electrolysis can be performed by using an electrolyte in which at least one of sulfuric acid, oxalic acid, or phosphoric acid having a concentration of 0.1% to 50% by mass is mixed in the hydrochloric acid electrolyte.

[Coating Film Removing Step]

The film removing step is a step of performing chemical dissolution treatment to remove the aluminum hydroxide coating film.

In the coating film removing step, for example, the aluminum hydroxide coating film can be removed by performing an acid etching treatment or an alkali etching treatment to be described later.

<Acid Etching Treatment>

The above-described dissolution treatment is a treatment of dissolving the aluminum hydroxide coating film using a solution that preferentially dissolves aluminum hydroxide rather than aluminum (hereinafter, referred to as "aluminum hydroxide solution").

Here, as the aluminum hydroxide solution, for example, an aqueous solution containing at least one selected from the group consisting of nitric acid, hydrochloric acid, sulfuric acid, phosphoric acid, oxalic acid, a chromium compound, a zirconium compound, a titanium compound, a lithium salt, a cerium salt, a magnesium salt, sodium silicofluoride, zinc fluoride, a manganese compound, a molybdenum compound, a magnesium compound, a barium compound, and a halogen alone is preferable.

Specifically, examples of the chromium compound include chromium oxide (III) and chromium anhydride (VI) acid.

Examples of the zirconium based compound include zirconium fluoride, zirconium fluoride, and zirconium chloride.

Examples of the titanium compound include titanium oxide and titanium sulfide.

Examples of the lithium salt include lithium fluoride and lithium chloride.

Examples of the cerium salt include cerium fluoride and cerium chloride.

Examples of the magnesium salt include magnesium sulfide.

Examples of the manganese compound include sodium permanganate and calcium permanganate.

Examples of the molybdenum compound include sodium molybdate.

Examples of the magnesium compound include magnesium fluoride and pentahydrate.

Examples of the barium compound include barium oxide, barium acetate, barium carbonate, barium chlorate, barium chloride, barium fluoride, barium iodide, barium lactate, barium oxalate, barium oxalate, barium perchlorate, barium selenate, selenite barium, barium stearate, barium sulfite, barium titanate, barium hydroxide, barium nitrate, and hydrates thereof.

Among the barium compounds, barium oxide, barium acetate, and barium carbonate are preferable, and barium oxide is particularly preferable.

Examples of halogen alone include chlorine, fluorine, and bromine.

Among these, it is preferable that the aluminum hydroxide solution is an aqueous solution containing an acid, and examples of the acid include nitric acid, hydrochloric acid, sulfuric acid, phosphoric acid, and oxalic acid and a mixture of two or more acids may be used.

The acid concentration is preferably 0.01 mol/L or more, more preferably 0.05 mol/L or more, and even more preferably 0.1 mol/L or more. There is no particular upper limit, but in general it is preferably 10 mol/L or less, and more preferably 5 mol/L or less.

The dissolution treatment is performed by bringing the aluminum base material on which the aluminum hydroxide coating film is formed into contact with the solution described above. The method of contacting is not particularly limited, and examples thereof include an immersion method and a spray method. Among these, the immersion method is preferable.

The immersion treatment is a treatment of immersing an aluminum base material on which an aluminum hydroxide coating film is formed into the solution described above. Stirring during immersion treatment is preferably performed since uniform treatment is performed.

The immersion treatment time is preferably 10 minutes or more, more preferably 1 hour or more, and even more preferably 3 hours or more or 5 hours or more.

<Alkali Etching Treatment>

The alkali etching treatment is a treatment for dissolving the surface layer by bringing the aluminum hydroxide coating film into contact with an alkali solution.

Examples of the alkali used in the alkali solution include caustic alkali and alkali metal salts. Specifically, examples of the caustic alkali include sodium hydroxide (caustic soda) and caustic potash. Examples of the alkali metal salt include: alkali metal silicates such as sodium metasilicate, sodium silicate, potassium metasilicate, and potassium silicate; alkali metal carbonates such as sodium carbonate and potassium carbonate; alkali metal aluminates such as sodium aluminate and potassium aluminate; alkali metal aldonic acid salts such as sodium gluconate and potassium gluconate; and alkali metal hydrogenphosphate such as secondary sodium phosphate, secondary potassium phosphate, tertiary sodium phosphate, and tertiary potassium phosphate. Among these, a solution containing caustic alkali and a solution containing both caustic alkali and alkali metal aluminate are preferable from the viewpoint of high etching speed and low cost. In particular, an aqueous solution of sodium hydroxide is preferred.

The concentration of the alkali solution is preferably 0.1% to 50% by mass, and more preferably 0.2% to 10% by mass. In a case where aluminum ions are dissolved in the alkali solution, the concentration of aluminum ions is preferably 0.01% to 10% by mass, and more preferably 0.1% to 3% by mass. The temperature of the alkali solution is preferably 10° C. to 90° C. The treatment time is preferably 1 to 120 seconds.

Examples of the method of bringing the aluminum hydroxide coating film into contact with the alkali solution include a method in which an aluminum base material having an aluminum hydroxide coating film formed thereon is made to pass through a tank containing an alkali solution, a method in which an aluminum base material having an aluminum hydroxide coating film formed thereon is immersed in a tank containing an alkali solution, and a method in which an alkali solution is sprayed onto the surface (aluminum hydroxide coating film) of an aluminum base material on which an aluminum hydroxide coating film is formed.

[Surface Roughening Treatment Step]

In the present invention, any surface roughening treatment step which may be included in the method of manufacturing a sheet member is a step of roughening the front surface or the back surface of the aluminum base material by performing electrochemical roughening treatment (hereinafter, also abbreviated as "electrolytic surface roughening treatment") on the aluminum base material from which the aluminum hydroxide coating film has been removed.

In the embodiment described above, the surface roughening treatment is performed after forming through-holes. However, the present invention is not limited thereto, and through-holes may be formed after the surface roughening treatment.

In the present invention, the surface can be easily roughened by electrochemical surface roughening treatment (hereinafter, also abbreviated as "nitric acid electrolysis") using a nitric acid based electrolyte.

Alternatively, the surface can also be roughened by electrochemical surface roughening treatment (hereinafter, also abbreviated as "hydrochloric acid electrolysis") using a hydrochloric acid based electrolyte.

[Metal Coating Step]

In the present invention, for the reason that the average opening diameter of the through-hole formed by the above-described electrolytic dissolution treatment can be adjusted to a small range of about 0.1 µm to 20 µm, it is preferable that the method of manufacturing a sheet member has a metal coating step for coating a part or entirety of the surface of the aluminum base material including at least the inner wall of the through-hole with a metal other than aluminum after the coating film removing step described above.

Here, "coating a part or entirety of the surface of the aluminum base material including at least the inner wall of the through-hole with a metal other than aluminum" means that at least the inner wall of the through-hole in the entire surface of the aluminum base material including the inner wall of the through-hole is coated. A surface other than the inner wall may not be coated, or a part or entirety of the surface other than the inner wall may be coated.

In the metal coating step, for example, substitution treatment and plating treatment to be described later are performed on the aluminum base material having through-holes.

<Substitution Treatment>

The above-described substitution treatment is a treatment for performing substitution plating of zinc or zinc alloy on a part or entirety of the surface of the aluminum base material including at least the inner wall of the through-hole.

Examples of the substitution plating solution include a mixed solution of sodium hydroxide of 120 g/L, zinc oxide of 20 g/L, crystalline ferric chloride of 2 g/L, Rossel salt of 50 g/L, and sodium nitrate of 1 g/L. Commercially available Zn or Zn alloy plating solution may be used. For example, substars Zn-1, Zn-2, Zn-3, Zn-8, Zn-10, Zn-111, Zn-222, and Zn-291 manufactured by Okuno Pharmaceutical Industries can be used.

The time of immersion of the aluminum base material in such a substitution plating solution is preferably 15 seconds to 40 seconds, and the immersion temperature is preferably 20° C. to 50° C.

<Plating Treatment>

In a case where zinc or zinc alloy is substituted for plating on the surface of the aluminum base material by the substitution treatment described above to form a zinc coating film, for example, it is preferable to perform plating treatment in which the zinc coating film is substituted to nickel by electrolytic plating to be described later and then various metals are precipitated by electrolytic plating to be described later.

(Electroless Plating Treatment)

As a nickel plating solution used for the electroless plating treatment, commercially available products can be widely used. For example, an aqueous solution containing nickel sulfate of 30 g/L, sodium hypophosphite of 20 g/L, and ammonium citrate of 50 g/L can be mentioned.

In addition, examples of the nickel alloy plating solution include an Ni—P alloy plating solution in which a phosphorus compound is used as a reducing agent or an Ni—B plating solution in which a boron compound is used as a reducing agent.

The immersion time in such a nickel plating solution or nickel alloy plating solution is preferably 15 seconds to 10 minutes, and the immersion temperature is preferably 30° C. to 90° C.

(Electrolytic Plating Treatment)

As a plating solution in the case of electroplating Cu as an example of electrolytic plating treatment, for example, a plating solution obtained by adding sulfuric acid Cu of 60 to 110 g/L, sulfuric acid of 160 to 200 g/L, and hydrochloric acid of 0.1 to 0.15 mL/L to pure water and adding Toprutina SF base WR of 1.5 to 5.0 mL/L, Toprutina SF-B of 0.5 to 2.0 mL/L, and Toprutina SF leveler of 3.0 to 10 mL/L, which are manufactured by Okuno Pharmaceutical Co., Ltd., as additives can be mentioned.

The immersion time in such a copper plating solution depends on the thickness of the Cu film and accordingly is not particularly limited. For example, in a case where a Cu film having a thickness of 2 μm is applied, immersion for about 5 minutes at a current density of 2 A/dm$^2$ is preferable, and the immersion temperature is preferably 20° C. to 30° C.

[Washing Treatment]

In the present invention, it is preferable to perform washing after the end of each treatment step described above. Pure water, well water, tap water, and the like can be used for washing. A nipping apparatus may be used to prevent the inflow of treatment solution to the next step.

Such a sheet member may be manufactured by using a cut sheet-shaped aluminum base material, or may be manufactured by roll-to-roll (hereinafter, also referred to as RtoR).

As is well known, RtoR is a manufacturing method in which a raw material is pulled out from a roll on which a long raw material is wound, various treatments such as surface treatment are performed while transporting the raw material in the longitudinal direction, and the treated raw material is wound onto the roll again.

In the manufacturing method of forming through-holes in the aluminum base material as described above, it is possible to easily and efficiently form a through-hole of about 20 μm by RtoR.

The method of forming through-holes is not limited to the method described above, and the through-holes may be formed by using a known method depending on a material for forming the sheet member or the like.

For example, in a case where a resin film such as a PET film is used as a plate-shaped sheet member, it is possible to use a processing method for absorbing energy, such as laser processing. In a case where the sheet member can be thinly processed, through-holes can be formed using a method such as mechanical processing by physical contact, such as punching, needle processing, and embossing, or sand blast processing. Alternatively, through-holes can also be formed by applying a resist material to the surface and then performing etching processing after performing lithography on the resist material.

Hereinafter, the physical properties or characteristics of a structural member that can be combined with a soundproof member having the soundproof structure according to the embodiment of the present invention will be described.

[Flame Retardancy, Nonflammability, and Fire Resistance]

In the case of using a soundproof member having the soundproof structure according to the embodiment of the present invention as a soundproof material in a building or an apparatus and a soundproof material for a transportation apparatus, flame retardancy or nonflammability is required.

Therefore, the sheet member is preferably flame retardant or nonflammable. In a case where resin is used as the sheet member, for example, Lumirror (registered trademark) nonhalogen flame-retardant type ZV series (manufactured by Toray Industries, Inc.) that is a flame-retardant PET film, Teijin Tetoron (registered trademark) UF (manufactured by Teijin Ltd.), and/or Dialamy (registered trademark) (manufactured by Mitsubishi Plastics Co., Ltd.) that is a flame-retardant polyester film may be used.

Also in the fiber system, flame retardancy can be given by using a flame retardant fiber, for example, a PEI fiber or a meta-type aramid fiber.

Flame retardancy or nonflammability can also be given by using metal materials, such as aluminum, nickel, tungsten, and copper.

In particular, in a case where the soundproof structure according to the embodiment of the present invention is provided on a wall, the outermost surface is a sheet member. Therefore, even in a case where the lower porous sound absorbing layer does not have flame retardancy or nonflammability, the entire combustion can be prevented by the sheet member having flame retardancy or nonflammability.

In addition, the intermediate layer member can also be made to have higher durability against combustion by selecting an adhesion method having flame retardancy and nonflammability.

As a method of measuring these, there is a method of measuring an oxygen index defined in JIS K 7201 or a method of a combustion test according to UL 94 standard.

Therefore, it is possible to determine the grade of nonflammability, flame retardancy, and fire resistance such as a self-extinguishing property.

[Heat Resistance]

There is a concern that the soundproofing characteristics may be changed due to the expansion and contraction of the structural member of the soundproof structure according to the embodiment of the present invention due to an environmental temperature change. Therefore, the material forming the structural member is preferably a heat resistant material, particularly a material having low heat shrinkage.

In the case of using resin as a sheet member, for example, Teijin Tetoron (registered trademark) film SLA (manufactured by Teijin DuPont Film), PEN film Teonex (registered trademark) (manufactured by Teijin DuPont), and/or Lumirror (registered trademark) off-anneal low shrinkage type (manufactured by Toray Industries, Inc.) are preferably used. In general, it is preferable to use a metal film, such as aluminum having a smaller thermal expansion factor than a plastic material.

[Weather Resistance and Light Resistance]

In a case where the soundproof member having the soundproof structure according to the embodiment of the present invention is disposed outdoors or in a place where light is incident, the weather resistance of the structural member becomes a problem.

Therefore, in a case where resin is used as a sheet member, it is preferable to use a weather-resistant film, such as a special polyolefin film (ARTPLY (registered trademark) (manufactured by Mitsubishi Plastics Inc.)), an acrylic resin film (ACRYPRENE (manufactured by Mitsubishi Rayon Co.)), and/or Scotch Calfilm (trademark) (manufactured by 3M Co.).

In addition, light resistance to ultraviolet light and the like can also be given by using a metal material, such as aluminum. Regarding moisture resistance as well, it is preferable to appropriately select a sheet member having high moisture resistance.

Regarding water absorption and chemical resistance as well, it is preferable to appropriately select a sheet member.

[Dust]

During long-term use, dust may adhere to the sheet member surface to affect the soundproofing characteristics of the soundproof structure according to the embodiment of the present invention. Therefore, it is preferable to prevent the adhesion of dust or to remove adhering dust.

As a method of preventing dust, it is preferable to use the sheet member formed of a material to which dust is hard to adhere. For example, by using a conductive film (Flecria (registered trademark) (manufactured by TDK Corporation) and/or NCF (Nagaoka Sangyou Co., Ltd.)) so that the sheet member is not charged, it is possible to prevent adhesion of dust due to charging. By selecting a sheet member having conductivity like a metal material such as aluminum, it is possible to prevent the adhesion of dust due to static electricity.

It is also possible to suppress the adhesion of dust by using a fluororesin film (Dynoch Film (trademark) (manufactured by 3M Co.)), and/or a hydrophilic film (Miraclain (manufactured by Lifegard Co.)), RIVEX (manufactured by Riken Technology Inc.) and/or SH2CLHF (manufactured by 3M Co.)). By using a photocatalytic film (Raceline (manufactured by Kimoto Corporation)), contamination of the sheet member can also be prevented. A similar effect can also be obtained by applying a spray having the conductivity, hydrophilic property and/or photocatalytic property and/or a spray containing a fluorine compound to the sheet member.

In addition, by forming a hydrophilic surface including the inside of holes by silica coating and forming a hydrophobic surface by fluorine coating and using the hydrophilic surface and the hydrophobic surface at the same time, it is possible to realize anti-contamination coating by which both hydrophilic dirt and hydrophobic dirt are easily peeled off.

In addition to using the special materials described above, it is also possible to prevent contamination by providing a cover on the sheet member. As the cover, it is possible to use a thin film material (Saran Wrap (registered trademark) or the like), a mesh (formed of metal, plastic, or the like) having a mesh size not allowing dust to pass therethrough, a nonwoven fabric, a urethane, an airgel, a porous film, and the like.

For example, by disposing a cover on the sheet member so as to cover the film with a predetermined distance therebetween, it is possible to prevent wind or dust from directly hitting the sheet member.

In a case where a particularly thin film material or the like is used as the cover, the effect of the through-hole is maintained by making the thin film material or the like away from the sheet member without attaching the thin film material or the like to the sheet member, which is desirable.

In addition, in a case where the thin film material is fixed with the thin film material stretched in order to make sound pass through the thin film material without strong film vibration, film vibration tends to occur. For this reason, it is desirable that the thin film material is loosely supported.

As a method of removing adhering dust, it is possible to remove dust by emitting a sound to the sheet member so that the sheet member strongly vibrates. The same effect can be obtained even in a case where a blower or wiping is used.

[Wind Pressure]

In a case where a strong wind hits the sheet member, the sheet member may be pressed to change the resonance frequency. Therefore, by covering the sheet member with a nonwoven fabric, urethane, a fiber material, a mesh material, and/or a film, the influence of wind can be suppressed.

The soundproof structure according to the embodiment of the present invention is not limited to being used in various apparatuses, such as industrial equipment, transportation equipment, and general household equipment described above, and can also be used in a fixed wall, such as a fixed partition structure (partition) that is disposed in a room of a building to partition the inside of the room, and a movable wall, such as a movable partition structure (partition) that is disposed in a room of a building to partition the inside of the room.

Thus, by using the soundproof structure according to the embodiment of the present invention as a partition, it is possible to appropriately shield sound between the partitioned spaces. In particular, in the case of a movable partition, the thin and light structure according to the embodiment of the present invention is advantageous in that the structure is easy to carry.

In addition, the soundproof structure according to the embodiment of the present invention can have light transparency and air permeability by appropriately selecting the type or the thickness of the sound absorbing body, for example, by using glass wool having a small density. Therefore, the soundproof structure according to the embodiment of the present invention can be suitably used as a window member.

Alternatively, the soundproof structure according to the embodiment of the present invention can also be used as a cage that surrounds an apparatus that becomes a noise source, for example, an air conditioner outdoor unit or a water heater, for noise prevention. By surrounding the noise source with the member whose material has been appropriately selected, it is possible to absorb sound while securing heat dissipation and air permeability and accordingly to prevent noise. Radiation is enhanced by selecting a non-metal material for heat dissipation.

In addition, the soundproof structure according to the embodiment of the present invention may be used for a pet breeding cage. By applying the member according to the embodiment of the present invention to the entire pet breeding cage or a part of the pet breeding cage, for example, by replacing one surface of the pet cage with this member, it is possible to obtain the pet cage that is lightweight and has a sound absorption effect. By using this cage, it is possible to protect the pet in the cage from outside noise, and it is possible to suppress the crying sound of the pet in the cage from leaking to the outside.

In addition to those described above, the soundproof structure according to the embodiment of the present invention can be used as the following soundproof members.

For example, as soundproof members having the soundproof structure according to the embodiment of the present invention, it is possible to mention: a soundproof member for building materials (soundproof member used as building materials); a soundproof member for air conditioning equipment (soundproof member installed in ventilation openings, air conditioning ducts, and the like to prevent external noise); a soundproof member for external opening portion (soundproof member installed in the window of a room to prevent noise from indoor or outdoor); a soundproof member for ceiling (soundproof member installed on the ceiling of a room to control the sound in the room); a soundproof member for floor (soundproof member installed on the floor to control the sound in the room); a soundproof member for internal opening portion (soundproof member installed in a portion of the inside door or sliding door to prevent noise from each room); a soundproof member for toilet (soundproof member installed in a toilet or a door (indoor and outdoor) portion to prevent noise from the toilet); a soundproof member for balcony (soundproof member installed on the balcony to prevent noise from the balcony or the adjacent balcony); an indoor sound adjusting member (soundproof member for controlling the sound of the room); a simple soundproof chamber member (soundproof member that can be easily assembled and can be easily moved); a soundproof chamber member for pet (soundproof member that surrounds a pet's room to prevent noise); amusement facilities (soundproof member installed in a game centers, a sports center, a concert hall, and a movie theater); a soundproof member for temporary enclosure for construction site (soundproof member to prevent leakage of noise by covering the construction site); and a soundproof member for tunnel (soundproof member installed in a tunnel to prevent noise leaking to the inside and outside the tunnel).

Soundproof members for transportation apparatuses: a soundproof member installed in vehicles, such as automobiles and trains.

Sound absorbing panels: a soundproof member that is attached to the wall of an office, a meeting room, a house, a room for music, in order to remove noise and clarify necessary sounds such as voice.

Sound adjustment panels: a soundproof member used to change the acoustic performance of a room by being attached to the wall of a room for music, a concert hall, or the like in order to adjust sound absorption or diffusion.

[Simulation 1]

Next, simulation results are shown.

A sheet member having through-holes was modeled according to the Maa Equation. The Maa Equation is for calculating the complex acoustic impedance of a sheet member from the thickness, the opening diameter, and the opening ratio shown in "Potential of microperforated panel absorber. Dah-You Maa. The Journal of Acoustic Society of America 104, 2861 (1998)" by DY Maa. This makes it possible to mathematically model and handle a sheet member having a large number of through-holes.

On the other hand, as a sound absorbing body, glass wool was modeled by Delany-Bazley Equation (DB Equation), and urethane was modeled by Biot model. Nanofibers were modeled using the Limp frame model of the permeate fluid model. Mainly, a fiber system such as a glass wool system was examined, and a unit thickness flow resistance was calculated as 20000 [Pa·s/m$^2$] by DB equation.

These were mounted on the acoustic module of the finite element method calculation software COMSOL ver 5.2a (COMSOL Corporation), and were designed and optimized.

Examination was performed in a state in which the sheet member is in contact with one surface of the sound absorbing body, and examination to find the effective conditions of the sheet member was performed. The transmittance and the reflectivity were respectively calculated in a model in which the above-described structure is disposed in an acoustic tube. Assuming that the incident sound pressure was 1 [Pa], the absorbance was calculated as 1−transmittance−reflectivity.

Figure 22:
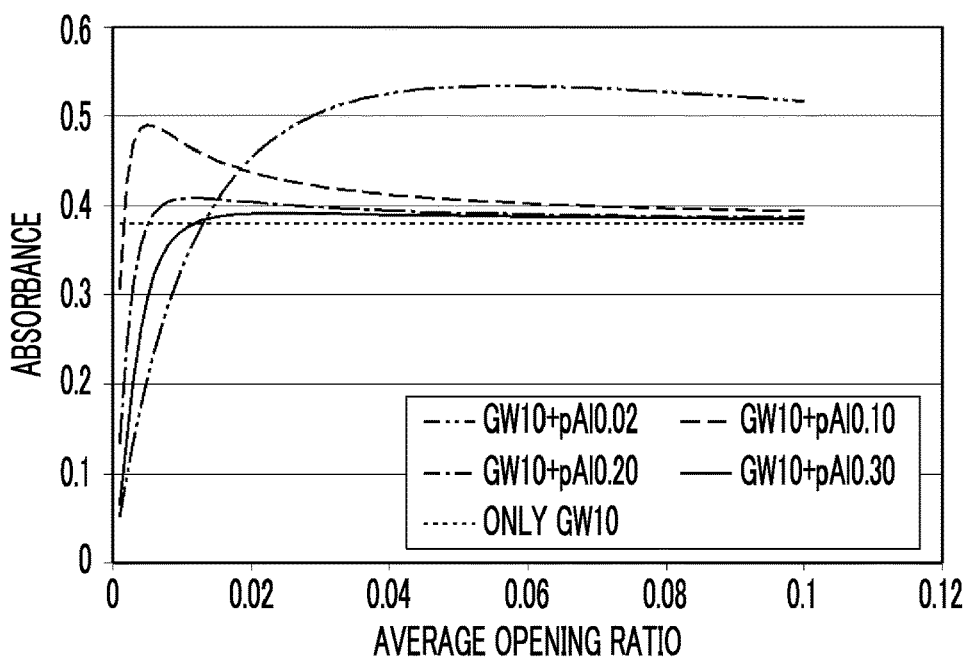
FIG. 22 is a graph showing the relationship between an average opening ratio and an absorbance.

First, for sound with a frequency of 2000 Hz, the absorbance for each average opening ratio was calculated for several average opening diameters. The sound absorbing body was glass wool and had a thickness of 10 mm, and the sheet member was aluminum and had a thickness of 20 μm. FIG. 22 shows results in a case where when the average opening diameter is 20 μm, 100 μm, 200 μm, and 300 μm. In FIG. 22, a case where the sound absorbing body is glass wool and has a thickness of 10 mm is expressed as "GW10", a case where the sheet member is aluminum and the average opening diameter is 20 μm is expressed as "pAl0. 02", a case where the sheet member is aluminum and the average opening diameter is 100 μm is expressed as "pAl0. 10", a case where the sheet member is aluminum and the average opening diameter is 200 μm is expressed as "pAl0. 20", and a case where the sheet member is aluminum and the average opening diameter is 300 μm is expressed as "pAl0. 30".

As shown in FIG. 22, in each of the average opening diameter, there is an average opening ratio at which the absorbance is maximized. Hereinafter, the average opening ratio at which the absorbance is maximized at each average opening diameter is also referred to as an optimal opening ratio. In addition, the absorbance at the optimal opening ratio is also referred to as a maximum absorbance.

Such calculation was performed for each average opening diameter at a frequency of 2000 Hz to calculate the optimal opening ratio and the maximum absorbance. In addition, the parameter A was calculated.

Figure 23:
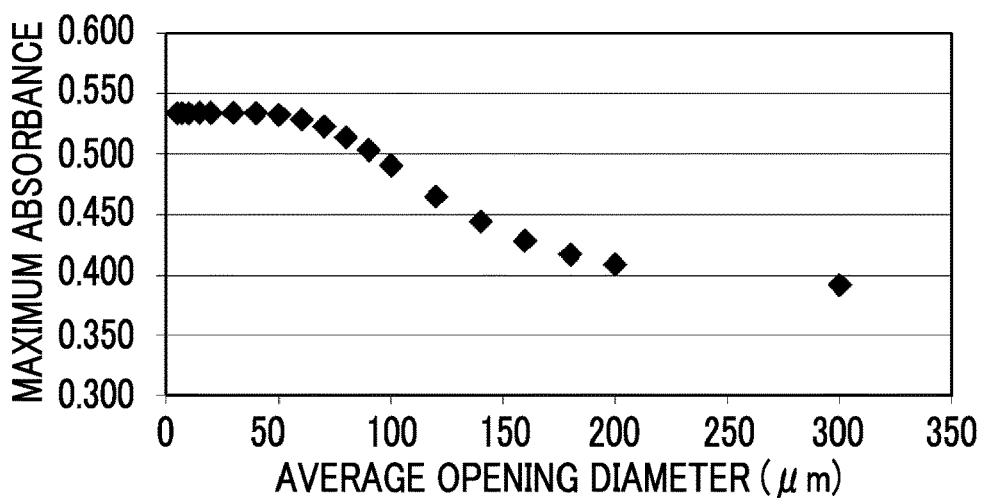
FIG. 23 is a graph showing the relationship between an average opening diameter and a maximum absorbance.

The results are shown in Tables 1 and 2. FIG. 23 is a graph showing the relationship between the average opening diameter and the maximum absorbance, and FIG. 24 is a graph showing the relationship between the average opening diameter and the optimal opening ratio.

TABLE 1

| Average opening diameter μm | Optimal opening ratio | Maximum absorbance | A |
|---|---|---|---|
| 5 | 0.89 | 0.534 | 22.25 |
| 7 | 0.46 | 0.534 | 22.54 |
| 10 | 0.225 | 0.534 | 22.5 |
| 15 | 0.1 | 0.534 | 22.5 |
| 20 | 0.057 | 0.534 | 22.8 |
| 30 | 0.026 | 0.534 | 23.4 |
| 40 | 0.015 | 0.533 | 24 |
| 50 | 0.01 | 0.532 | 25 |
| 60 | 0.007 | 0.528 | 25.2 |
| 70 | 0.006 | 0.523 | 29.4 |
| 80 | 0.0054 | 0.514 | 34.56 |
| 90 | 0.0051 | 0.503 | 41.31 |
| 100 | 0.0051 | 0.49 | 51 |
| 120 | 0.0055 | 0.465 | 79.2 |
| 140 | 0.007 | 0.444 | 137.2 |
| 160 | 0.008 | 0.428 | 204.8 |
| 180 | 0.01 | 0.416 | 324 |
| 200 | 0.012 | 0.408 | 480 |
| 300 | 0.025 | 0.391 | 2250 |

Figure 24:
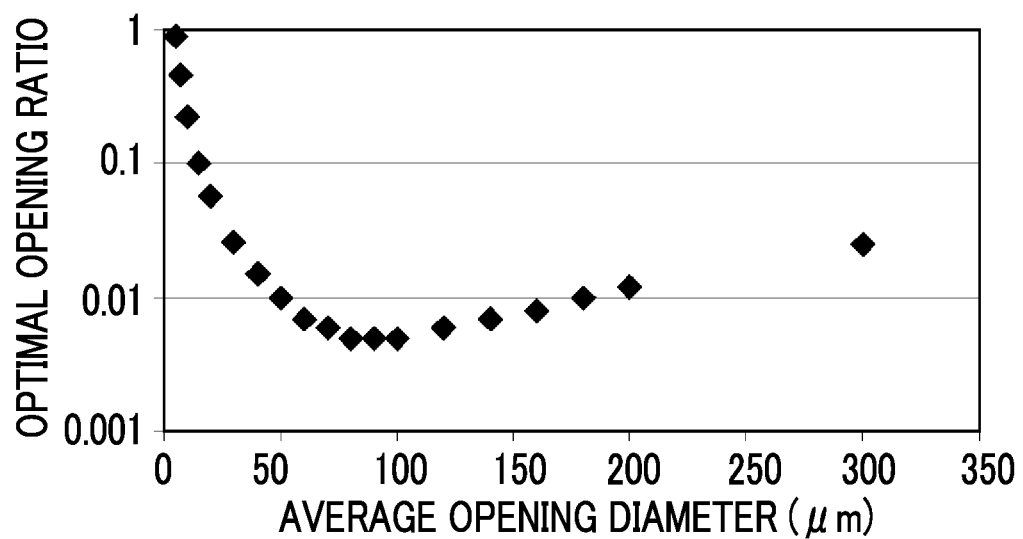
FIG. 24 is a graph showing the relationship between an average opening diameter and an optimal opening ratio.

From Table 1 and FIG. 23 and FIG. 24, it can be seen that the maximum absorbance hardly changes at the average opening diameter of 5 µm to 50 µm and decreases at a diameter larger than 50 µm. In addition, it can be seen that the optimal opening ratio becomes larger as the diameter becomes larger at the average opening diameter of about 100 µm or more but becomes larger as the diameter becomes smaller in a region where the average opening diameter is smaller than 100 µm.

As described above, design was performed to calculate the optimal opening ratio for each average opening diameter. As a result, it was found that there were a region where the optimal opening ratio increased as the average opening diameter increased and a region where the optimal opening ratio increased as the average opening diameter decreased. The sound absorbing characteristics of the through-h0134 oles of the sheet member depends on the fact that the sound passing through the micro through-holes is absorbed by the viscous friction or thermal friction of air. As in the present invention, in a region where the main average opening diameter is several tens of µm, the thickness of a viscous layer generated by the viscous friction of air in the through-hole is almost the same as the through-hole diameter. Therefore, it became clear that, in a case where the average opening diameter was changed, there were a region of "viscous layer thickness<average opening diameter/2" and a region of "viscous layer thickness>average opening diameter/2" and a region of a change of the optimal opening ratio with respect to the average opening diameter was divided due to the difference between the regions.

In a case where the average opening diameter is large, there is a portion through which the sound passes almost without being affected by the friction. On the other hand, in a case where the average opening diameter is small, viscous friction is dominant in the entire through-hole, and this is a region more suitable for friction and sound absorption. Therefore, the region of "viscous layer thickness>average opening diameter/2" has an advantage of sound absorption. This region is called a "viscous resistance region".

Figure 25:
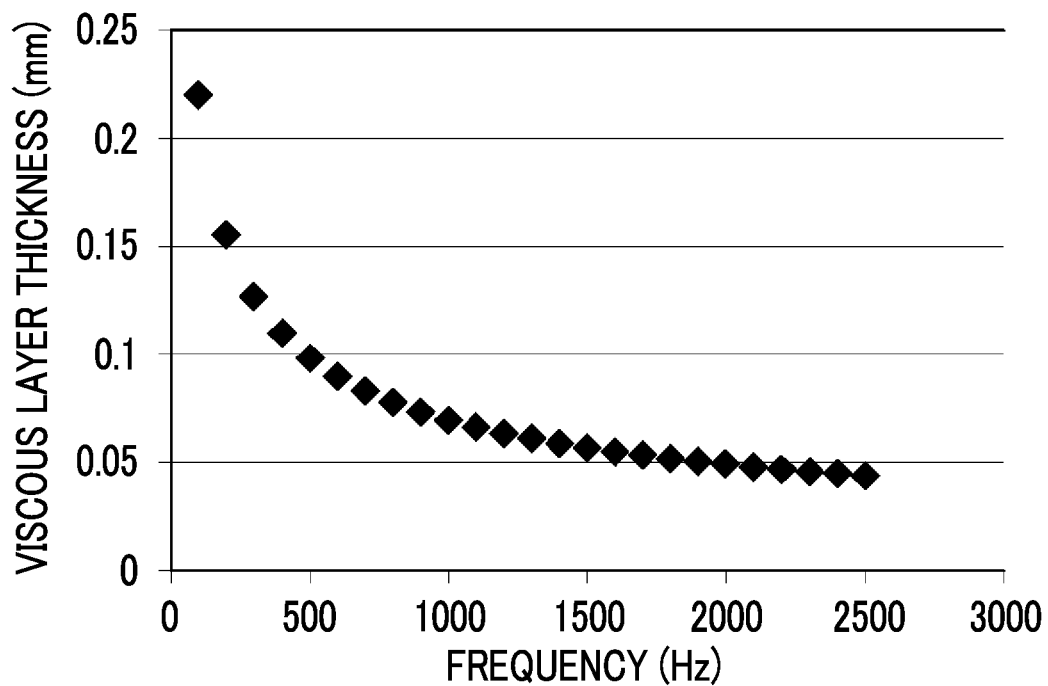
FIG. 25 is a graph showing the relationship between a frequency and a viscous layer thickness.

Here, assuming that the frequency is f, the viscous layer thickness can be calculated by the equation of 0.22 (mm)× √(100 (Hz)/f (Hz)) (FIG. 25).

It can be seen from FIG. 25 that the viscous layer thickness in the case of a frequency of 2000 Hz is about 0.05 mm. In addition, from FIG. 24, in the case of a frequency of 2000 Hz, the average opening diameter at which the region of change of the optimal opening ratio is divided is about 100 µm.

Figure 26:
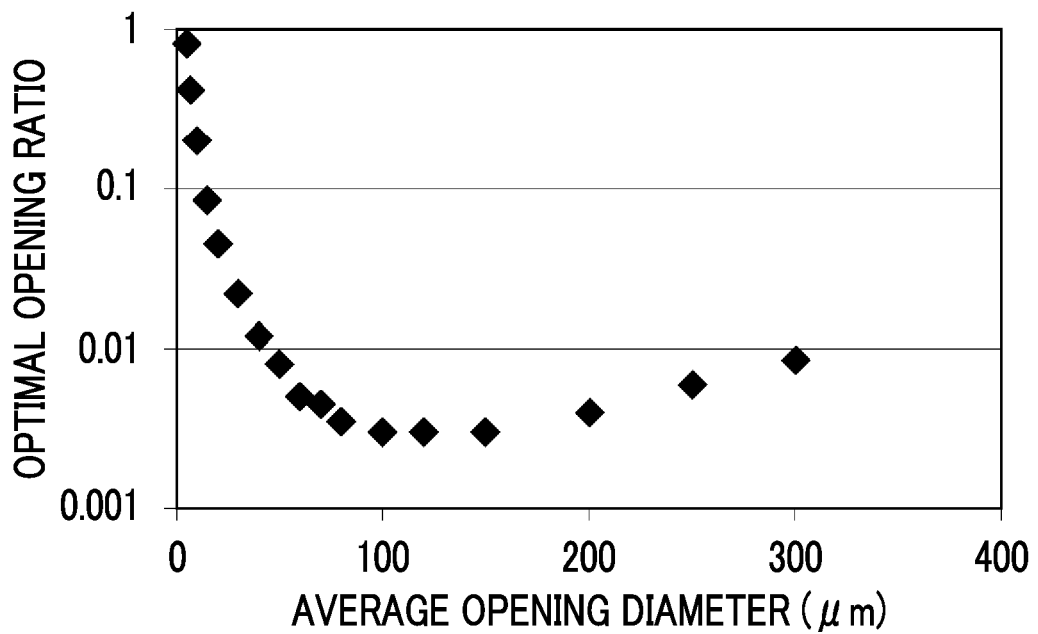
FIG. 26 is a graph showing the relationship between an average opening diameter and an optimal opening ratio.

FIG. 26 shows the result of similarly calculating the relationship between the average opening diameter and the optimal opening ratio for the case of a frequency of 1000 Hz. It can be seen from FIG. 25 that the viscous layer thickness in the case of a frequency of 1000 Hz is about 0.07 mm. In addition, from FIG. 26, in the case of a frequency of 1000 Hz, the average opening diameter at which the region of change of the optimal opening ratio is divided is about 140 µm.

As described above, it also became clear from the simulation that the average opening diameter at which the region where the behavior for the optimal opening ratio changes is divided satisfies "viscous layer thickness=average opening diameter/2".

As a method of calculating the viscous layer thickness, calculation can be analytically performed according to Appendix C of "David T. Blackstock, "fundamentals of physical acoustics", John Wiley & Sons, 2000".

At 2000 Hz, which sounds loud for humans, the viscous layer thickness is 49 µm, and the corresponding average opening diameter is 98 µm. Therefore, in order to obtain large absorption by the viscous resistance region at this frequency, the average opening diameter needs to be less than 100 µm.

In order to make the viscous resistance region up to higher frequencies, the average opening diameter corresponding to the viscous layer thickness of 35 µm at 4000 Hz is preferably 70 µm or less, the average opening diameter corresponding to the viscous layer thickness of 24.5 µm at 8000 Hz is preferably 50 µm or less, the average opening diameter corresponding to the viscous layer thickness of 20 µm at 12000 Hz is preferably 40 µm or less, and the average opening diameter corresponding to the viscous layer thickness of 17 µm at 16000 Hz is preferably 35 µm or less.

Next, the average opening ratio was examined.

As described above, at frequencies of 1000 Hz and 2000 Hz, in a region where the average opening diameter is larger than 50 µm, the optimal opening ratio is about 1%. Accordingly, it can be seen that the optimal opening ratio is small.

Figure 27:
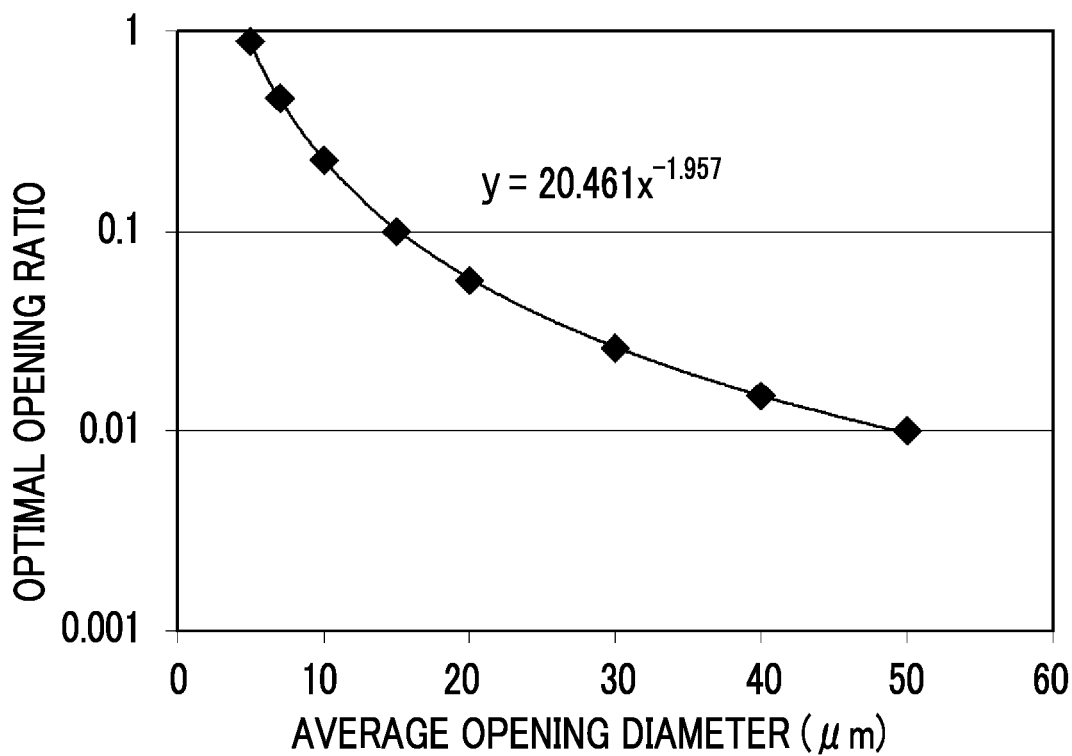
FIG. 27 is a graph showing the relationship between an average opening diameter and an optimal opening ratio.
Figure 28:
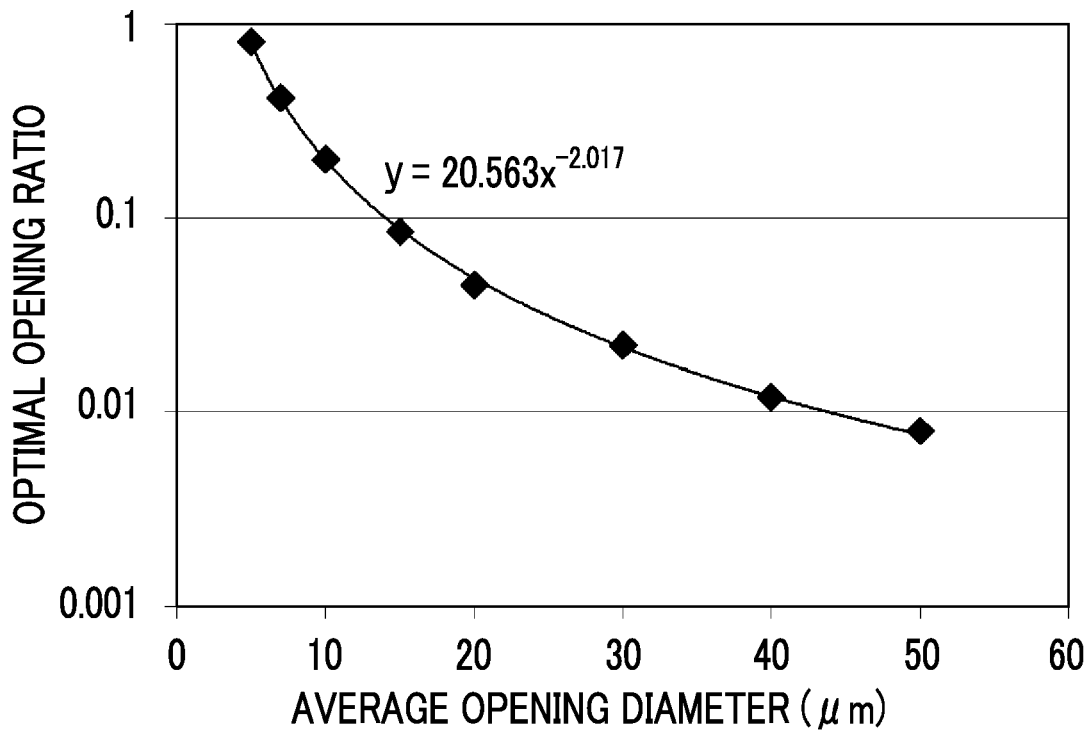
FIG. 28 is a graph showing the relationship between an average opening diameter and an optimal opening ratio.

On the other hand, a region where the average opening diameter was 50 µm or less was examined in more detail. FIG. 27 shows the relationship between the average opening diameter and the optimal opening ratio in the case of a frequency of 2000 Hz, and FIG. 28 shows the relationship between the average opening diameter and the optimal opening ratio in the case of at a frequency of 1000 Hz.

It was found that, assuming that the optimal opening ratio was $\sigma_b$ and the average opening diameter was $\phi$ (µm), the relationship was approximately expressed by $\sigma_b = 20 \times \phi^{-2}$ at all frequencies. That is, it became clear that the optimal opening ratio was proportional to the minus square of the average opening diameter, that is, the optimal opening ratio was inversely proportional to the opening area of the through-hole. In addition, it became clear that the coefficient at that time was about 20.

This relationship is interpreted by the relationship between the number N of through-holes and the opening diameter. Assuming that N through-holes having an opening area $S_1$ are present in a sheet member having an area $S_0$ and a total area $S_2$ is open, $\sigma_b = S_2/S_0$ and $S_2 = N \times S_1$ are satisfied by the definition in a case where the opening ratio is optimal. Therefore, $\sigma_b = N \times S_1/S0$. On the other hand, $\sigma_b \propto \phi^{-2} \propto 1/S_1$ is satisfied from the above-described relational expression. From these relations, the relationship of $N \propto S_1^{-2}$ is obtained by $N \times S_1 \propto 1/S_1$. That is, there is a relationship that the number of through-holes increases or decreases in proportion to the minus square of the opening area (minus fourth power of the opening diameter $\phi$) of the through-hole.

As described above, in the case of the average opening ratio and the average opening diameter expressed by $\sigma_b = 20 \times \phi^{-2}$, the absorption is the largest in the configuration of the present invention. That is, the absorption is the largest in a case where the parameter A is 20.

Next, the lower limit of the average opening ratio was examined by simulation.

An object of the present invention is to increase absorption by combining a sound absorbing body and a sheet member having a through-hole by using the sound absorbing body. Therefore, in a case where the combination result is smaller in absorption than in the case of the original sound absorbing body alone, the purpose cannot be achieved at that frequency. In general, many sound absorbing bodies have low absorption on the low frequency side and sufficient absorption on the high frequency side. In the present invention, the effect of increasing the absorption on the low frequency side is large. However, on the high frequency side, design to maintain the original sound absorbing characteristics as much as possible is needed.

From such a viewpoint, for three levels of frequencies 2000 Hz, 1000 Hz, and 500 Hz, an opening ratio at which the absorbance approximately matched the absorbance of the sound absorbing body alone for several average opening diameters was calculated as a lower limit of the average opening ratio (hereinafter, referred to as a lower limit opening ratio).

Figure 29:
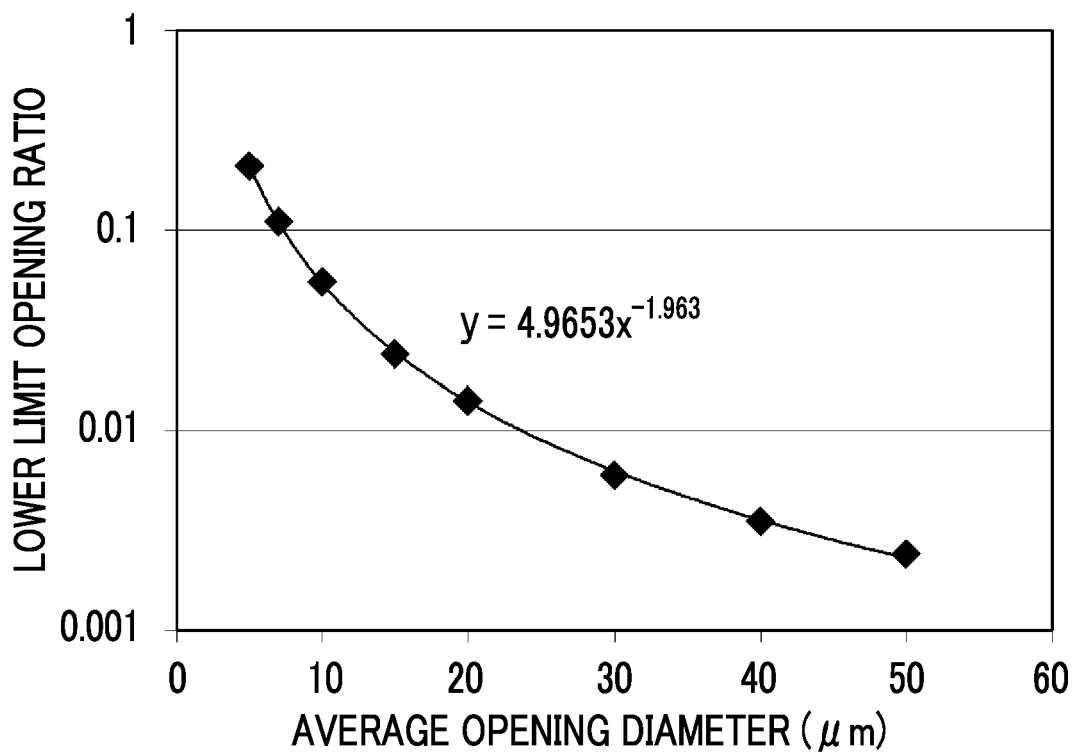
FIG. 29 is a graph showing the relationship between an average opening diameter and a lower limit opening ratio.
Figure 30:
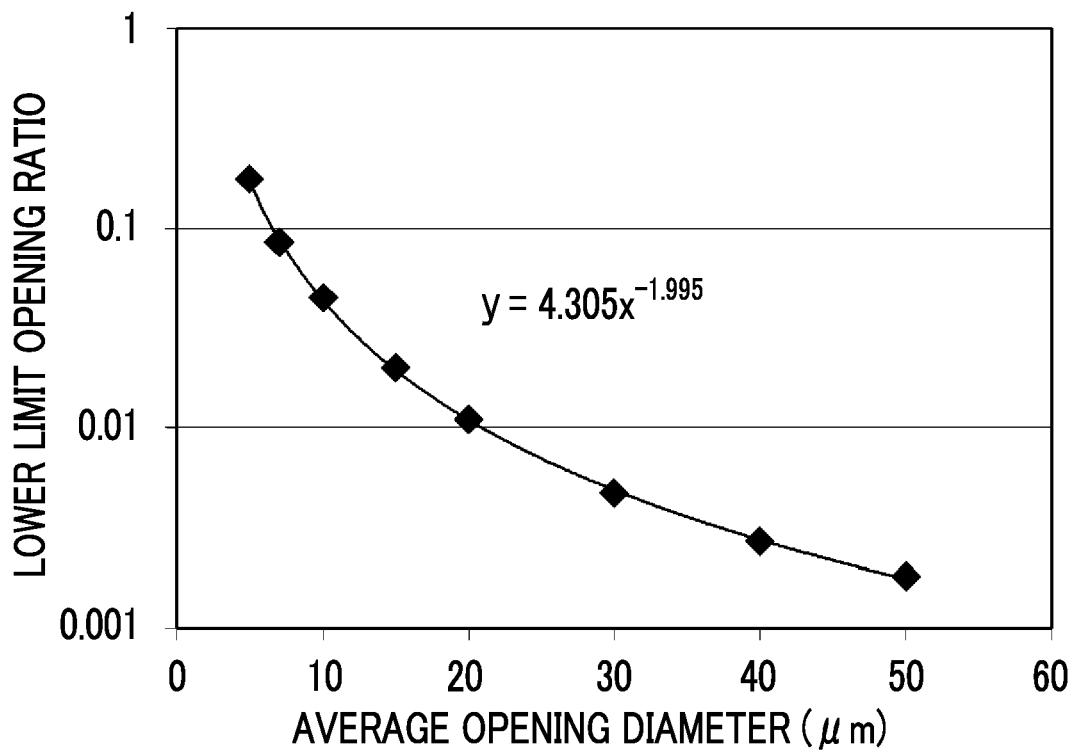
FIG. 30 is a graph showing the relationship between an average opening diameter and a lower limit opening ratio.
Figure 31:
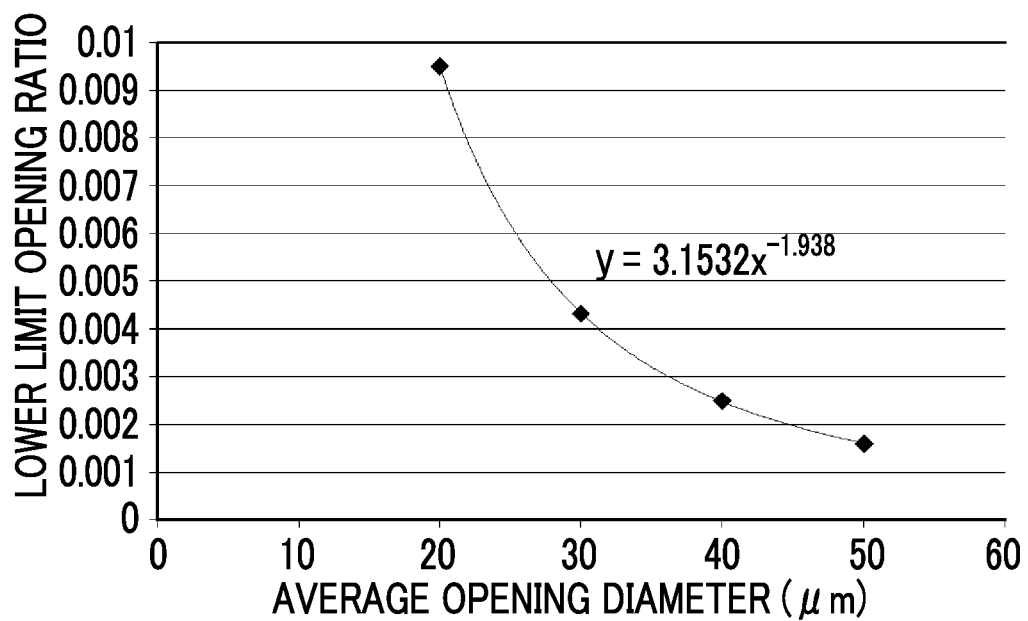
FIG. 31 is a graph showing the relationship between an average opening diameter and a lower limit opening ratio.

The results are shown in FIG. 29 (frequency 2000 Hz), FIG. 30 (frequency 1000 Hz), and FIG. 31 (frequency 500 Hz).

It could be seen from FIG. 29 that the average opening diameter $\phi$ and the lower limit opening ratio $\sigma_s$ were expressed by $\sigma_s=5.0\times\phi^{-2}$ at 2000 Hz, from FIG. 30 that the average opening diameter $\phi$ and the lower limit opening ratio were expressed by $\sigma_s=4.3\times\phi^{-2}$ at 1000 Hz, and from FIG. 31 that the average opening diameter $\phi$ and the lower limit opening ratio were expressed by $\sigma_s=3.2\times\phi^{-2}$ at 500 Hz. That is, it was found that the absorbance in the case of an opening ratio smaller than the opening ratio was lower than the absorbance of the sound absorbing body.

Therefore, assuming that the average opening ratio is $\sigma=A\times\phi^{-2}$, the parameter A is preferably 3.2 or more, more preferably 4.3 or more, and even more preferably 5.0 or more. Similarly, by setting the parameter A to 10 or more or 15 or more, it is possible to exceed the absorbance of the sound absorbing body alone up to the higher frequency side, which is preferable.

Next, the upper limit of the average opening ratio was examined by simulation.

In a case where the average opening ratio is increased, the ratio of the sound that passes through the through-holes of the sheet member as it is and hits the sound absorbing body increases. Therefore, the absorbance at the limit at which the average opening ratio is increased gradually approaches the absorbance of the sound absorbing body alone. That is, the absorbance gradually decreases as the average opening ratio becomes larger than the optimal opening ratio, and becomes the absorbance of the sound absorbing body alone at the limit at which the average opening ratio is large.

Therefore, for several average opening diameters, the average opening ratio was calculated in a case where the absorbance was 1.1 times, 1.2 times, and 1.3 times the absorbance of the sound absorbing body as a reference. The frequency was examined at 2000 Hz.

Figure 32:
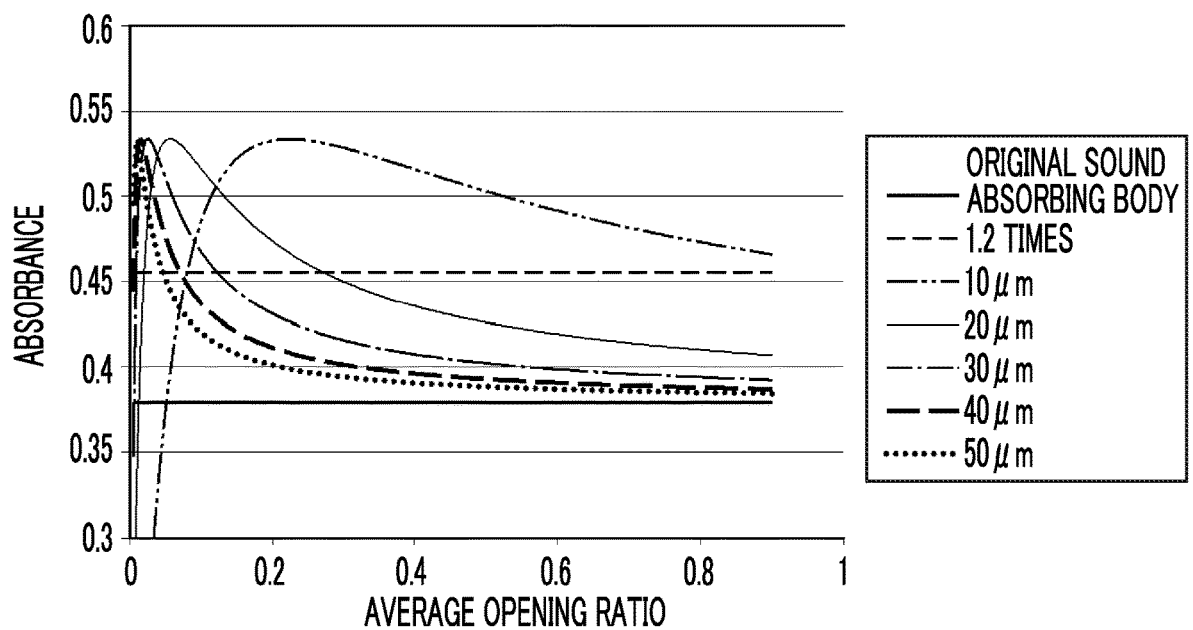
FIG. 32 is a graph showing the relationship between an average opening ratio and an absorbance.

FIG. 32 shows the results of calculating the absorbance for each average opening ratio with respect to each of the average opening diameters of 10 μm, 20 μm, 30 μm, 40 μm, and 50 μm. FIG. 32 shows the absorbance of the sound absorbing body alone and the absorbance of 1.2 times the absorbance.

It can be seen from FIG. 32 that the absorbance gradually decreases as the average opening ratio becomes larger than the optimal opening ratio and approaches the absorbance of the sound absorbing body alone at the limit at which the average opening ratio is large.

In addition, it can be seen that, for each average opening diameter, there is an average opening ratio at which the absorbance is 1.2 times the absorbance of the sound absorbing body alone.

For each average opening diameter, an average opening ratio at which the absorbance was 1.1 times the absorbance of the sound absorbing body alone, an average opening ratio at which the absorbance was 1.2 times the absorbance of the sound absorbing body alone, and an average opening ratio at which the absorbance was 1.3 times the absorbance of the sound absorbing body alone were calculated as upper limits of the average opening ratio (hereinafter, referred to as upper limit opening ratios).

Figure 33:
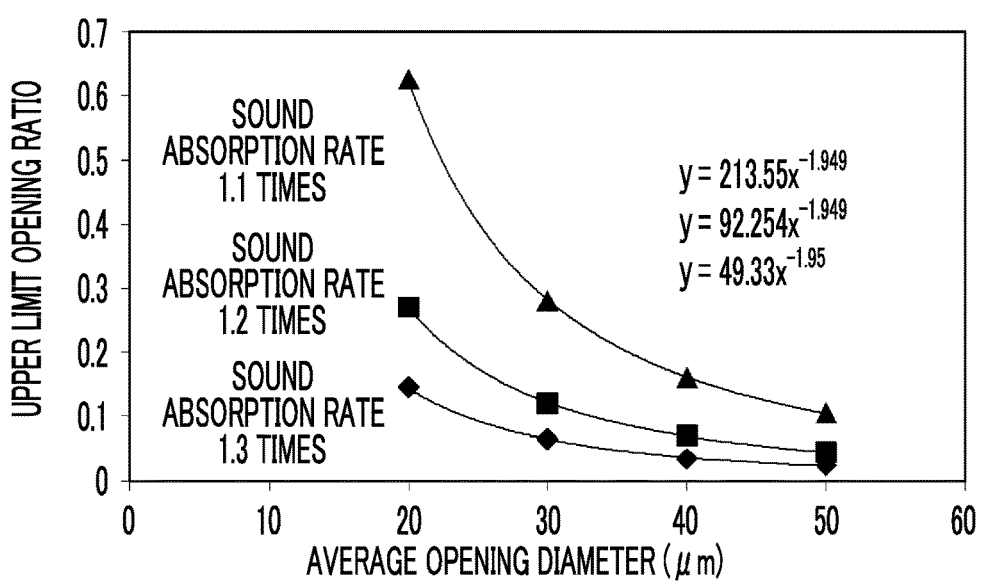
FIG. 33 is a graph showing the relationship between an average opening diameter and an upper limit opening ratio.

The results are shown in FIG. 33.

It could be seen from FIG. 33 that the upper limit opening ratio also follows the form of $\sigma=A\times\phi^{-2}$. Specifically, in a case where 1.1 times the absorbance of the sound absorbing body alone is set as a reference, the average opening diameter $\phi$ and the upper limit opening ratio at are expressed by $\sigma_t=213\times\phi^{-2}$. In a case where 1.2 times the absorbance of the sound absorbing body alone is set as a reference, the average opening diameter $\phi$ and the upper limit opening ratio $\sigma_t$ are expressed by $\sigma_t=92\times\phi^{-2}$. In a case where 1.3 times the absorbance of the sound absorbing body alone is set as a reference, the average opening diameter $\phi$ and the upper limit opening ratio at are expressed by $\sigma_t=49\times\phi^{-2}$. That is, it was found that the absorbance exceeded 1.1 times (1.2 times or 1.3 times) the absorbance of the sound absorbing body alone in a case where the average opening ratio was smaller than the upper limit opening ratio.

To summarize the above, first, the average opening diameter needs to be less than 100 μm in order to enter the viscous resistance region up to a frequency of 2000 Hz. For higher frequencies, the average opening diameter is preferably 70 μm or less, 50 μm or less, 40 μm or less, or even 35 μm or less.

In addition, for the average opening ratio, it is possible to specify the range in the form of $\sigma=A\times\phi^{-2}$. The best is A=20. The lower limit of A is 3.2 or more, preferably 4.3 or more, 5.0 or more, 10 or more, or 15 or more, and the upper limit is 92 or less, preferably 49 or less.

As an example, the relationship between the frequency and the absorbance was calculated for a case where the average opening diameter was 50 μm and the average opening ratio was 1% (parameter A was 25) and a case where the average opening diameter was 50 μm and the average opening ratio was 5% (parameter A was 125).

Figure 34:
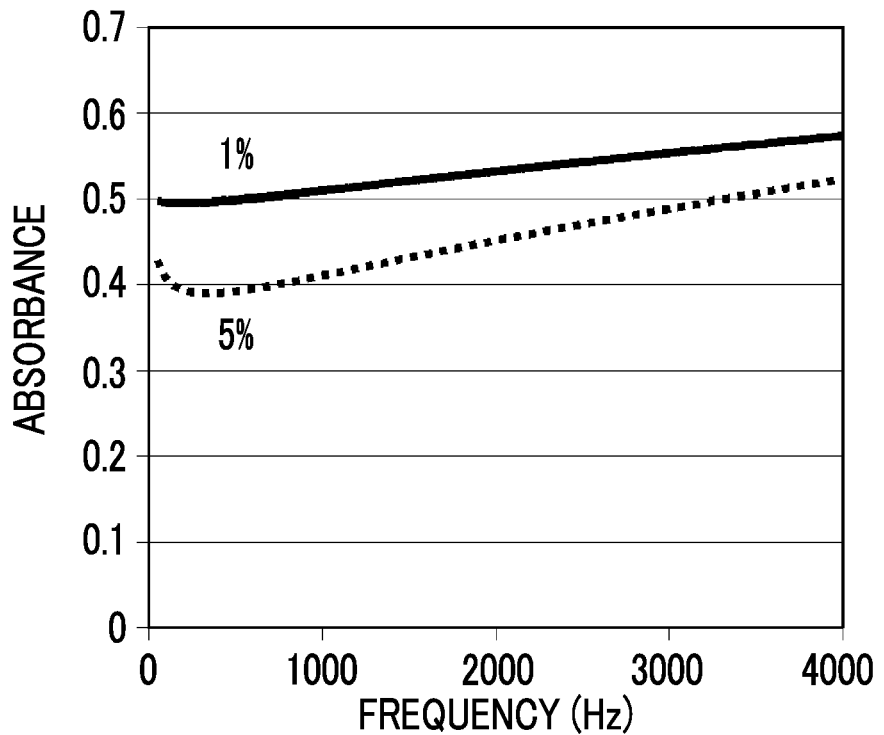
FIG. 34 is a graph showing the relationship between a frequency and an absorbance.

The results are shown in FIG. 34. From FIG. 34, it can be seen that, in a case where the average opening ratio is 1% (parameter A is 25) that is within the range of the present invention, the absorbance is high in a wider frequency range than in a case where the average opening ratio is 5% (parameter A is 125) that is outside the range of the present invention.

Figure 35:
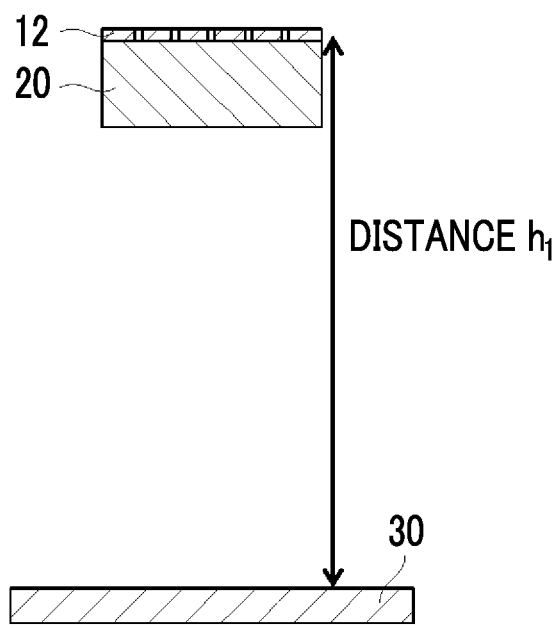
FIG. 35 is a diagram illustrating measurement conditions.

Next, a soundproof structure having a configuration shown in FIG. 35, which had the sheet member 12, the sound absorbing body 20, and the wall member 30 in this order and in which the sound absorbing body 20 and the wall member 30 were disposed so as to be spaced apart from each other by a predetermined distance, was examined by simulation.

Specifically, the relationship between the frequency and the absorbance was calculated by variously changing the distance $h_1$ between the surface of the sheet member 12 and the wall member 30.

Figure 36:
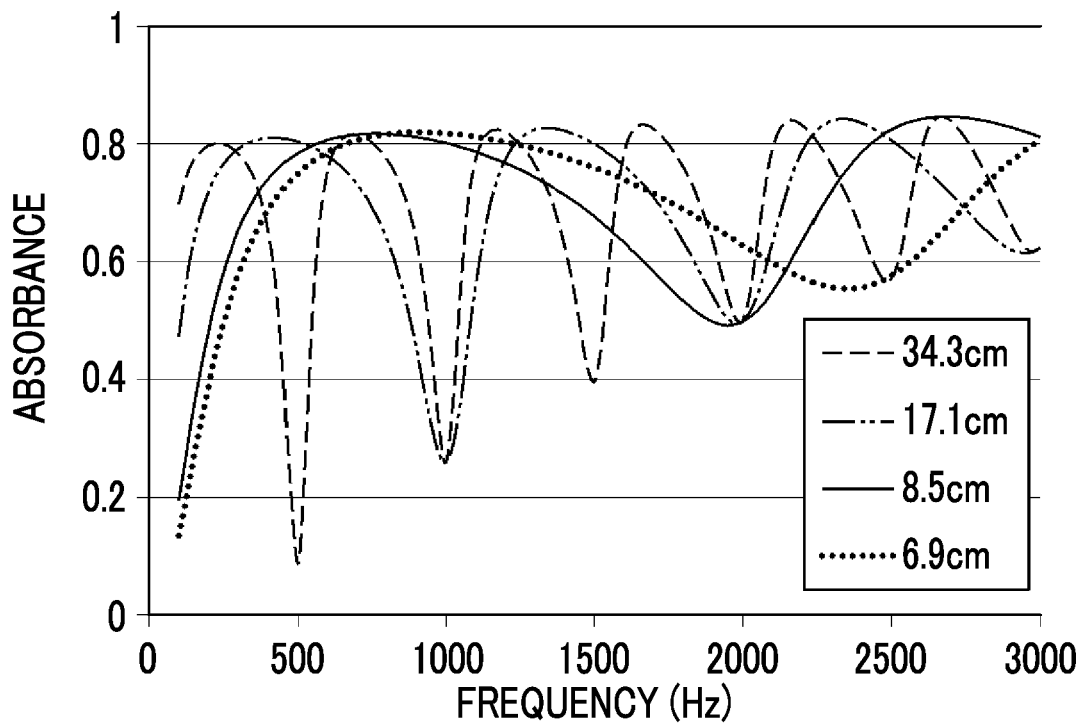
FIG. 36 is a graph showing the relationship between a frequency and an absorbance.

FIG. 36 shows the results in cases where the distance $h_1$ is 34.3 cm, 17.1 cm, 8.5 cm, and 6.9 cm.

As shown in FIG. 36, in a case where the distance $h_1$ is 34.3 cm, the absorbance is the minimum at 500 Hz, 1000 Hz, 1500 Hz, 2000 Hz, 2500 Hz, and 3000 Hz. The wavelength λ at these frequencies is a frequency corresponding to the wavelength satisfying $h_1=\lambda/2+n\times\lambda/2$.

Similarly, also in cases where the distance $h_1$ is 17.1 cm, 8.5 cm, and 6.9 cm, the absorbance is minimized at a frequency corresponding to the wavelength satisfying $h_1=\lambda/2+n\times\lambda/2$.

From the above, it can be seen that the distance between the sheet member and the wall member is preferably as small as possible, preferably less than 35 cm, more preferably 17.1 cm or less, even more preferably 8.5 cm or less, and particularly preferably 6.9 cm or less.

EXAMPLES

Hereinafter, the present invention will be described in more detail by way of examples. Materials, the amount of use, ratios, processing content, processing procedures, and the like shown in the following examples can be appropriately changed without departing from the gist of the present invention. Therefore, the range of the present invention should not be interpreted restrictively by the following examples.

Example 1

<Manufacturing of a Sheet Member>

A plurality of cylindrical protruding portions each having a diameter of 20 µm were formed in a predetermined array pattern on the silicon substrate using an etching method by photolithography. The center-to-center distance between adjacent protruding portions was 74 µm, and the arrangement pattern was a square grid arrangement. At this time, the area ratio occupied by the protruding portions is about 6%.

Then, using a nickel electroforming method, that is, electrochemical reaction, nickel was electrodeposited on a silicon substrate using the silicon substrate, on which the protruding portions were formed, as a prototype to form a nickel film having a thickness of 20 µm. Thereafter, the nickel film was peeled off from the silicon substrate and subjected to surface polishing. As a result, a nickel sheet member having a plurality of through-holes formed in a square grip arrangement was manufactured. The size was A4 size.

The manufactured film was evaluated using a SEM and an optical microscope, and the average opening diameter was 20 µm, the average opening ratio was 5.7%, and the thickness was 20 µm. In addition, it was also confirmed that the through-hole completely passed through the sheet member in the thickness direction. The parameter A is 22.8.

<Manufacturing of a Soundproof Structure>

Glass wool having a thickness of 10 mm (manufactured by Asahi Fiber Glass Co., Ltd.) was used as a sound absorbing body. The unit thickness flow resistance of the glass wool is 20000 [Pa·s/m$^2$]. The method of measuring the flow resistance conforms to "ISO 9053".

A sheet member was disposed on the sound absorbing body to manufacture a soundproof structure.

Comparative Example 1

Comparative example 1 was the same as Example 1 except that a sheet member was not provided. That is, the configuration of a sound absorbing body alone was adopted.

Examples 2 to 4 and Comparative Examples 2 and 3

Soundproof structures having the same configuration as in Example 1 were manufactured except that the average opening diameter and the average opening ratio of through-holes formed in the sheet member were changed.

In Example 2, the average opening diameter was 10 µm, and the average opening ratio was 22.5%. The parameter A is 22.5.

In Example 3, the average opening diameter was 50 µm, and the average opening ratio was 1.0%. The parameter A is 25.

In Example 4, the average opening diameter was 70 µm, and the average opening ratio was 0.6%. The parameter A is 29.4.

In Comparative example 2, the average opening diameter was 100 µm, and the average opening ratio was 0.5%. The parameter A is 50.

In Comparative example 3, the average opening diameter was 200 µm, and the average opening ratio was 1.2%. The parameter A is 480.

These average opening ratios are optimal opening ratios with respect to each average opening diameter calculated by the simulation described above.

[Evaluation]

<Acoustic Characteristics>

The acoustic characteristics of the manufactured soundproof structure were measured by a transfer function method using four microphones. This method is based on "ASTM E2611-09: Standard Test Method for Measurement of Normal Incidence Sound Transmission of Acoustical Materials Based on the Transfer Matrix Method". This measurement method is, for example, the same measurement principle as a 4-microphone measurement method using WinZac provided by Nitto Bosei Aktien Engineering Co., Ltd. It is possible to measure the sound transmission loss in a wide spectral band using this method. In particular, by measuring the transmittance and the reflectivity at the same time and calculating 1−(transmittance+reflectivity) as the absorbance, the absorbance of the sample was accurately measured. The sound transmission loss was measured in the range of 100 Hz to 4000 Hz. The inner diameter of the acoustic tube is 40 mm, and can be sufficiently measured up to 4000 Hz or higher.

According to the size of the acoustic tube, the sheet member and the glass wool were cut out on a circle having a diameter of 40 mm and placed in the acoustic tube. In the acoustic tube, the soundproof structure was disposed with the sheet member side facing the sound source side.

Figure 37:
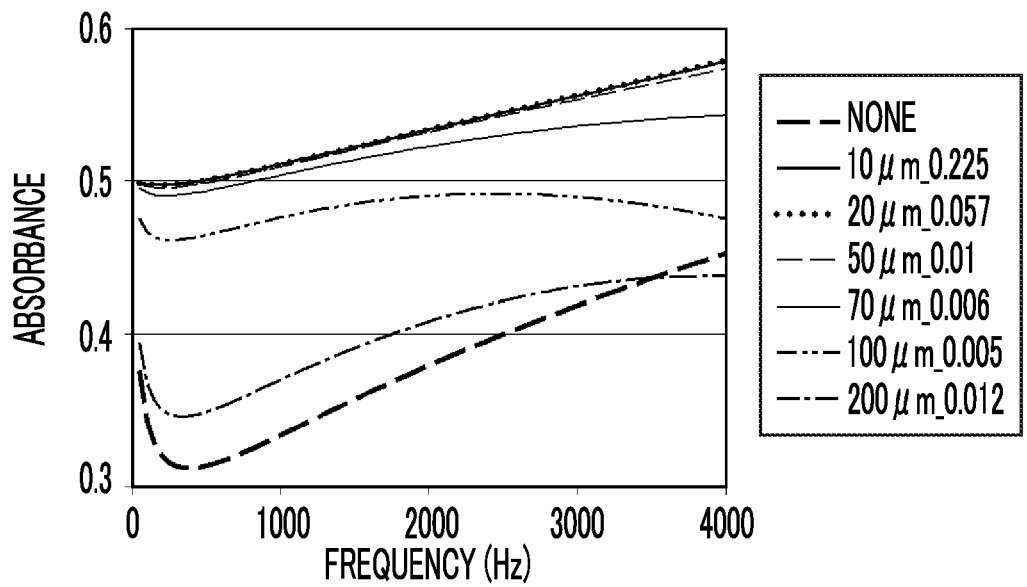
FIG. 37 is a graph showing the relationship between a frequency and an absorbance.

FIG. 37 shows the results of measuring the relationship between the frequency and the absorbance for each of the examples and the comparative examples. In the graph shown in FIG. 37, the legend is indicated by the average opening diameter and the average opening ratio. For example, the legend of "10 µm_0.225" is an example (Example 2) having an average opening diameter of 10 µm and an average opening ratio of 0.225 (22.5%).

From FIG. 37, the absorbance in the case of the average opening diameter of 10 µm and 20 µm, which are Examples 1 and 2, is the maximum, and the absorbance in the case of the average opening diameter of 50 µm in Example 3 is very small. In the case of the average opening diameter of 70 µm in Example 4, the absorbance is smaller than these.

On the other hand, in the case of the average opening diameter of 100 µm in Comparative example 2, the absorbance is low in a wide frequency band, and the slope of the absorbance up to the frequency of 4000 Hz is different from those of the examples. In the case of the average opening diameter of 200 µm in Comparative example 3, the absorbance is further reduced.

As described above, there is an optimal combination of the average opening diameter and the average opening ratio of the micro through-holes formed in the sheet member. From FIG. 37, it can be seen from the comparison of the optimal conditions that absorption in a broad band is obtained in a case where the average opening diameter is small.

Examples 5 to 7

Next, arrangement of a sheet member in a sound source direction, and the number of installed sheets were examined. By setting the thickness of the acoustic tube used for measurement to 15 mm in diameter, it was possible to perform measurement up to the higher frequency side (up to 12000 Hz).

A case where the sheet member and the sound absorbing body of Example 1 were used and the sheet member was on the sound source side was Example 5 (transmission arrangement_front), and a case where the sheet member and the sound absorbing body of Example 1 were used and the sheet member was on the opposite side to the sound source side was Example 6 (transmission arrangement_back). In addition, a case where the sheet member was provided on both the surfaces of the sound absorbing body was Example 7 (transmission arrangement_both surfaces).

Figure 38:
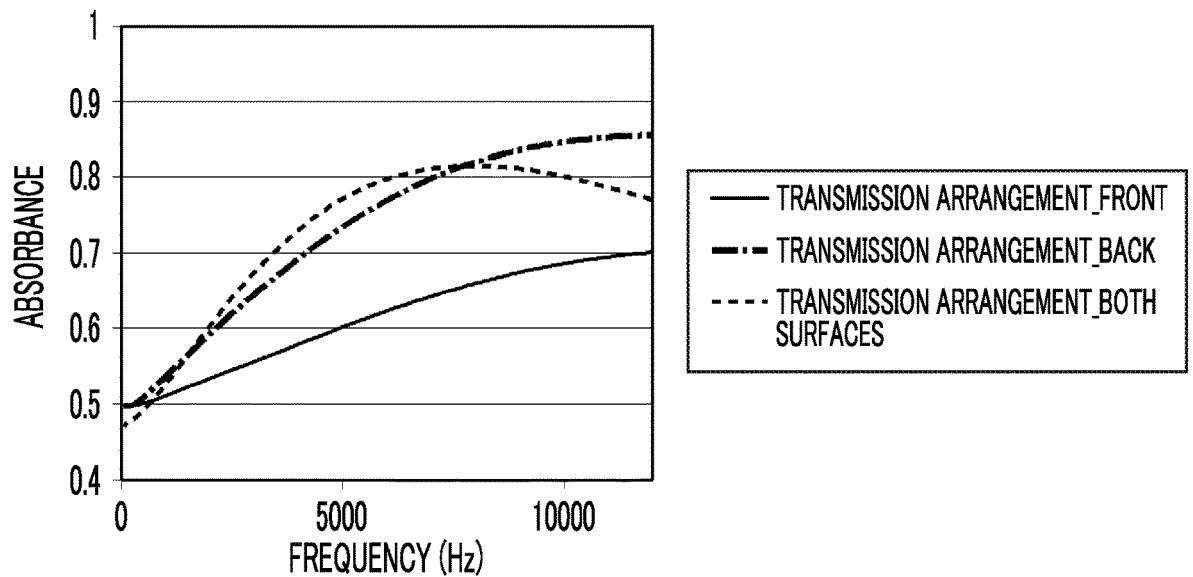
FIG. 38 is a graph showing the relationship between a frequency and an absorbance.

The respective measurement results are shown in FIG. 38.

Comparing Examples 5 to 7 with each other, in a case where the sheet member is on the opposite side to the sound source and a case where the sheet member is on both the surfaces, the absorbance is larger than that in a case where the sheet member is on the sound source side.

By arranging the sheet member on the side opposite to the sound source, absorption by the micro through-holes occurs and reflection occurs in the sheet member portion. It is thought that, since the reflected wave interferes with the incident wave, the sound pressure increases due to the sound interference effect inside the sound absorbing body and the effect of increasing the amount of absorption in the sound absorbing body is also obtained. That is, it is thought that the sheet member functions as an absorbing body and also functions as a weak reflecting wall.

[Simulation 2]

Next, a configuration having a wall member was examined by simulation.

Modeling was performed in the same manner as in Simulation 1 except that the wall member was modeled as a rigid wall. The thickness of the sound absorbing body was 20 mm, and the wall member and the sound absorbing body were in contact with each other.

In this case, since all the transmitted sounds are reflected by the rigid wall, the absorbance defined by absorbance=1−reflectivity was calculated from the reflectivity.

Here, since the sound absorbing body attached to the wall member can use the interference effect due to reflection from the wall rather than the sound absorbing body alone, sound absorption on the high frequency side tends to be high. Therefore, sound absorption on the low frequency side can be calculated. In addition, a sound absorbing body having a thickness twice as large as that in the case of Simulation 1 was examined, and the parameter A was calculated by finding the optimal opening ratio at which the absorbance is maximized at a target frequency of 1000 Hz.

The results are shown in Table 2.

TABLE 2

| Average opening diameter μm | Optimal opening ratio | A |
|---|---|---|
| 10 | 0.173 | 17.3 |
| 15 | 0.077 | 17.325 |
| 20 | 0.045 | 18 |
| 30 | 0.019 | 17.1 |

TABLE 2-continued

| Average opening diameter μm | Optimal opening ratio | A |
|---|---|---|
| 50 | 0.007 | 17.5 |
| 100 | 0.002 | 20 |
| 200 | 0.002 | 80 |
| 300 | 0.003 | 270 |

Examples 8 to 12 and Comparative Examples 4 to 6

Based on the optimal opening ratio calculated in the above Simulation 2, a nickel film (sheet member) having through-holes satisfying the average opening diameter and the average opening ratio of each optimal condition was manufactured. The thickness of the nickel film is 20 μm. The manufactured nickel film was disposed on glass wool (sound absorbing body) having a thickness of 20 mm, and an aluminum plate (wall member) having a thickness of 10 cm was disposed on a surface of the nickel film on the opposite surface to the glass wool, thereby manufacturing a soundproof structure.

In Example 8, the average opening diameter was 10 μm, and the average opening ratio was 17.3%. The parameter A is 17.3.

In Example 9, the average opening diameter was 15 μm, and the average opening ratio was 7.7%. The parameter A is 17.3.

In Example 10, the average opening diameter was 20 μm, and the average opening ratio was 4.5%. The parameter A is 18.

In Example 11, the average opening diameter was 30 μm, and the average opening ratio was 1.9%. The parameter A is 17.1.

In Example 12, the average opening diameter was 50 μm, and the average opening ratio was 0.7%. The parameter A is 17.5.

In Comparative example 4, there was no sheet member. In Comparative example 5, the average opening diameter was 100 μm, and the average opening ratio was 0.2%. The parameter A is 20.

In Comparative example 6, the average opening diameter was 200 μm, and the average opening ratio was 0.2%. The parameter A is 80.

For the manufactured soundproof structure, a sound absorption rate was measured by a sound absorption rate measurement method based on a microphone two-terminal transfer function method using an acoustic pipe. This method conforms to ISO 10534-2. The inner diameter of the acoustic tube can be appropriately selected according to the frequency to be measured. An acoustic tube having an internal diameter of 40 mm was used in the case of measurement up to 4000 Hz, and an acoustic tube having an internal diameter of 15 mm was used in the case of measurement up to 12000 Hz. A speaker is disposed at one end of the acoustic tube, and the above-described aluminum plate with a thickness of 10 cm is disposed as a completely reflective end at the other end. A sound absorbing body is disposed inside the acoustic tube in contact with the aluminum plate, and a sheet member is disposed in contact with the sound absorbing body. That is, the sound emitted from the speaker is incident on the measurement target disposed in the order of sheet member-sound absorbing body-wall, and the reflectivity thereof is acquired by the two microphones. By this method, the sound absorption rate can be measured as "1−reflectivity".

Figure 39:
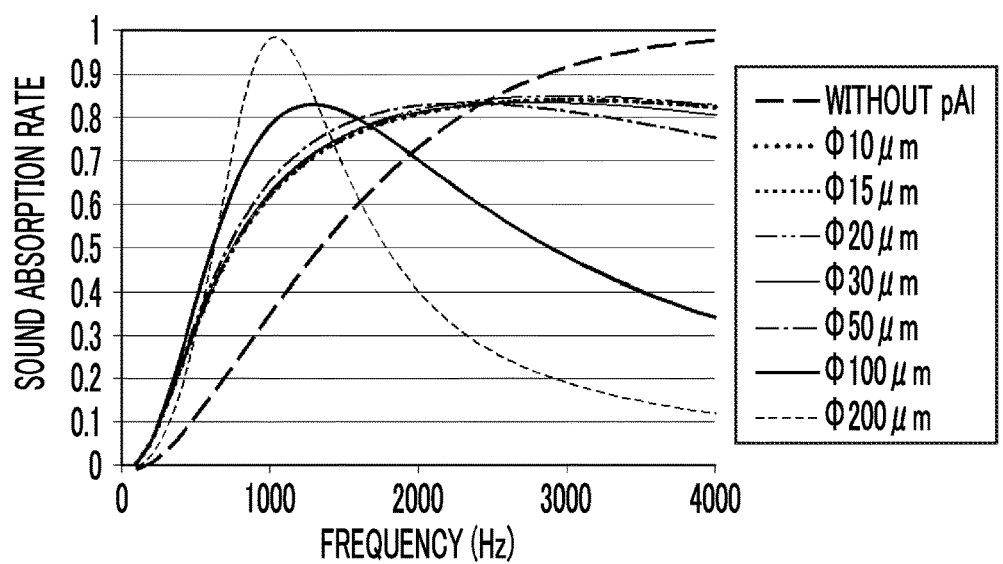
FIG. 39 is a graph showing the relationship between a frequency and a sound absorption rate.
Figure 40:
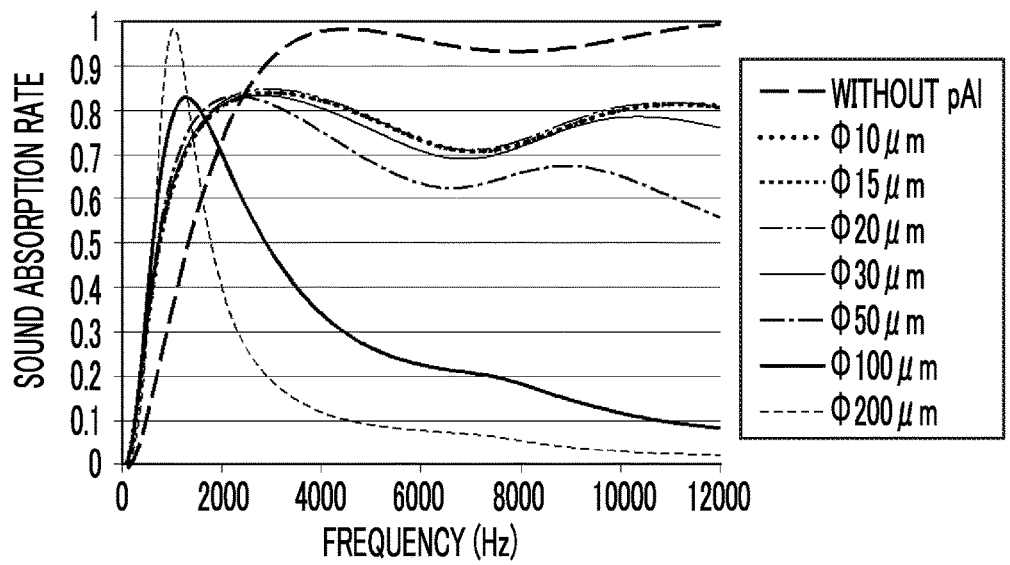
FIG. 40 is a graph showing the relationship between a frequency and a sound absorption rate.

The results of measuring the relationship between the frequency and the absorbance are shown in FIGS. 39 and 40. In FIGS. 39 and 40, the legend indicates an average opening diameter. For example, the legend of "ϕ10 μm" is an example (Example 8) having an average opening diameter of 10 μm.

From FIGS. 39 and 40, it can be seen that, as the average opening diameter increases, the sound absorption rate at the target frequency increases but the sound absorption rate at other frequencies is significantly reduced. In particular, in the case of measurement up to the high frequency of 12000 Hz, a sound absorption rate less than 10% is obtained in both the case of an average opening diameter of 100 μm (Comparative example 5) and the case of an average opening diameter of 200 μm (Comparative example 6). Therefore, it can be seen that the broad band sound absorbing characteristics on the high frequency side that the original sound absorbing body (Comparative example 4) has are lost.

On the other hand, it can be seen that, in cases of an average opening diameter of 10 μm (Example 8), an average opening diameter of 15 μm (Example 9), an average opening diameter of 20 μm (Example 10), an average opening diameter of 30 μm (Example 11), and an average opening diameter of 50 μm (Example 12), the sound absorption rate on the high frequency side can be maintained while improving the sound absorption rate on the low frequency side as compared with the sound absorption rate of the original sound absorbing body. In particular, in a case where the average opening diameter is 20 μm or less, the sound absorbing characteristics are almost flat with respect to the frequency on the high frequency side.

In a case where the average opening diameter is as large as 100 μm and 200 μm, the optimal opening ratio is a very small value. Therefore, the through-holes are disposed apart from each other due to the large opening diameter of each through-hole and the small opening ratio. At this time, there is a large back surface volume for each through-hole. For this reason, it can be thought that the characteristic of peak sound absorption by so-called Helmholtz resonance rather than the property of the through-hole appears. The Helmholtz resonance is an LC resonance due to each through-hole and the back surface volume corresponding to each through-hole. Therefore, the Helmholtz resonance is likely to occur in a case where the distance between the through-holes is large and the corresponding back surface volume is large. At this time, the target frequency is strongly absorbed due to the nature of resonance, but other frequencies that are not resonance frequencies are reflected. Therefore, it can be thought that the effect of the sound absorbing body behind the through-holes is reduced.

In order to specifically absorb a specific sound, there is an option to use a Helmholtz resonance body, a film type resonance body, or air column resonance. On the other hand, in a case where it is necessary to increase absorption while using the broad band sound absorbing characteristics of the sound absorbing body as in the present invention, it is necessary to extend the absorption to the low frequency side by arranging the sheet member having micro through-holes and to maintain the sound absorbing characteristics on the high frequency side by the sound absorbing body. Therefore, it can be seen that a large average opening diameter of 100 μm or more is not suitable for the purpose and it is necessary to use an average opening diameter of less than 100 μm.

Examples 13 and 14

How the sound absorbing characteristics changed according to the arrangement position of the sheet member in the sound absorbing body was examined.

As a sheet member, the sheet member of Example 10 (average opening diameter 20 μm, average opening ratio 4.5%) was used.

A structure in which a sheet member was disposed on the outermost surface of a sound absorbing body having a thickness of 20 mm (the same as in Example 10), a structure in which a sheet member was disposed at a position of 10 mm (central portion) from a wall member (Example 13), and a structure in which a sheet member was disposed on both the outermost surface and the central portion (Example 14) were manufactured, and the relationship between the frequency and the sound absorption rate was measured. The results are shown in FIG. 41.

Figure 41:
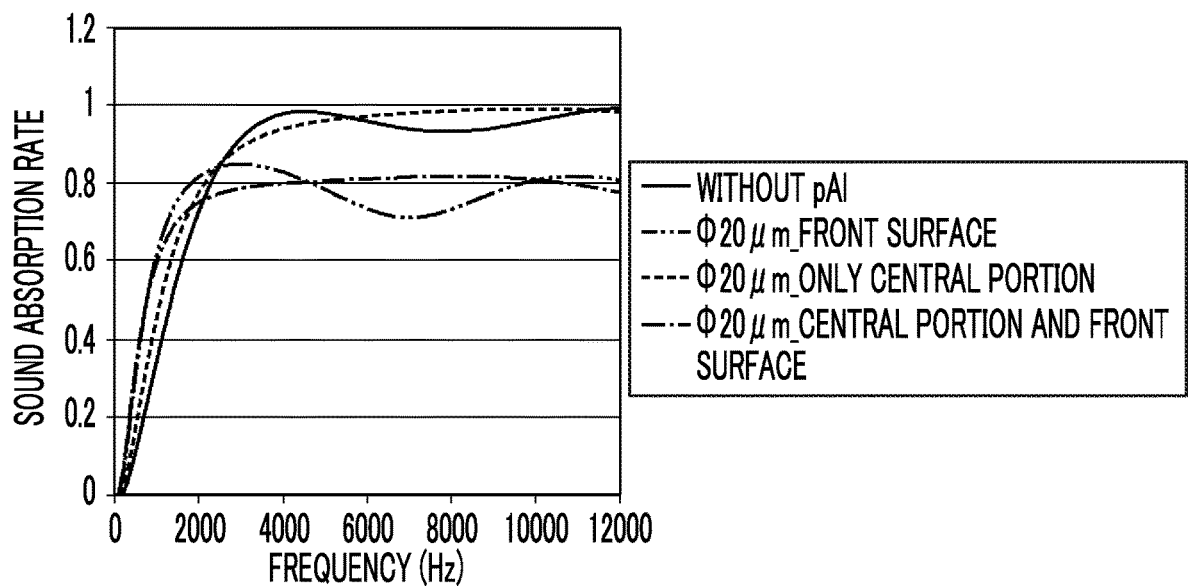
FIG. 41 is a graph showing the relationship between a frequency and a sound absorption rate.

From FIG. 41, the absorbance on the low frequency side is increased in a case where the sheet member is disposed on the outermost surface, but extension to the low frequency side occurs and the absorbance on the high frequency side is hardly reduced in a case where the sheet member is disposed only on the intermediate layer. Therefore, the arrangement can be appropriately selected according to the soundproofing target.

Examples 15 to 17

The same sheet member as the sheet member of Example 10 (sheet member thickness 20 μm, "ϕ20 μm in FIG. 42") was manufactured except that the thickness of the sheet member was 10 μm (Example 15), 30 μm (Example 16), and 40 μm (Example 17), and a soundproof structure was manufactured.

The thickness of the sheet member can be adjusted by changing the time for performing the nickel electroforming method.

The relationship between the frequency and the sound absorption rate was measured for each of the manufactured soundproof structures. The results are shown in FIG. 42.

Figure 42:
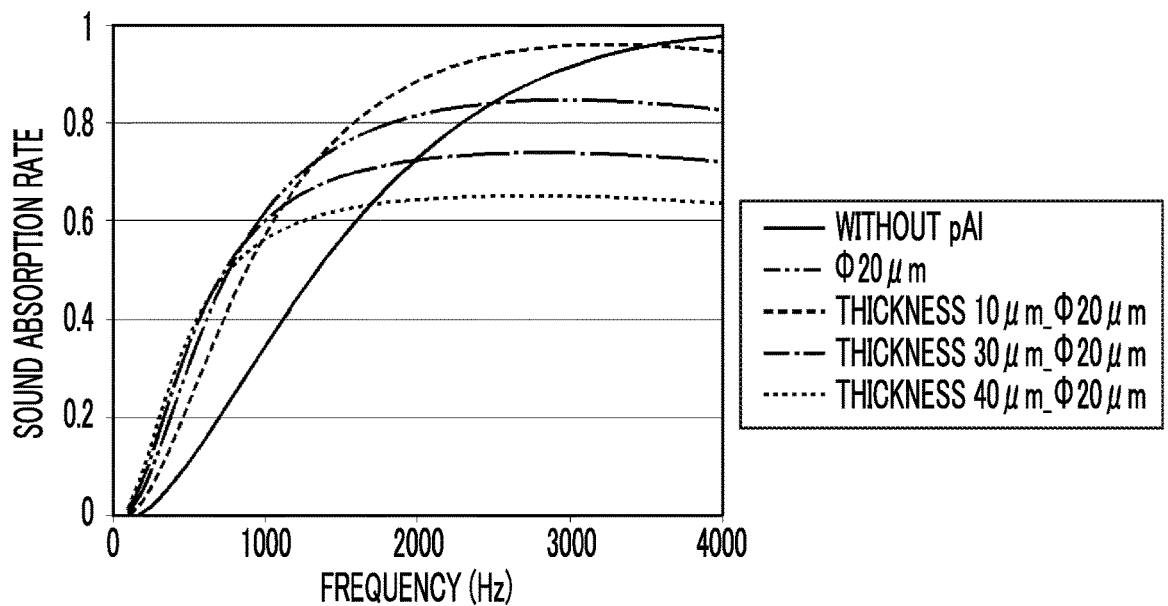
FIG. 42 is a graph showing the relationship between a frequency and an absorbance.

From FIG. 42, in all of the examples, the sound absorption rate was increased on the low frequency side as compared with the sound absorption rate of the sound absorbing body alone. The sound absorption rate is kept large on the high frequency side in a case where the thickness of the sheet member is small, while the sound absorption rate on the low frequency side is higher in a case where the thickness of the sheet member is large.

Examples 18 to 20

Next, in order to form micro through-holes in a sheet member having a larger area and form through-holes in a random pattern array in a large area, a sheet member having micro through-holes was formed in a large area by a process of forming aluminum oxide and aluminum hydroxide using the surface characteristics of aluminum and then performing etching. An aluminum foil having such through-holes can be manufactured with reference to the manufacturing methods described in WO2016/060037 and WO2016/017380.

A sheet member was manufactured in which through-holes having an average opening diameter of 20 μm and an average opening ratio of 5.7% were formed for the thickness of 20 μm of the aluminum foil. A roll having a width of 420 mm and a length of 100 m as a sample size was manufactured by a roll-to-roll process.

The arrangement of the through-holes formed by such a manufacturing method is not completely periodic, but the through-holes are formed in a random arrangement.

By appropriately cutting the manufactured sheet member into an appropriate size, a soundproof structure was manufactured, and measurement was performed.

Figure 43:
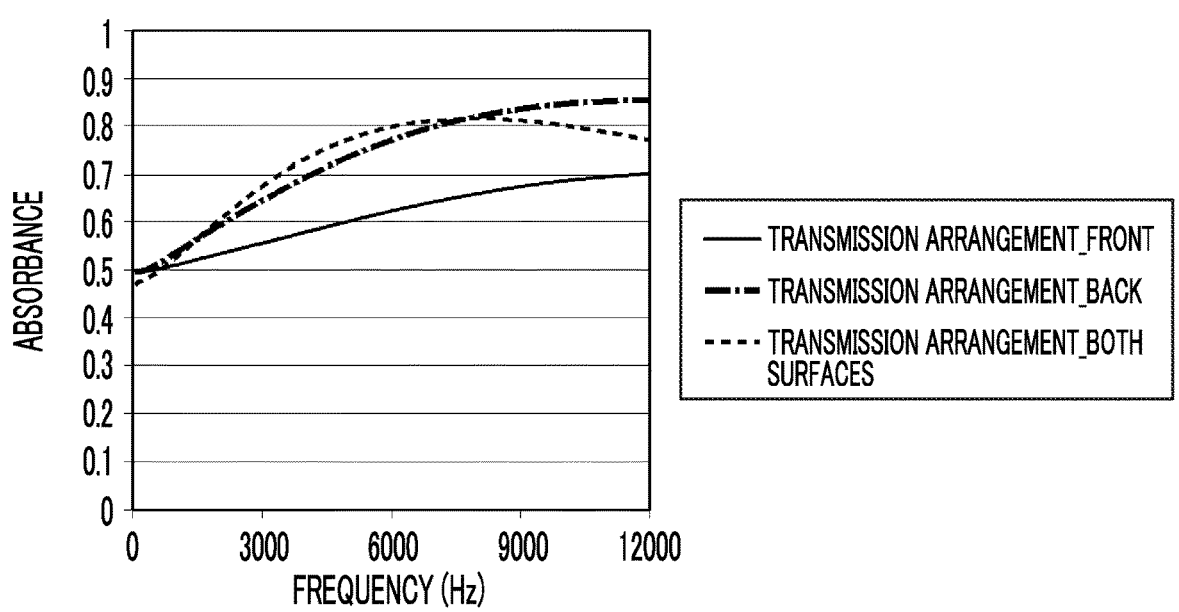
FIG. 43 is a graph showing the relationship between a frequency and an absorbance.

First, in Examples 18 to 20, the same soundproof structure as in Examples 5 to 7 was manufactured except that the sheet member was changed to a member having micro through-holes in the above aluminum foil, and the relationship between the frequency and the absorbance was measured. The results are shown in FIG. 43. As shown in FIG. 43, the same results as in Examples 5 to 7 were obtained. It is thought that this is because the absorption of sound occurs due to the viscous friction of an air portion in the micro through-holes and accordingly the absorption of sound is not much dependent on the material of the sheet member as long as the vibration of the sheet member is negligible.

In addition, since the wavelength of sound was large, there was almost no influence on the acoustic characteristics in both a case where the arrangement of the through-holes was a periodic pattern as in Examples 5 to 7 and a case where the arrangement of the through-holes was a random pattern as in Examples 18 to 20. Therefore, even in the case of using a sheet member having through-holes of the random pattern arrangement, the same acoustic characteristics as the acoustic characteristics obtained by measurement of the sheet member having the through-holes of the periodic arrangement pattern can be obtained.

Example 21 and Comparative Example 7

A soundproof structure was manufactured as the same structure as in Example 10 except that the sheet member (average opening diameter of 20 μm, average opening ratio of 5.7%, random arrangement, material: aluminum) manufactured in Example 18 was used as a sheet member (Example 21).

In Comparative example 7, there was no sheet member. That is, this is a measurement in a case where glass wool alone with a thickness of 20 mm, which is a sound absorbing body, is provided on a rigid wall.

In addition, the diameter of the acoustic tube used for acoustic measurement was 40 mm, and the sample size was appropriately adjusted according to the diameter of the acoustic tube.

Figure 44:
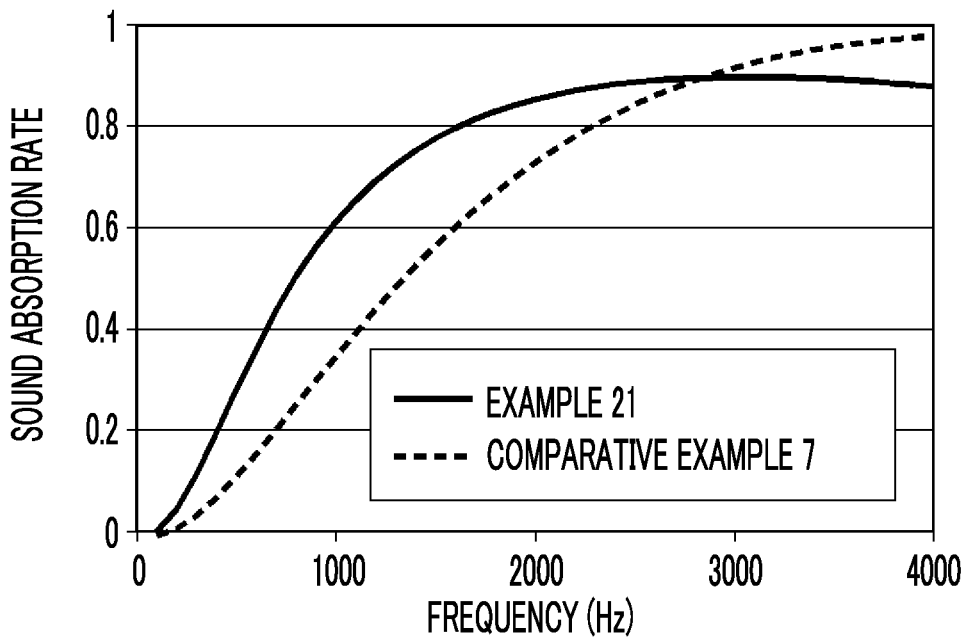
FIG. 44 is a graph showing the relationship between a frequency and a sound absorption rate.

The relationship between the frequency and the sound absorption rate was measured for the manufactured soundproof structure. The results are shown in FIG. 44.

Example 22 and Comparative Example 8

Figure 45:
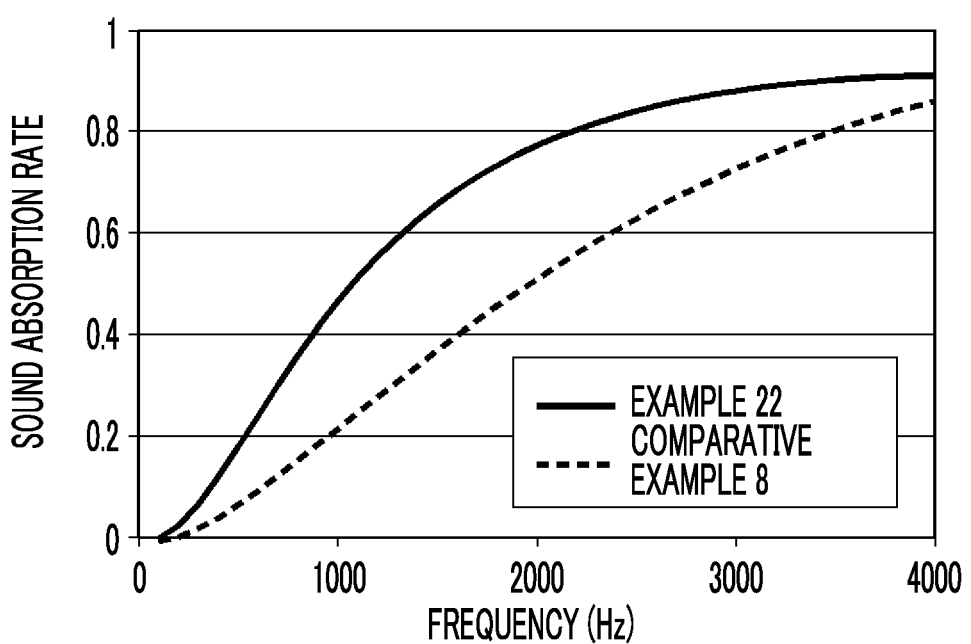
FIG. 45 is a graph showing the relationship between a frequency and a sound absorption rate.

A soundproof structure was manufactured in the same manner as in Example 21 and Comparative example 7 except that the thickness of glass wool was set to 15 mm, and the relationship between the frequency and the sound absorption rate was measured. The results are shown in FIG. 45.

Example 23 and Comparative Example 9

Figure 46:
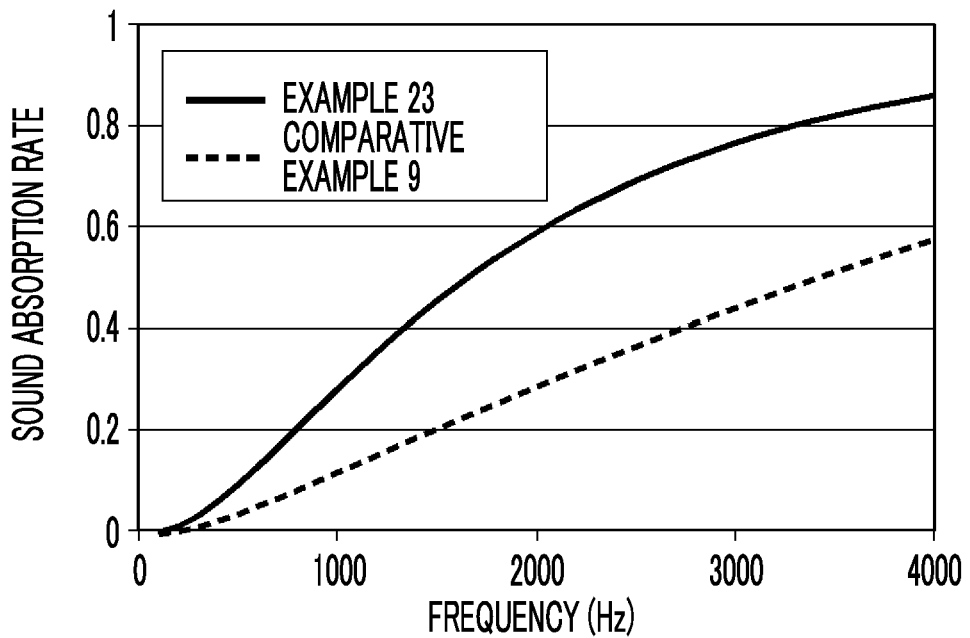
FIG. 46 is a graph showing the relationship between a frequency and a sound absorption rate.

A soundproof structure was manufactured in the same manner as in Example 21 and Comparative example 7 except that the thickness of glass wool was set to 10 mm, and the relationship between the frequency and the sound absorption rate was measured. The results are shown in FIG. 46.

Example 24 and Comparative Example 10

Figure 47:
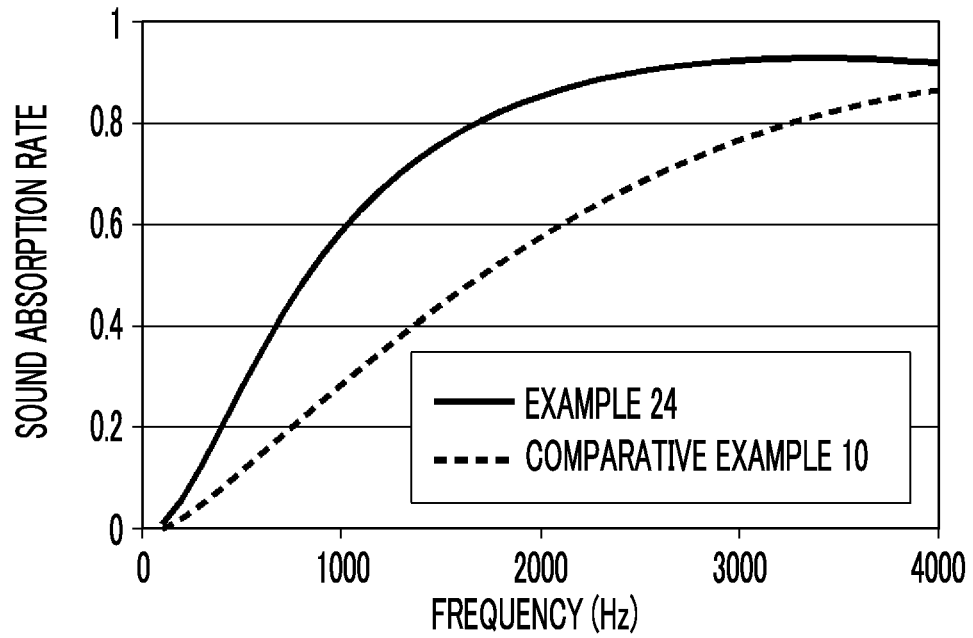
FIG. 47 is a graph showing the relationship between a frequency and a sound absorption rate.

A soundproof structure was manufactured in the same manner as in Example 21 and Comparative example 7 except that glass wool having a unit thickness flow resistance of 10000 [Pa·s/m$^2$] and a thickness of 20 mm was used as glass wool, and the relationship between the frequency and the sound absorption rate was measured. The results are shown in FIG. 47.

As shown in FIGS. 44 to 47, from the comparison between Examples 21 to 24 and Comparative examples 7 to 10, in any case, the effect of improving the absorbance with respect to the glass wool alone centering on the low frequency side was seen. That is, even in the case of an aluminum foil in which the arrangement of the through-holes was random, the improvement in the sound absorption effect could be similarly confirmed.

Example 25

Next, by changing the manufacturing conditions according to the above-described document, an aluminum film (20 μm in thickness) having through-holes with an average opening diameter and an average opening ratio shown in the following Table 3 was manufactured. In the same manner as in Example 23, these were disposed on the glass wool having a thickness of 10 mm (unit thickness flow resistance was 20000 [Pa·s/m$^2$]), and the sound absorption rate was measured. Table 3 shows the parameter A and the sound absorption rates at 1000 Hz, 2000 Hz, and 3000 Hz. Comparative example 9 is a measurement in a case where there is no sheet member.

TABLE 3

| | Average opening diameter μm | Optimal opening ratio | A | Sound absorption rate | | |
|---|---|---|---|---|---|---|
| | | | | 1000 Hz | 2000 Hz | 3000 Hz |
| Comparative Example 9 | None | None | None | 0.11 | 0.28 | 0.44 |
| Example 23 | 20 | 0.057 | 22.8 | 0.28 | 0.59 | 0.77 |
| Example 23-2 | 16 | 0.028 | 7.2 | 0.37 | 0.52 | 0.56 |
| Example 23-3 | 16.6 | 0.036 | 9.9 | 0.36 | 0.57 | 0.65 |
| Example 23-4 | 15.8 | 0.024 | 6 | 0.36 | 0.48 | 0.51 |
| Example 23-5 | 27.1 | 0.098 | 72 | 0.18 | 0.45 | 0.66 |
| Example 23-6 | 21.7 | 0.068 | 32 | 0.24 | 0.55 | 0.76 |
| Example 23-7 | 24.3 | 0.068 | 40.2 | 0.22 | 0.52 | 0.74 |
| Example 23-8 | 24.3 | 0.056 | 33.1 | 0.24 | 0.55 | 0.76 |
| Example 23-9 | 20.7 | 0.047 | 20.1 | 0.29 | 0.6 | 0.76 |
| Example 23-10 | 34.9 | 0.038 | 46.3 | 0.21 | 0.52 | 0.74 |
| Example 23-11 | 29.6 | 0.033 | 28.9 | 0.26 | 0.58 | 0.78 |
| Example 23-12 | 36.9 | 0.03 | 40.8 | 0.22 | 0.54 | 0.76 |
| Comparative Example 9-2 | 62.5 | 0.099 | 386.7 | 0.13 | 0.33 | 0.52 |
| Comparative Example 9-3 | 48.7 | 0.065 | 154.2 | 0.15 | 0.38 | 0.59 |
| Comparative Example 9-4 | 55.6 | 0.053 | 163.8 | 0.15 | 0.38 | 0.6 |

Figure 48:
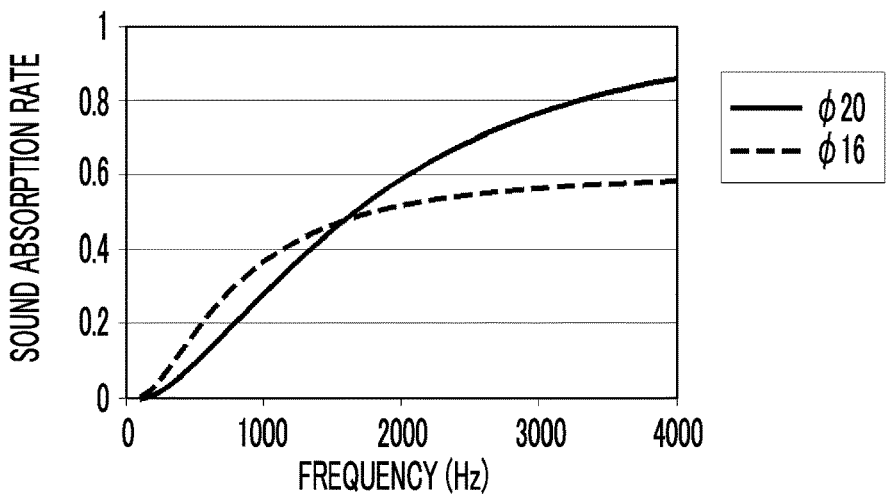
FIG. 48 is a graph showing the relationship between a frequency and a sound absorption rate.

From the results shown in Table 3, it can be seen that the effect of improving the sound absorption rate at various levels, in particular, on the low frequency side can be obtained. In particular, as shown in FIG. 48, it was found that the effect of improving the absorbance on the low frequency side was large in a case where the average opening diameter was small and the average opening ratio was small ("φ20" in FIG. 48 corresponds to Example 23, and "b16" in FIG. 48 corresponds to Example 23-2). However, since the sound absorption rate on the high frequency side is small in a case where the average opening diameter is small and the average opening ratio is small, it is necessary to appropriately select the average opening diameter and the average opening ratio according to the purpose.

Example 26, Reference Example 1, and Comparative Example 10

As Example 26, the same soundproof structure as in Example 1 was manufactured using the same sheet member (average opening diameter of 20 μm, average opening ratio of 5.7%, random arrangement, material: aluminum) as in Example 18 and urethane (low repulsion urethane sheet KTHU-1010 manufactured by Hikari Co., Ltd.) as a sound absorbing body instead of glass wool. The thickness of the urethane is 10 mm.

In Example 1, a sheet member was used alone.

In Comparative example 10, urethane was used alone.

In the measurement, as in Example 1, the absorbance was measured by the transfer function method using four microphones.

Figure 49:
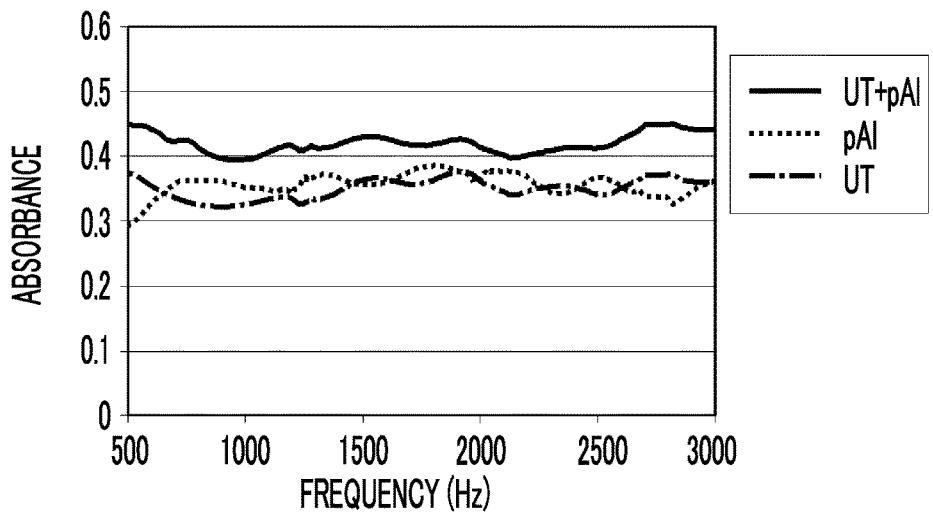
FIG. 49 is a graph showing the relationship between a frequency and a sound absorption rate.

The relationship between the frequency and the absorbance was measured for the manufactured soundproof structure. The results are shown in FIG. 49. In FIG. 49, "UT+pAl" in the legend indicates Example 26 in which urethane and a sheet member are combined, "pAl" indicates Reference example 1 of the sheet member alone, and "UT" indicates Comparative example 10 of urethane alone.

From FIG. 49, it can be seen that, even in a case where urethane is used as a sound absorbing body, the sound absorption rate can be increased by mounting a sheet member having micro through-holes.

Next, the soundproof structures of Example 26, Reference example 1 and Comparative example 10 were subjected to an ozone exposure test to examine ozone durability. The ozone exposure test was performed under the conditions of an ozone concentration of 10 ppm, an exposure time of 48 hours, a temperature of 40° C., and a humidity of 60%. This corresponds to five years of ozone exposure in an indoor environment.

Figure 50:
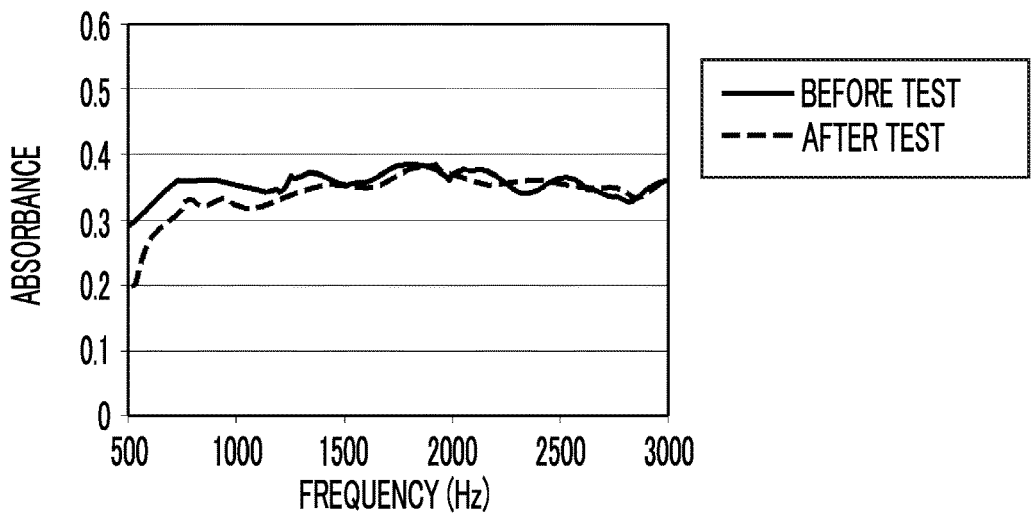
FIG. 50 is a graph showing the relationship between a frequency and a sound absorption rate.

In each case, the sound absorption rate of the sample after the exposure test was measured and compared with that before the test. FIG. 50 shows the results of Reference example 1 (sheet member alone), FIG. 51 shows the results of Comparative example 10 (urethane alone), and FIG. 52 shows the results of Example 26 (sheet member on urethane).

Figure 51:
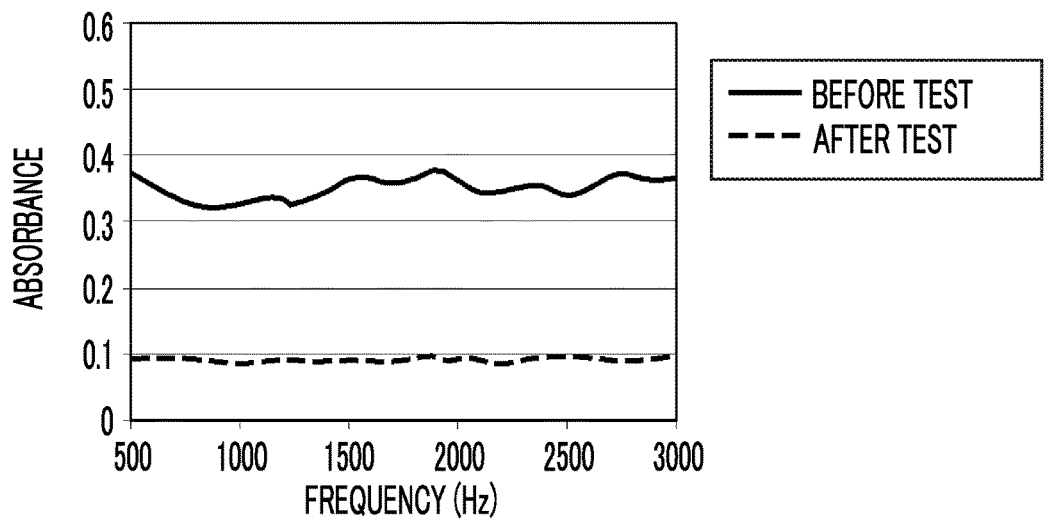
FIG. 51 is a graph showing the relationship between a frequency and a sound absorption rate.
Figure 52:
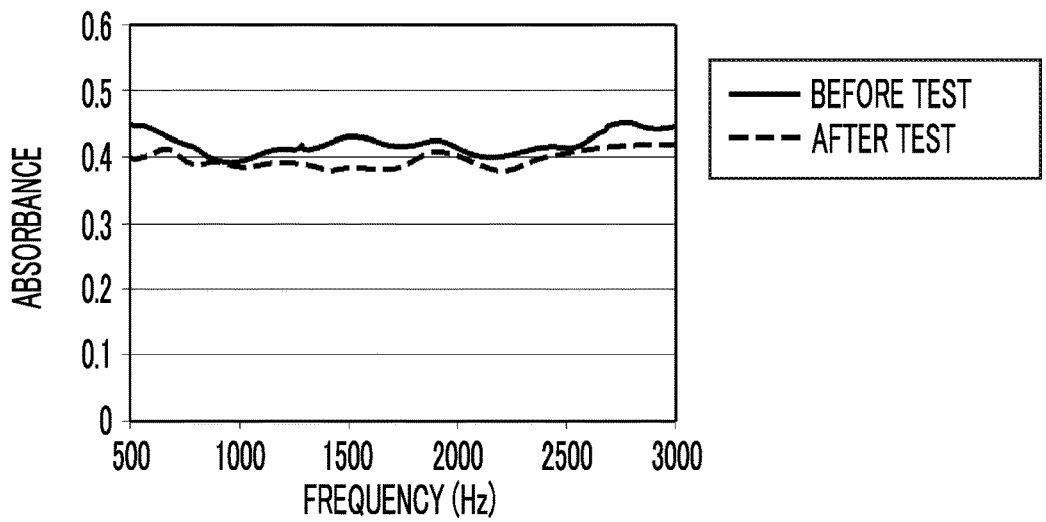
FIG. 52 is a graph showing the relationship between a frequency and a sound absorption rate.

As shown in FIG. 51, in Comparative example 10 of urethane alone, the absorbance was greatly reduced after the ozone exposure test. On the other hand, in Example 26 that was a soundproof structure in which the sheet member was disposed on the urethane, a change in the absorbance was significantly suppressed before and after the test. That is, it can be seen that the sound absorption rate is increased by the effect of the sheet member and the durability is also greatly improved since the effect of shielding the sound absorbing body from ozone is also obtained. The same test was also performed with ultraviolet light exposure, and the result of durability improvement by the same ultraviolet light shielding effect was obtained.

Example 27 and Comparative Examples 11 and 12

As Example 27, a soundproof structure having the same wall member as in Example 21 (sheet member was the same as in Example 21 (average opening diameter of 20 μm, average opening ratio of 5.7%, random arrangement, material: aluminum)) was manufactured except that urethane (U0016 manufactured by Fuji Rubber Sangyo Co., Ltd.) was used as a sound absorbing body instead of glass wool. The thickness of the urethane was 20 mm.

In Comparative example 11, urethane was used alone.

In Comparative example 12, the same structure as in Example 27 was used except that an aluminum film having through-holes with an average opening diameter of 350 μm and an opening ratio of 17%, which were formed by a punching method, and having a thickness of 20 μm was used as a sheet member.

In the measurement, as in Example 21, the absorbance was measured using the transfer function method using two terminals of the microphone.

Figure 53:
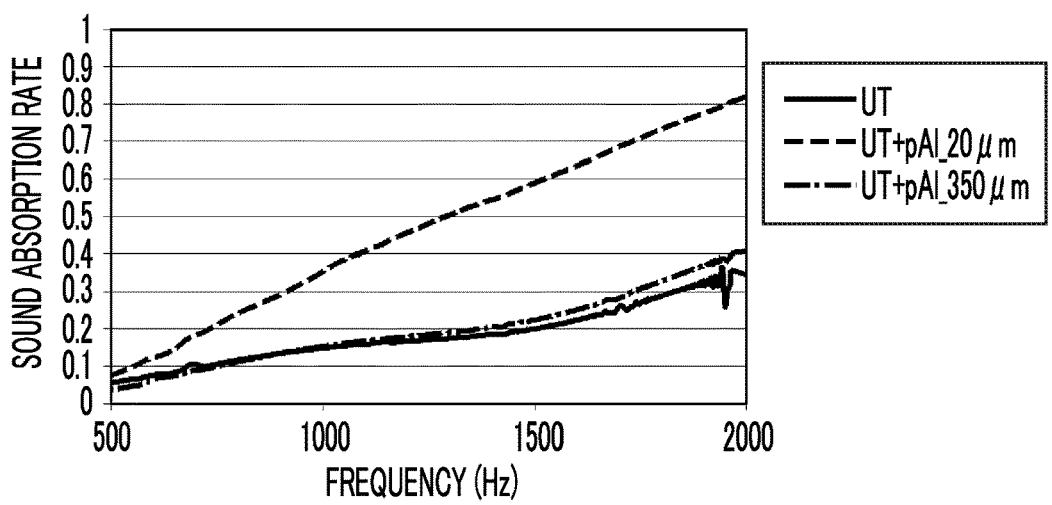
FIG. 53 is a graph showing the relationship between a frequency and a sound absorption rate.

The relationship between the frequency and the sound absorption rate was measured for the manufactured soundproof structure. The results are shown in FIG. 53. In FIG. 53, "UT+pAl_20 μm" in the legend indicates Example 27 in which urethane and a sheet member having through-holes with an average opening diameter of 20 μm are combined, "UT" indicates Comparative example 11 of urethane alone, and "UT+pAl_350 μm" indicates Comparative example 12 in which urethane and a sheet member having through-holes with an average opening diameter of 350 μm are combined.

From the results shown in FIG. 53, it can be seen that the sound absorption rate in Example 27 is greatly improved as compared with Comparative example 11 of the urethane alone. On the other hand, it can be seen that, in the case of Comparative example 12 in which a sheet member having through-holes with an average opening diameter of 350 μm is disposed on the urethane, almost no improvement in the sound absorption rate is observed.

[Evaluation 2]

<Visibility>

Next, the visibility of through-holes was evaluated for the nickel film (through-holes were in a periodic structure arrangement) manufactured in Example 1 and the aluminum film (through-holes were in a random arrangement) manufactured in Example 18.

Figure 54:
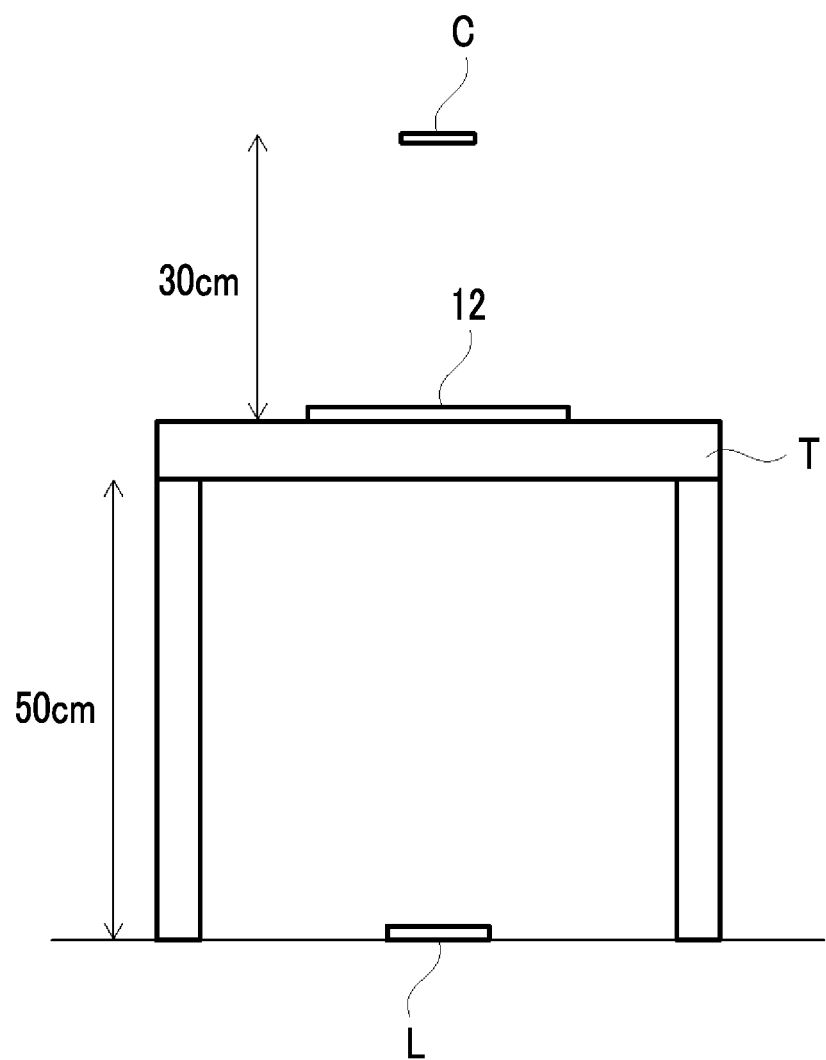
FIG. 54 is a schematic diagram illustrating a method of measuring visibility.

Specifically, as shown in FIG. 54, the sheet member 12 was placed on a transparent acrylic plate T having a thickness of 5 mm, and a point light source L (white light of Nexus 5 (manufactured by LG Electronics)) was disposed at a position 50 cm away from the main surface of the transparent acrylic plate T vertically in a direction opposite to the sheet member 12. In addition, a camera C (iPhone5s (registered trademark) manufactured by Apple Inc.) was disposed at a position 30 cm away from the main surface of the sheet member 12 vertically.

The point light source was turned on, and the light transmitted through the through-holes of the sheet member 12 was visually evaluated from the position of the camera.

Next, the transmitted light was imaged by the camera. It was confirmed that the imaging result was the same as in the case of visual observation.

Figure 55:
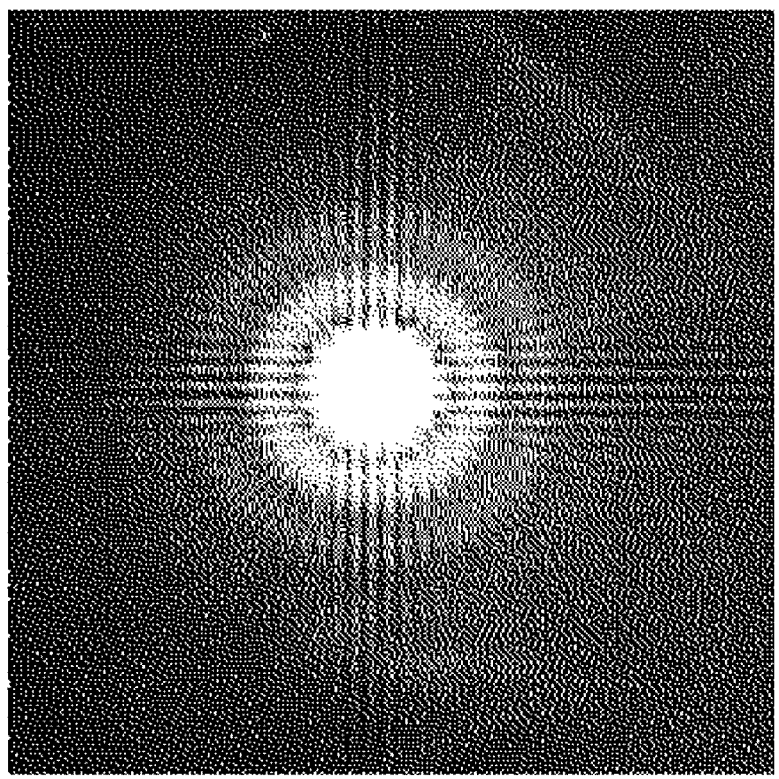
FIG. 55 is a diagram obtained by imaging the measurement result of visibility.
Figure 56:
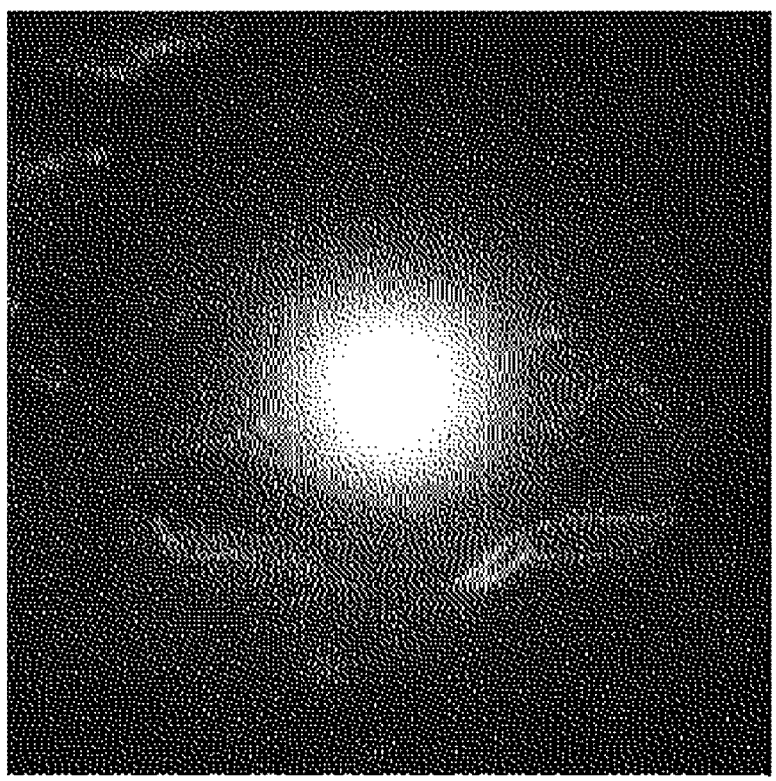
FIG. 56 is a diagram obtained by imaging the measurement result of visibility.

FIG. 55 shows the imaging result of the nickel film, and FIG. 56 shows the imaging result of the aluminum film.

As described above, in the nickel film manufactured in Example 1, the through-holes are regularly arranged. Therefore, as shown in FIG. 55, the spread of light in a rainbow color can be seen by the diffraction of light. On the other hand, in the aluminum film manufactured in Example 18, the through-holes are randomly arranged. Therefore, as shown in FIG. 56, there is no diffraction of light and the white light source is seen as it is.

Example 28

A soundproof structure was manufactured in the same manner as in Example 1 except that the following sheet member was used, and the sound absorbing characteristics were measured.

As a sheet member, a woven fabric was manufactured in which the size of an opening portion of a mesh was 20 μm×20 μm and the opening ratio was 5.7%. The material used was PET. The thickness was 20 pun. A woven fabric having a similar opening portion or controlled thickness can be selected, for example, from SEFAR Acoustic HF series manufactured by Marian Co., Ltd.

As a result of measuring the sound absorbing characteristics, the effect of increasing the absorbance was obtained in the same manner as in Example 1.

Example 29

A soundproof structure was manufactured in the same manner as in Example 10 except that the following sheet member was used, and the sound absorbing characteristics were measured.

As a sheet member, a woven fabric was manufactured in which the size of an opening portion of a mesh was 20 μm×20 μm, the opening ratio was 5.7%, and the thickness was 20 μm. The material used was PET.

As a result of measuring the sound absorbing characteristics, the effect of increasing the absorbance was obtained in the same manner as in Example 10.

Example 30

A soundproof structure was manufactured in the same manner as in Example 10 except that the following sound absorbing body was used, and the sound absorbing characteristics were measured.

As a sound absorbing body, a felt having a thickness of 20 mm and a unit thickness flow resistance of 20000 [Pa·s/m$^2$] was used in which the flow resistance value was adjusted by crushing a sound absorbing felt "Fermenon manufactured by Dorix Co., Ltd." in the thickness direction. The felt is also a fiber system such as glass wool, and sound absorption modeling according to the Delany-Bazley equation is possible. The felt alone under the above-described conditions was measured, and as a result, the same sound absorbing characteristics as those of glass wool having the same thickness and flow resistance were obtained.

As a result of measuring the sound absorbing characteristics, it was possible to obtain the sound absorbing characteristics of increasing the sound absorption rate on the low frequency side in the same manner as in Example 10.

[Simulation 3]

In order to check the effect of the intermediate member, finite element method simulation using COMSOL was performed.

First, the examination was performed in an arrangement in which the back surface was not closed. In the same manner as in Simulation 1, a through-hole model according to the Maa model and a porous sound absorbing body model according to the DB equation were used.

The outermost surface was a sheet member having through-holes with a through-hole diameter of 20 μm, an opening ratio of 5.7%, and a thickness of 20 μm. The outermost surface was a porous sound absorbing body, such as glass wool, having a unit thickness flow resistance of 20000 (Pa·s/m$^2$) and a thickness of 10 (mm). A system was examined in which a flow resistance member having a thickness of 100 μm was disposed as an intermediate member in the middle, and the flow resistance was changed.

The flow resistance was changed from 1 (Pa·s/m) to 500 (Pa·s/m). That is, this is equivalent to changing the unit thickness flow resistance of the intermediate member from 10000 (Pa·s/m$^2$) to 5000000 (Pa·s/m$^2$). These were compared with the case of the porous sound absorbing body alone and the system in which the sheet member and the porous sound absorbing body were overlapped.

Figure 57:
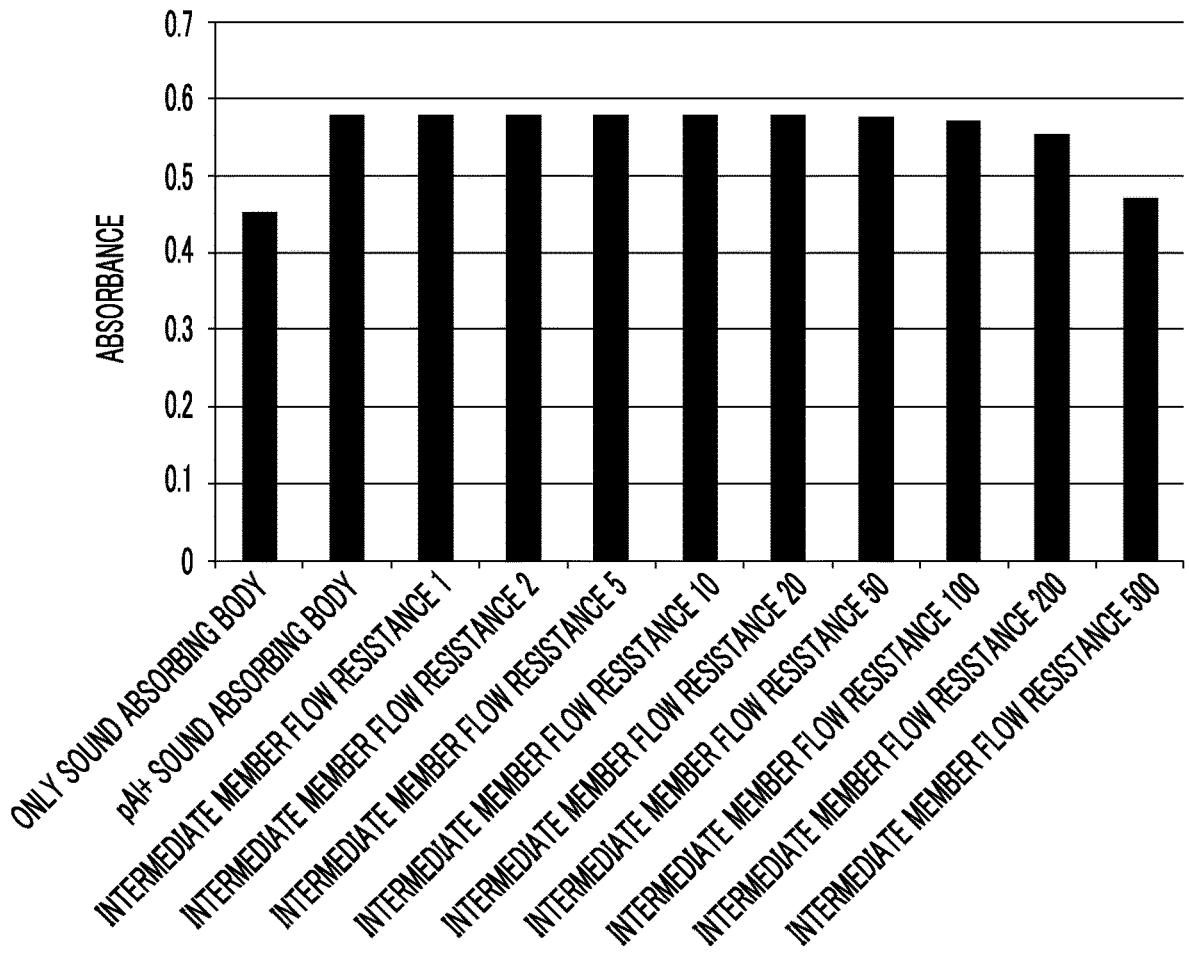
FIG. 57 is a graph showing an absorbance.
Figure 58:
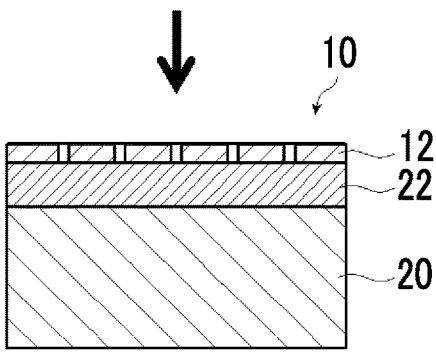
FIG. 58 is a schematic diagram of a model of a soundproof structure subjected to simulation.

From the calculation results, the absorbance (1−reflectivity−transmittance) at 4 kHz is shown in FIG. 57. FIG. 58 shows a schematic view of a model subjected to simulation. In FIG. 58, reference numeral 22 denotes an intermediate member.

From FIG. 57, it can be seen that the absorbance decreases in a case where the flow resistance of the intermediate member is as large as 500 (Pa·s/m). This is because the flow resistance of the intermediate member becomes too large and the sound becomes difficult to pass therethrough and accordingly the reflection becomes large. In a case where the flow resistance of the intermediate member is 200 (Pa·s/m) or less, the absorption becomes large. In a case where the flow resistance of the intermediate member is 100 (Pa·s/m) or less, the absorption becomes larger. In a case where the flow resistance of the intermediate member is 10 (Pa·s/m) or less, the absorption becomes even larger. In a case where the flow resistance of the intermediate member is 5 (Pa·s/m) or less, the absorption is almost the same as that in a system in which only the sheet member and the porous sound absorbing body are overlapped.

Thus, it can be seen that, even in a case where the intermediate member is inserted, the same effect as the effect in the case of overlapping the sheet member and the porous sound absorbing body can be obtained.

[Simulation 4]

Next, examination was performed in an arrangement in which an intermediate member was provided and the back surface was closed. A configuration, which was the same multilayer configuration as in Simulation 3 and in which the back surface of the backmost porous sound absorbing body was closed with a rigid body, was modeled, and calculation was performed.

Figure 59:
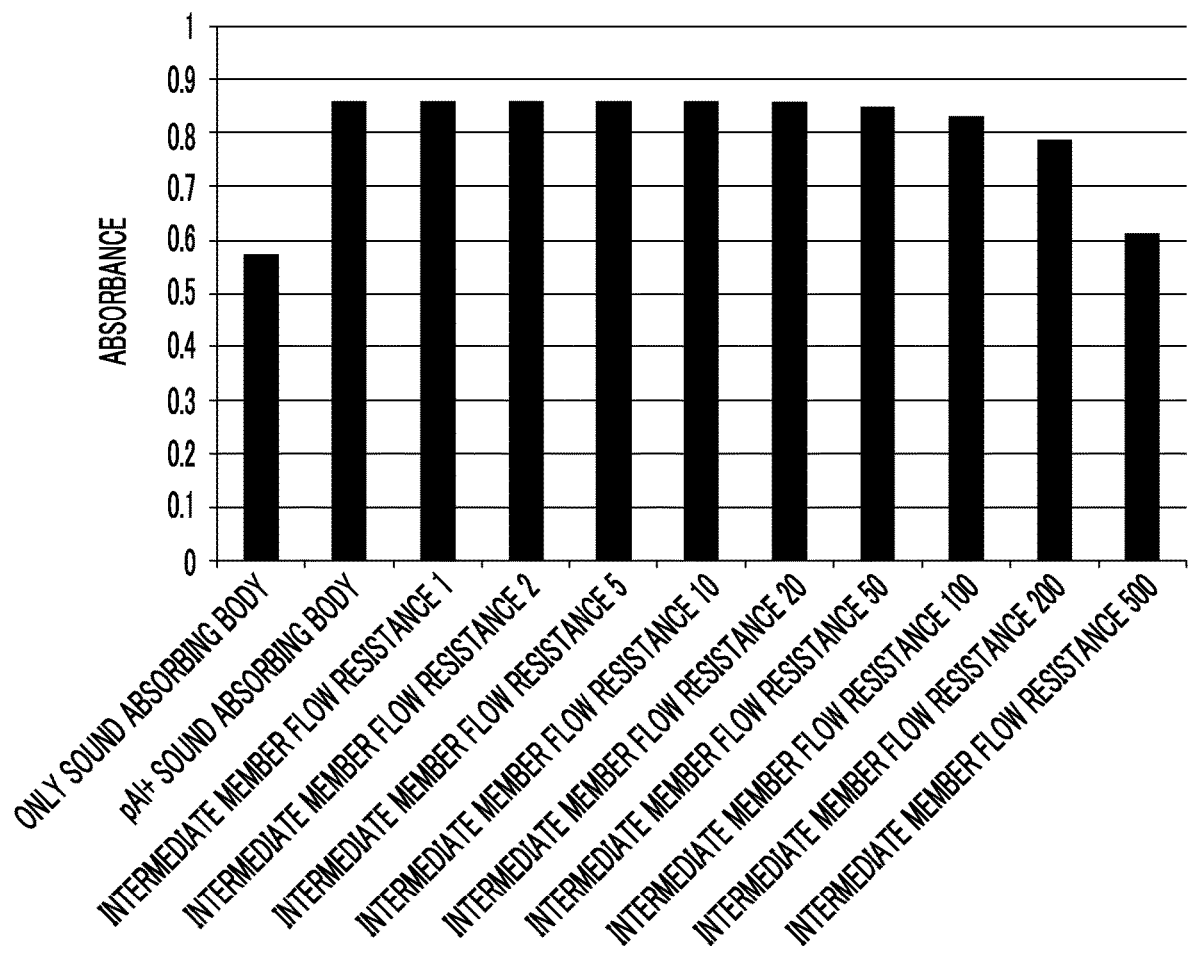
FIG. 59 is a graph showing a sound absorption rate.
Figure 60:
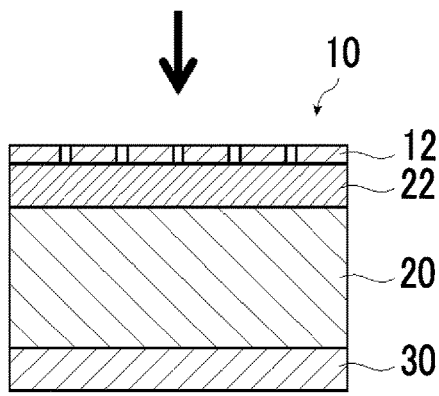
FIG. 60 is a schematic diagram of a model of a soundproof structure subjected to simulation.

From the calculation results, the sound absorption rate (1−reflectivity) at 4 kHz is shown in FIG. 59. FIG. 60 shows a schematic view of a model subjected to simulation.

From FIG. 59, it can be seen that the sound absorption rate in the arrangement in which the back surface is closed also shows the same behavior as in Simulation 3. That is, in a case where the flow resistance of the intermediate member is 200 (Pa·s/m) or less, the absorption becomes large. In a case where the flow resistance of the intermediate member is 100 (Pa·s/m) or less, the absorption becomes larger. In a case where the flow resistance of the intermediate member is 10 (Pa·s/m) or less, the absorption becomes even larger. In a case where the flow resistance of the intermediate member is 5 (Pa·s/m) or less, the absorption is almost the same as that in a system in which only the sheet member and the porous sound absorbing body are overlapped.

Thus, even in a case where the intermediate member is inserted in a case where the back surface is closed, the same effect as the effect in the case of overlapping the sheet member and the porous sound absorbing body can be obtained.

Figure 61:
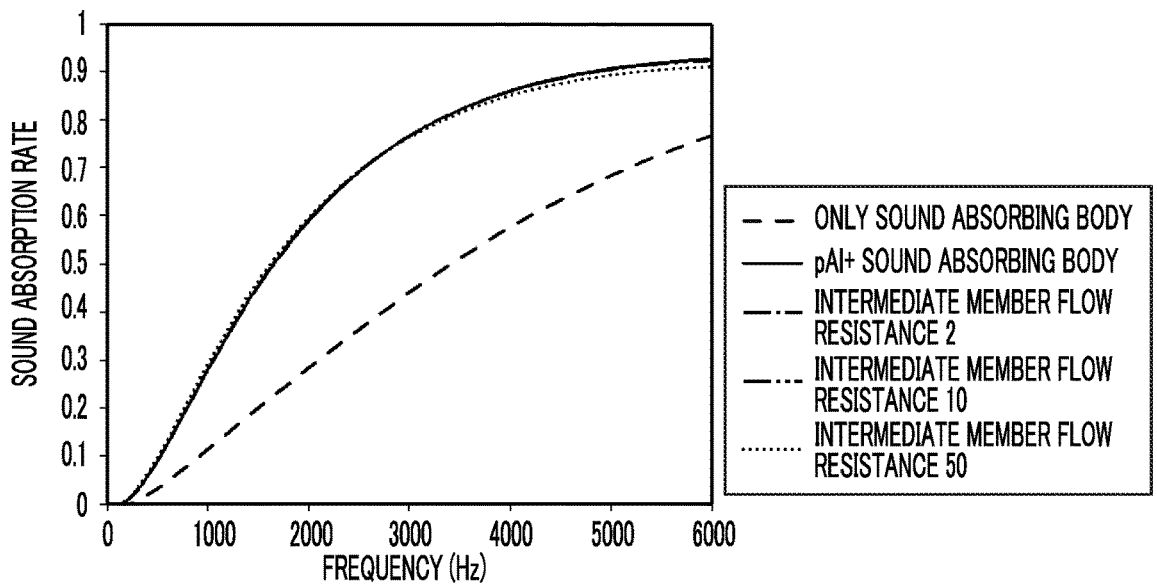
FIG. 61 is a graph showing the relationship between a frequency and a sound absorption rate.

FIG. 61 shows the frequency spectrum of the sound absorption rate calculated by Simulation 4. From FIG. 61, it can be seen that, even in a case where the intermediate member is present, a large sound absorption rate is obtained as compared with the case of using only the porous sound absorbing body, with the broad band characteristics of the sound absorption rate hardly changing.

[Simulation 5]

Next, calculation was performed in the same manner as in Simulation 4 except that the thickness of the sound absorbing body was 20 mm. That is, in Simulation 5, the calculation was performed using a model having a sound absorbing body thickness of 20 mm in an arrangement in which an intermediate member was provided and the back surface was closed.

Figure 62:
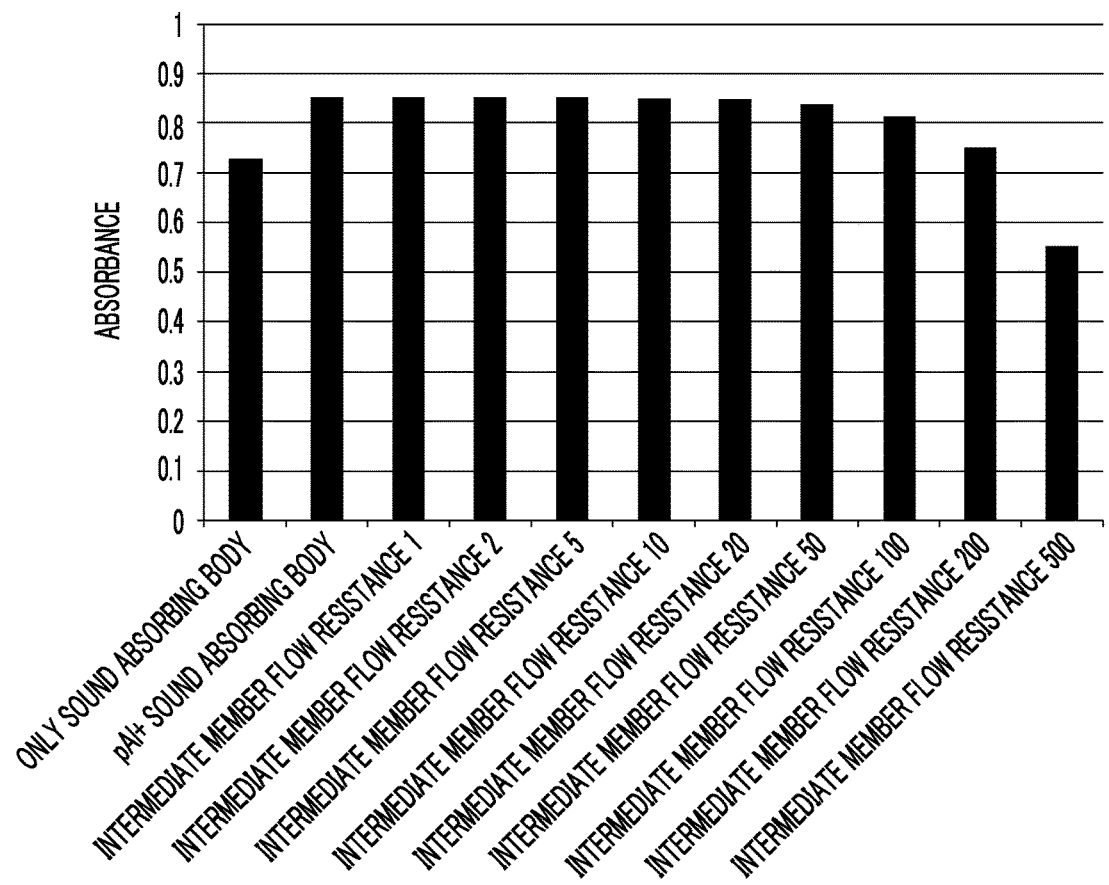
FIG. 62 is a graph showing an absorbance.

From the calculation results, the sound absorption rate (1−reflectivity) at 2 kHz is shown in FIG. 62.

From FIG. 62, the relationship between the sound absorption rate and the flow resistance of the intermediate member in a case where the thickness of the sound absorbing body was large was also the same as those in Simulations 3 and 4.

As described above, it can be seen that, even in a case where the flow resistance member (intermediate member) is present between the sheet member and the sound absorbing body, the sound absorption effect by the sheet member on the surface can be maintained.

From the above, the effect of the present invention is apparent.

Explanation of References

10: soundproof structure
11: aluminum base
12: sheet member
13: aluminum hydroxide coating film
14: through-hole
20: sound absorbing body
22: intermediate member
30: wall member

What is claimed is:

1. A soundproof structure, comprising:
a sheet member having a plurality of through-holes passing therethrough in a thickness direction; and
a sound absorbing body disposed in contact with one main surface of the sheet member,
wherein an average opening diameter of the through-holes is 0.1 μm or more and less than 100 μm,
a parameter A expressed by $A=\sigma \times \phi^2$ is 92 or less assuming that the average opening diameter of the through-holes is ϕ (μm) and an average opening ratio of the through-holes is σ, and
a shape of each of at least some of the through-holes is a shape having a maximum diameter inside the through-hole, in which a hole diameter increases inside the through-hole at a more inward position rather than outermost surfaces of the through-hole.

2. The soundproof structure according to claim 1,
wherein the sheet member is a plate-shaped member having a plurality of through-holes.

3. The soundproof structure according to claim 1,
wherein the sheet member is a fibrous member.

4. The soundproof structure according to claim 1,
wherein the parameter A is 3.2 or more and 92 or less.

5. The soundproof structure according to claim 1, further comprising:
a wall member on a side of the sound absorbing body opposite to the sheet member,
wherein the sound absorbing body and the wall member are disposed in a state in which at least parts of the sound absorbing body and the wall member are in contact with each other.

6. The soundproof structure according to claim 1, further comprising:
a wall member,
wherein a distance between the sheet member and the wall member is less than 35 cm.

7. The soundproof structure according to claim 6,
wherein the sound absorbing body is disposed between the sheet member and the wall member.

8. The soundproof structure according to claim 1, further comprising:
a wall member,
wherein, assuming that a wavelength of a frequency of sound to be soundproofed is λ, at least one of the sheet member or the sound absorbing body is present at a position spaced apart from the wall member by λ/4.

9. The soundproof structure according to claim 5,
wherein, assuming that a wavelength of a frequency of sound to be soundproofed is λ, the sheet member is present at a position spaced apart from the wall member by λ/4.

10. The soundproof structure according to claim 5,
wherein the sheet member, the sound absorbing body, and the wall member are formed as an integrated cell structure.

11. The soundproof structure according to claim 10,
wherein, among surfaces of the sound absorbing body, at least one of surfaces not in contact with the wall member is in contact with the sheet member.

12. The soundproof structure according to claim 10,
wherein one of outermost surfaces is the sheet member, and a surface facing a surface on the sheet member side is the wall member.

13. The soundproof structure according to claim 1,
wherein the sound absorbing body is disposed on an outermost surface with respect to a noise source to be soundproofed.

14. The soundproof structure according to claim 1,
wherein two or more of the sheet members are provided, and
the sheet member is disposed on two or more surfaces of the sound absorbing body.

15. The soundproof structure according to claim 1,
wherein the sheet member and the sound absorbing body are alternately laminated.

16. The soundproof structure according to claim 1,
wherein a forming material of the sheet member is a metal material.

17. The soundproof structure according to claim 1,
wherein an intermediate member having air permeability is disposed between the sheet member and the sound absorbing body.

18. The soundproof structure according to claim 17,
wherein the intermediate member is a mesh-like member or a nonwoven member.

* * * * *